(12) United States Patent
Calley et al.

(10) Patent No.: US 7,973,446 B2
(45) Date of Patent: Jul. 5, 2011

(54) ELECTRICAL DEVICES HAVING TAPE WOUND CORE LAMINATE ROTOR OR STATOR ELEMENTS

(75) Inventors: David Gregory Calley, Flagstaff, AZ (US); Thomas Janecek, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 243 days.

(21) Appl. No.: 12/149,936

(22) Filed: May 9, 2008

(65) Prior Publication Data
US 2009/0206693 A1    Aug. 20, 2009

Related U.S. Application Data

(60) Provisional application No. 60/924,328, filed on May 9, 2007, provisional application No. 61/064,162, filed on Feb. 20, 2008, provisional application No. 61/064,161, filed on Feb. 20, 2008.

(51) Int. Cl.
*H02K 21/38* (2006.01)
(52) U.S. Cl. .................. 310/216.061; 310/268
(58) Field of Classification Search .................. 310/266, 310/268, 216.061, 216.062, 216.063, 216.023
See application file for complete search history.

(56) References Cited

U.S. PATENT DOCUMENTS

| | | |
|---|---|---|
| 1,361,136 A | 12/1920 | Burke |
| 2,078,668 A | 4/1937 | Kilgore |
| 3,403,273 A | 9/1968 | Hiroshi |
| 3,437,854 A | 4/1969 | Oiso |
| 3,558,941 A | 1/1971 | Brebbia et al. |
| 3,700,942 A * | 10/1972 | Alth ............................ 310/164 |
| 3,710,158 A | 1/1973 | Bachle et al. |
| 3,774,059 A | 11/1973 | Cox |
| 3,869,625 A | 3/1975 | Sawyer |
| 3,984,711 A | 10/1976 | Kordik |
| 3,999,107 A | 12/1976 | Reuting |
| 4,021,691 A | 5/1977 | Dukshtau et al. |
| 4,114,057 A | 9/1978 | Esters |
| 4,127,802 A | 11/1978 | Johnson |
| 4,206,374 A | 6/1980 | Goddijn |
| 4,237,396 A | 12/1980 | Blenkinsop et al. |
| 4,255,684 A | 3/1981 | Mischler et al. |

(Continued)

FOREIGN PATENT DOCUMENTS
DE        1513856        4/1969
(Continued)

OTHER PUBLICATIONS

Hasubek, B. E. et al.; "Design Limitations of Reduced Magnet Material Passive Rotor Transverse Flux Motors Investigated using 3D Finite Element Analysis"; 2000; pp. 365-369.

(Continued)

*Primary Examiner* — Dang D Le
(74) *Attorney, Agent, or Firm* — Snell & Wilmer L.L.P.

(57) ABSTRACT

Electrical output generating devices and driven electrical devices having tape wound core laminate rotor or stator elements. The tape wound core portions enhance magnetic flux and may be shaped and cut to receive magnet and/or flux conducting portions in corresponding stator or rotor portions of devices. The devices can include cooling features integral with the stator and/or rotor portions and superconducting elements. The tape wound core portions can be contained in housings and/or be impregnated with adhesive or other bonding so as to maintain shape and to protect the tape wound core portions during operation of the device. In some variations, the housings can include features for simplifying the adhesive/bonding process.

28 Claims, 57 Drawing Sheets

U.S. PATENT DOCUMENTS

| | | | |
|---|---|---|---|
| 4,255,696 A | 3/1981 | Field, II | |
| 4,286,180 A | 8/1981 | Langley | |
| 4,306,164 A | 12/1981 | Itoh et al. | |
| 4,363,988 A | 12/1982 | Kliman | |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,605,874 A | 8/1986 | Whiteley | |
| 4,611,139 A | 9/1986 | Godkin et al. | |
| 4,620,752 A | 11/1986 | Fremerey et al. | |
| 4,639,626 A | 1/1987 | McGee | |
| 4,658,166 A | 4/1987 | Oudet | |
| 4,794,286 A | 12/1988 | Taenzer | |
| 4,797,602 A | 1/1989 | West | |
| 4,835,840 A | 6/1989 | Stokes | |
| 4,850,100 A | 7/1989 | Stokes | |
| 4,857,786 A | 8/1989 | Nihei et al. | |
| 4,899,072 A | 2/1990 | Ohta | |
| 4,900,965 A | 2/1990 | Fisher | |
| 4,959,577 A | 9/1990 | Radomski | |
| 5,038,066 A | 8/1991 | Pawlak et al. | |
| 5,051,641 A | 9/1991 | Weh | |
| 5,062,012 A | 10/1991 | Maeda et al. | |
| 5,097,167 A | 3/1992 | Kanayama et al. | |
| 5,117,142 A | 5/1992 | von Zweygbergk | |
| 5,130,595 A | 7/1992 | Arora | |
| 5,132,581 A | 7/1992 | Kusase | |
| 5,177,054 A * | 1/1993 | Lloyd et al. | 505/166 |
| 5,208,503 A | 5/1993 | Hisey | |
| 5,212,419 A | 5/1993 | Fisher et al. | |
| 5,214,333 A | 5/1993 | Kawamura | |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,382,859 A | 1/1995 | Huang et al. | |
| 5,386,166 A | 1/1995 | Reimer et al. | |
| 5,477,841 A | 12/1995 | Trost et al. | |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,696,419 A | 12/1997 | Rakestraw et al. | |
| 5,712,521 A | 1/1998 | Detela | |
| 5,723,921 A | 3/1998 | Sugiura | |
| 5,729,065 A | 3/1998 | Fremery et al. | |
| 5,731,649 A * | 3/1998 | Caamano | 310/216.047 |
| 5,773,910 A | 6/1998 | Lange | |
| 5,777,418 A | 7/1998 | Lange et al. | |
| 5,780,953 A | 7/1998 | Umeda et al. | |
| 5,814,907 A | 9/1998 | Bandera | |
| 5,886,449 A | 3/1999 | Mitcham | |
| 5,889,348 A | 3/1999 | Mühlberger et al. | |
| 5,894,183 A | 4/1999 | Borchert | |
| 5,909,339 A | 6/1999 | Hong | |
| 5,925,965 A | 7/1999 | Li et al. | |
| 5,942,828 A | 8/1999 | Hill | |
| 5,973,436 A | 10/1999 | Mitcham | |
| 5,994,802 A | 11/1999 | Shichijyo et al. | |
| 6,028,377 A | 2/2000 | Sakamoto | |
| 6,043,579 A | 3/2000 | Hill | |
| 6,060,810 A | 5/2000 | Lee et al. | |
| 6,066,906 A | 5/2000 | Kalsi | |
| 6,097,118 A | 8/2000 | Hull | |
| 6,097,126 A | 8/2000 | Takura | |
| 6,121,712 A | 9/2000 | Sakamoto | |
| 6,133,655 A | 10/2000 | Suzuki et al. | |
| 6,133,664 A | 10/2000 | Torok et al. | |
| 6,133,669 A | 10/2000 | Tupper | |
| 6,137,202 A | 10/2000 | Holmes et al. | |
| 6,154,013 A | 11/2000 | Caamano | |
| 6,163,097 A | 12/2000 | Smith et al. | |
| 6,175,177 B1 | 1/2001 | Sabinski et al. | |
| 6,177,748 B1 | 1/2001 | Katcher et al. | |
| 6,181,035 B1 | 1/2001 | Acquaviva | |
| 6,194,799 B1 * | 2/2001 | Miekka et al. | 310/68 R |
| 6,229,238 B1 | 5/2001 | Graef | |
| 6,232,693 B1 | 5/2001 | Gierer et al. | |
| 6,236,131 B1 | 5/2001 | Schafer | |
| 6,246,561 B1 | 6/2001 | Flynn | |
| 6,288,467 B1 | 9/2001 | Lange et al. | |
| 6,300,702 B1 | 10/2001 | Jack et al. | |
| 6,304,010 B1 | 10/2001 | Sugiura | |
| 6,342,746 B1 | 1/2002 | Flynn | |
| 6,365,999 B1 | 4/2002 | Mühlberger et al. | |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,472,792 B1 | 10/2002 | Jack et al. | |
| 6,492,758 B1 | 12/2002 | Gianni et al. | |
| 6,545,382 B1 * | 4/2003 | Bennett | 310/216.023 |
| 6,603,237 B1 | 8/2003 | Caamano | |
| 6,657,329 B2 | 12/2003 | Kastinger et al. | |
| 6,664,704 B2 | 12/2003 | Calley | |
| 6,707,208 B2 | 3/2004 | Durham et al. | |
| 6,717,297 B2 | 4/2004 | Sadarangani et al. | |
| 6,750,582 B1 | 6/2004 | Neet | |
| 6,774,512 B2 | 8/2004 | Takagi et al. | |
| 6,791,225 B2 | 9/2004 | Campbell et al. | |
| 6,794,791 B2 | 9/2004 | Ben Ahmed et al. | |
| 6,815,863 B1 | 11/2004 | Jack et al. | |
| 6,835,941 B1 | 12/2004 | Tanaka | |
| 6,847,135 B2 | 1/2005 | Kastinger et al. | |
| 6,849,985 B2 | 2/2005 | Jack et al. | |
| 6,853,112 B2 | 2/2005 | Nakamura et al. | |
| 6,866,111 B2 | 3/2005 | Dube | |
| 6,867,530 B2 | 3/2005 | Gamm et al. | |
| 6,879,080 B2 | 4/2005 | Caamano | |
| 6,882,066 B2 | 4/2005 | Kastinger | |
| 6,882,077 B2 | 4/2005 | Neet | |
| 6,885,124 B2 | 4/2005 | Neet | |
| 6,885,129 B1 | 4/2005 | Oohashi et al. | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,960,862 B2 | 11/2005 | Hill | |
| 6,979,925 B2 | 12/2005 | Schwamm | |
| 6,989,622 B1 | 1/2006 | Chen et al. | |
| 7,015,603 B2 | 3/2006 | Barrho et al. | |
| 7,026,737 B2 | 4/2006 | Angerer et al. | |
| 7,030,529 B2 | 4/2006 | Dommsch et al. | |
| 7,030,534 B2 | 4/2006 | Caamano | |
| 7,064,469 B2 | 6/2006 | Jack et al. | |
| 7,067,954 B2 | 6/2006 | Kuribayashi et al. | |
| 7,071,593 B2 | 7/2006 | Matsushita et al. | |
| 7,126,313 B2 | 10/2006 | Dooley | |
| 7,129,602 B2 | 10/2006 | Lange et al. | |
| 7,135,802 B2 | 11/2006 | Seki et al. | |
| 7,208,856 B2 | 4/2007 | Imai et al. | |
| 7,211,922 B2 | 5/2007 | Isoda et al. | |
| 7,230,361 B2 | 6/2007 | Hirzel | |
| 7,242,118 B2 | 7/2007 | Sakamoto | |
| 7,245,055 B2 | 7/2007 | Jack | |
| 7,250,704 B1 | 7/2007 | Sortore et al. | |
| 7,259,483 B2 | 8/2007 | Komiya et al. | |
| 7,265,472 B2 | 9/2007 | Mitcham | |
| 7,268,456 B2 | 9/2007 | Harada et al. | |
| 7,279,820 B2 | 10/2007 | Grundl et al. | |
| 7,358,639 B2 | 4/2008 | Caamano | |
| 7,385,329 B2 | 6/2008 | Hill | |
| 7,385,330 B2 | 6/2008 | Trzynadlowski et al. | |
| 7,420,312 B2 | 9/2008 | Kitamura et al. | |
| 7,466,057 B2 | 12/2008 | Imai et al. | |
| 7,474,030 B2 | 1/2009 | Mitcham | |
| 7,579,742 B1 | 8/2009 | Rittenhouse | |
| 7,592,735 B2 | 9/2009 | Hamada | |
| 7,602,095 B2 | 10/2009 | Kusase | |
| 7,638,919 B2 | 12/2009 | Pulnikov et al. | |
| 7,679,253 B2 | 3/2010 | Neet | |
| 2001/0001528 A1 | 5/2001 | Ragaly | |
| 2001/0030479 A1 | 10/2001 | Mohler | |
| 2001/0030486 A1 | 10/2001 | Pijanowski | |
| 2002/0070627 A1 | 6/2002 | Ward et al. | |
| 2002/0113520 A1 | 8/2002 | Kastinger et al. | |

| | | | |
|---|---|---|---|
| 2002/0135242 | A1 | 9/2002 | Kawai |
| 2003/0122439 | A1 | 7/2003 | Horst |
| 2003/0122440 | A1 | 7/2003 | Horst |
| 2004/0061396 | A1 | 4/2004 | Narita et al. |
| 2004/0140730 | A1 | 7/2004 | Barrho et al. |
| 2004/0145269 | A1 | 7/2004 | Barrho et al. |
| 2004/0150288 | A1 | 8/2004 | Calley |
| 2004/0189138 | A1 | 9/2004 | Jack |
| 2004/0212267 | A1 | 10/2004 | Jack et al. |
| 2004/0232799 | A1 | 11/2004 | Chen et al. |
| 2004/0239207 | A1 | 12/2004 | Kloepzig et al. |
| 2004/0251759 | A1 | 12/2004 | Hirzel |
| 2004/0251761 | A1 | 12/2004 | Hirzel |
| 2004/0262105 | A1 | 12/2004 | Li et al. |
| 2005/0006978 | A1 | 1/2005 | Bradfield |
| 2005/0012427 | A1 | 1/2005 | Seki et al. |
| 2005/0062348 | A1 | 3/2005 | Ohnishi et al. |
| 2005/0121983 | A1 | 6/2005 | Ehrhart |
| 2005/0156479 | A1 | 7/2005 | Fujita et al. |
| 2005/0242679 | A1 | 11/2005 | Walter et al. |
| 2006/0012259 | A1 | 1/2006 | Kerlin |
| 2006/0012263 | A1 | 1/2006 | Smith et al. |
| 2006/0082237 | A1 | 4/2006 | Kerlin |
| 2006/0091755 | A1 | 5/2006 | Carlisle |
| 2006/0131974 | A1 | 6/2006 | Sadarangani et al. |
| 2006/0131986 | A1 | 6/2006 | Hsu et al. |
| 2006/0192453 | A1 | 8/2006 | Gieras et al. |
| 2006/0220477 | A1 | 10/2006 | Okumoto et al. |
| 2006/0261688 | A1 | 11/2006 | Akita et al. |
| 2007/0013253 | A1 | 1/2007 | Dobois et al. |
| 2007/0046137 | A1 | 3/2007 | Ooiwa |
| 2007/0046139 | A1 | 3/2007 | Ishizuka |
| 2007/0075605 | A1 | 4/2007 | Enomoto et al. |
| 2007/0138900 | A1 | 6/2007 | Imai et al. |
| 2007/0152528 | A1 | 7/2007 | Kang et al. |
| 2007/0176505 | A1 | 8/2007 | Trzynadlowski et al. |
| 2008/0007126 | A1 | 1/2008 | Popov et al. |
| 2008/0169776 | A1 | 7/2008 | Acker |
| 2008/0211326 | A1 | 9/2008 | Kang et al. |
| 2008/0211336 | A1 | 9/2008 | Sadarangani |
| 2008/0246362 | A1 | 10/2008 | Hirzel |
| 2008/0265707 | A1 | 10/2008 | Bradfield |
| 2008/0309188 | A1 | 12/2008 | Calley |
| 2008/0315700 | A1 | 12/2008 | Ishikawa et al. |
| 2009/0026866 | A1 | 1/2009 | Groening et al. |
| 2009/0085415 | A1 | 4/2009 | Ionel et al. |
| 2009/0243406 | A1 | 10/2009 | Jack et al. |
| 2009/0255924 | A1 | 10/2009 | Lovens |
| 2009/0284253 | A1 | 11/2009 | Finkler et al. |
| 2009/0295237 | A1 | 12/2009 | Gloor |
| 2009/0322165 | A1 | 12/2009 | Rittenhouse |
| 2010/0013341 | A1 | 1/2010 | Vollmer |
| 2010/0013343 | A1 | 1/2010 | Bi |
| 2010/0052467 | A1 | 3/2010 | Gieras |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0544200 A1 | 6/1993 |
| EP | 0707374 | 4/1996 |
| EP | 0718959 | 6/1996 |
| EP | 0998010 | 3/2000 |
| EP | 1117168 | 7/2001 |
| EP | 1227566 | 7/2002 |
| EP | 1 063 754 B1 | 12/2007 |
| GB | 518298 | 9/1938 |
| GB | 2052176 | 1/1986 |
| JP | 60-241758 A | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | W02009/027938 | 3/2009 |
| WO | WO 2009116935 | 9/2009 |
| WO | WO 2009116936 | 9/2009 |
| WO | WO 2009116937 | 9/2009 |
| WO | W02009/133295 | 11/2009 |
| WO | W02009/156297 | 12/2009 |
| WO | W02010/036221 | 4/2010 |
| WO | W02010/048928 | 5/2010 |

OTHER PUBLICATIONS

Dubois, Maxime R. et al.; "Clawpole Transverse-Flux Machine with Hybrid Stator"; pp. 1-6.

Henneberger G. et al.; "On the Parameters Computation of a Single Sided Transverse Flux Motor"; May 26, 2001; pp. 35-40.

Husband, S.M. et al.; "The Rolls-Royce Transverse Flux Motor Development"; 2003; pp. 1435-1440.

Notice of Allowance dated Mar. 29, 2005 for U.S. Appl. No. 10/721,765.

Notice of Allowance dated Feb. 13, 2008 for U.S. Appl. No. 11/679,806.

Notice of Allowance dated May 30, 2003 for U.S. Appl. No. 10/273,238.

Notice of Allowance dated Nov. 3, 2009 for U.S. Appl. No. 12/149,931.

Office Action dated Sep. 28, 2007 for U.S. Appl. No. 11/679,806.

Notice of Allowance dated Dec. 30, 2009 for U.S. Appl. No. 12/149,931.

Office Action dated Sep. 13, 2004 for U.S. Appl. No. 10/721,765.

ISR/WO dated Aug. 15, 2008 for International Patent Application No. PCT/US2008/063301.

IPRP dated Nov. 10, 2009 for International Patent Application No. PCT/US2008/063301.

ISR/WO dated Aug. 20, 2008 for International Patent Application No. PCT/US2008/063236.

IPRP dated Nov. 17, 2009 for International Patent Application No. PCT/US2008/063236.

ISR/WO dated Oct. 24, 2008 for International Patent Application No. PCT/US2008/063336.

IPRP dated Nov. 17, 2009 for International Patent Application No. PCT/US2008/063336.

ISR/WO dated Aug. 15, 2008 for International Patent Application No. PCT/US2008/063287.

IPRP dated Nov. 10, 2009 for International Patent Application No. PCT/US2008/063287.

ISR/WO dated Nov. 10, 2009 for International Patent Application No. PCT/US2008/063268.

IPRP dated Nov. 10, 2009 for International Patent Application No. PCT/US2008/063268.

Technical Project Presentation—Development of a High-Performance Generator for Wind Turbines—by Andrzej M. Trzynadlowski, PhD, University of Nevada, Reno, FIEEE.

Technical Project Presentation—Development of a High-Performance Generator for Wind Turbines—Final Report—University of Nevada, Reno—Feb. 2004.

"Magnetic Field Calculation of Claw Pole Permanent Magnet Machines Using Magnetic Network Method", by Y.G. Guo et al., Faculty of Engineering, University of Technology, Sydney.

"Applications of Power Electronics in Automotive Power Generation",—by David J. Perreault et al., Laboratory for Electromagnetic and Electronic Systems, Massachusetts Institute of Technology, Jun. 21-22, 2006—Paris.

"Thermal Modeling of Lundell Alternators", IEEE Transactions on Energy Conversion, vol. 20, No. 1, Mar. 2005.

"Iron Loss Calculation in a Claw-Pole Structure", by A. Reinap et al., Lund University.

"Permanent Magnet Assisted Synchronous Reluctance Motor Design and Performance Improvement",—A Dissertation by Peyman Niazi, Texas A&M University, Dec. 2005.

"New Design of Hybrid-Type Self-Bearing Motor for Small, High-Speed Spindle",—by Hideki Kanebako et al., IEEE/ ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Office Action dated Nov. 30, 2009 for U.S. Appl. No. 12/149,935.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

Fundamental Modeling for Optimal Design of Transverse Flux Motors—Genevieve Patterson et al., University of Tokyo.

www.higenmotor.com/eng/aboutus/about06read.asp?id=notice &no=87 dated Jan. 15, 2010.

Lyng Eltorque QT 800—2.0 User Manual, version 1.0—dated Jul. 3, 2007.

Motors: Emerging Concepts by George Holling, Apr. 2007.

www.iem.rwth-aachen.de/index.pl/new materials and machines?makePrintable=1; retrieved Jan. 15, 2010.

Raser Technologies Company Brochure.

Response to Office Action filed Jan. 15, 2010 for Japanese Patent Application No. 2003-548374.

Office Action dated Mar. 2, 2010 for U.S. Appl. No. 12/149,931.

Restriction Requirement dated Apr. 5, 2010 for U.S. Appl. No. 12/149,934.

Office Action dated Apr. 28, 2010 for U.S. Appl. No. 12/149,935.

Notice of Allowance dated May 4, 2010 for U.S. Appl. No. 12/149,931.

T.J. Woolmer et al; "Analysis of the Yokeless and Segmented Armature Machine"; Electric Machines & Drives Conference, 2007. IEMDC apos;07. IEEE International vol. 1, Issue, May 3-5, 2007, pp. 704-708.

Technical Project Presentation—Development of a High-Performance Generator for Wind Turbines—by Andrzej M. Trzynadlowski, PhD, University of Nevada, Reno, FIEEE, Aug. 2007.

"Magnetic Field Calculation of Claw Pole Permanent Magnet Machines Using Magnetic Network Method": J. Elect. Electron. Eng., Australia, vol. 22, No. 1, pp. 69-75, 2002.

"Iron Loss Calculation in a Claw-Pole Structure", by A. Reinap et al., Lund University, Jun. 2004.

Dubois, Maxine R. et al.; "Clawpole Transverse-Flux Machine with Hybrid Stator"; pp. 1-6, Jul. 15, 2006.

Fundamental Modeling for Optimal Design of Transverse Flux Motors—Genevieve Patterson et al., University of Tokyo, 2008.

Raser Technologies Company Brochure, 2005.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated May 19, 2010 for U.S. Appl. No. 12/149,934.

Notice of Allowance dated Nov. 2, 2010 for U.S. Appl. No. 12/847,991.

"Two Dimensional Finite Analysis of Passive Rotor Transverse Flux Motors with Slanted Rotor Design" by B.E. Hasubek, et al., May 1999.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

Restriction Requirement dated Feb. 24, 2011 for U.S. Appl. No. 12/942,495.

Notice of Allowance dated Mar. 31, 2011 for U.S. Appl. No. 12/948,925.

Notice of Allowance dated Apr. 19, 2011 for U.S. Appl. No. 12/942,495.

ISR & WO dated Apr. 12, 2011 for International Application No. PCT/US2010/033445.

ISR & WO dated Apr. 12, 2011 for International Application No. PCT/US2010/033444.

ISR & WO dated Apr. 12, 2011 for International Application No. PCT/US2010/033446.

Restriction Requirement dated Dec. 20, 2010 for U.S. Appl. No. 12/149,933.

Notice of Allowance dated Dec. 9, 2010 for U.S. Appl. No. 12/611,733.

* cited by examiner

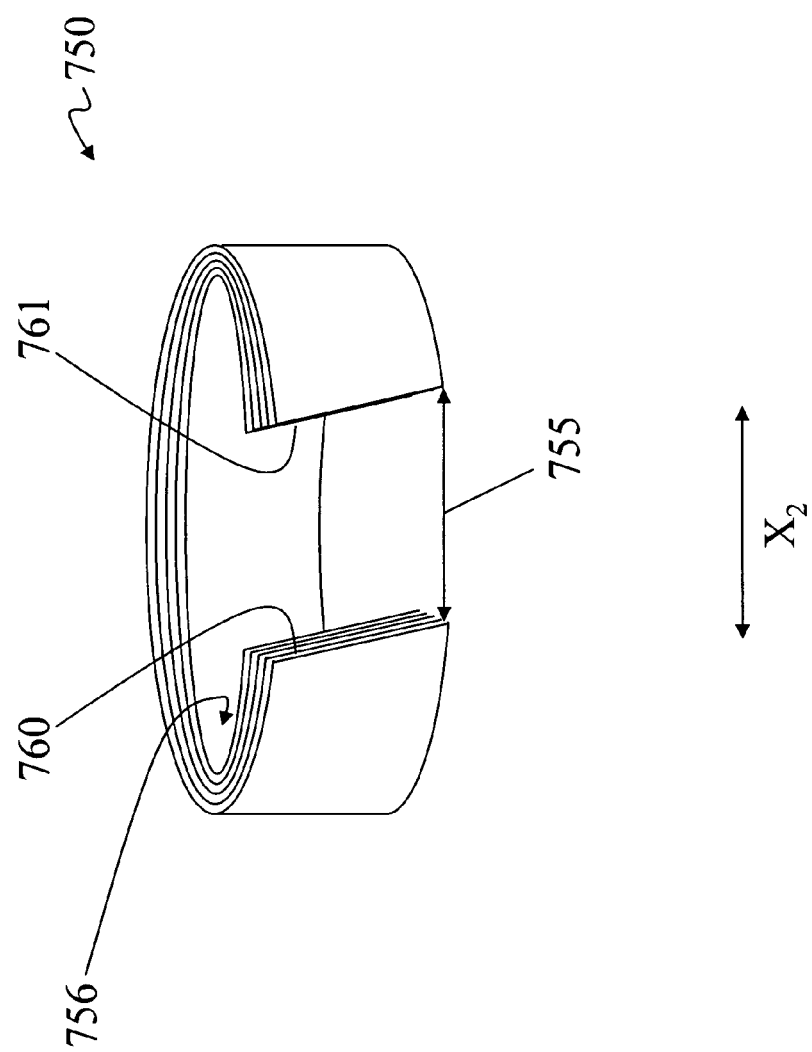

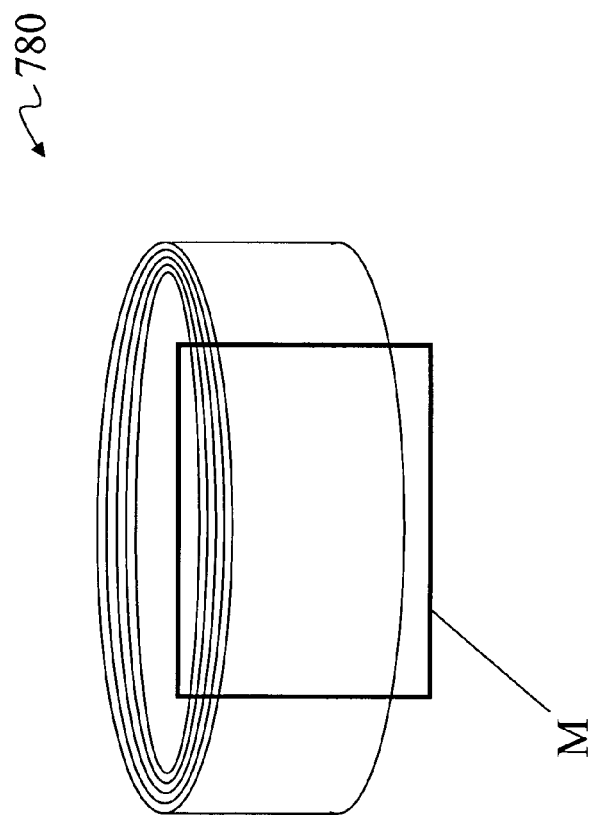

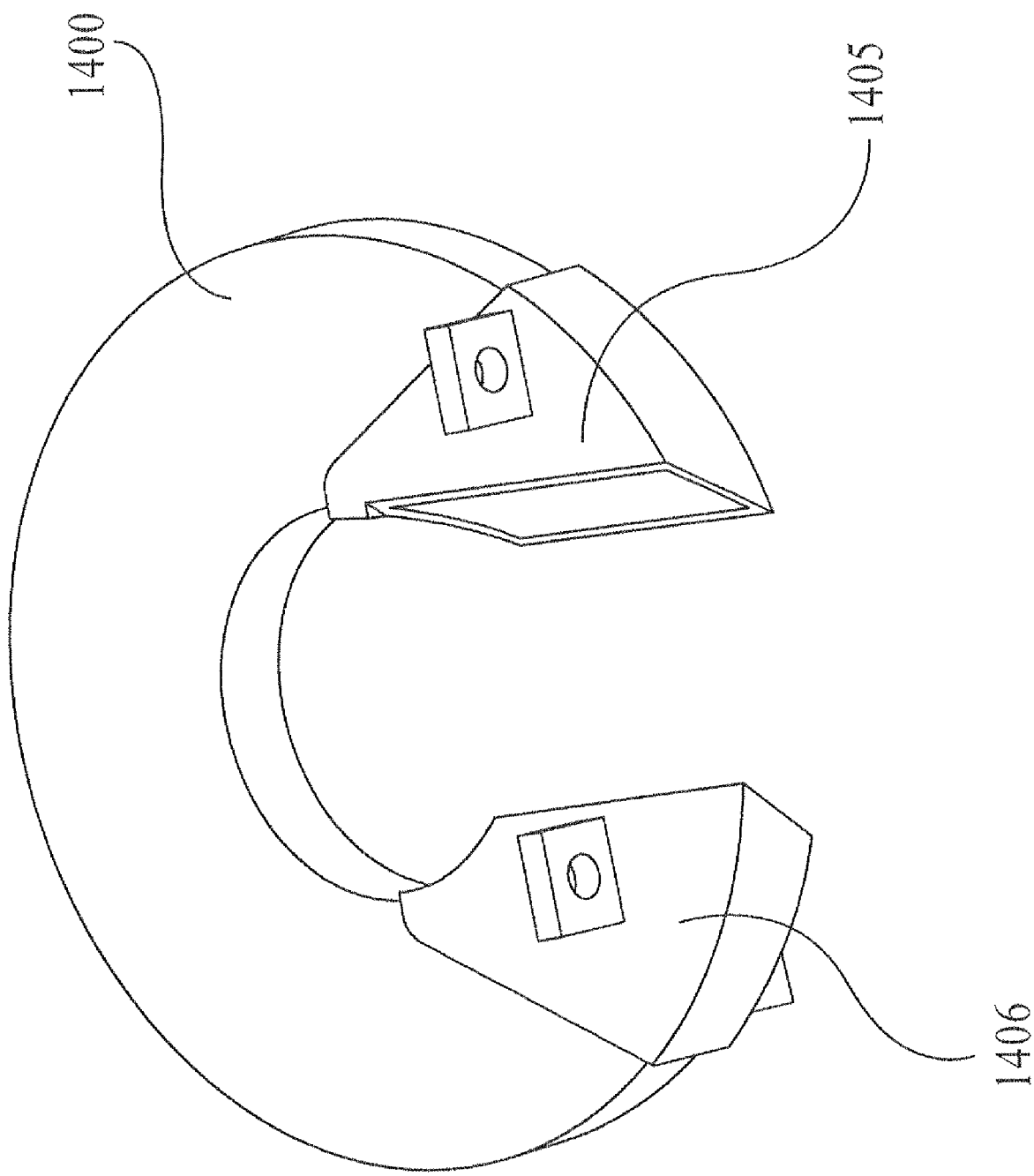

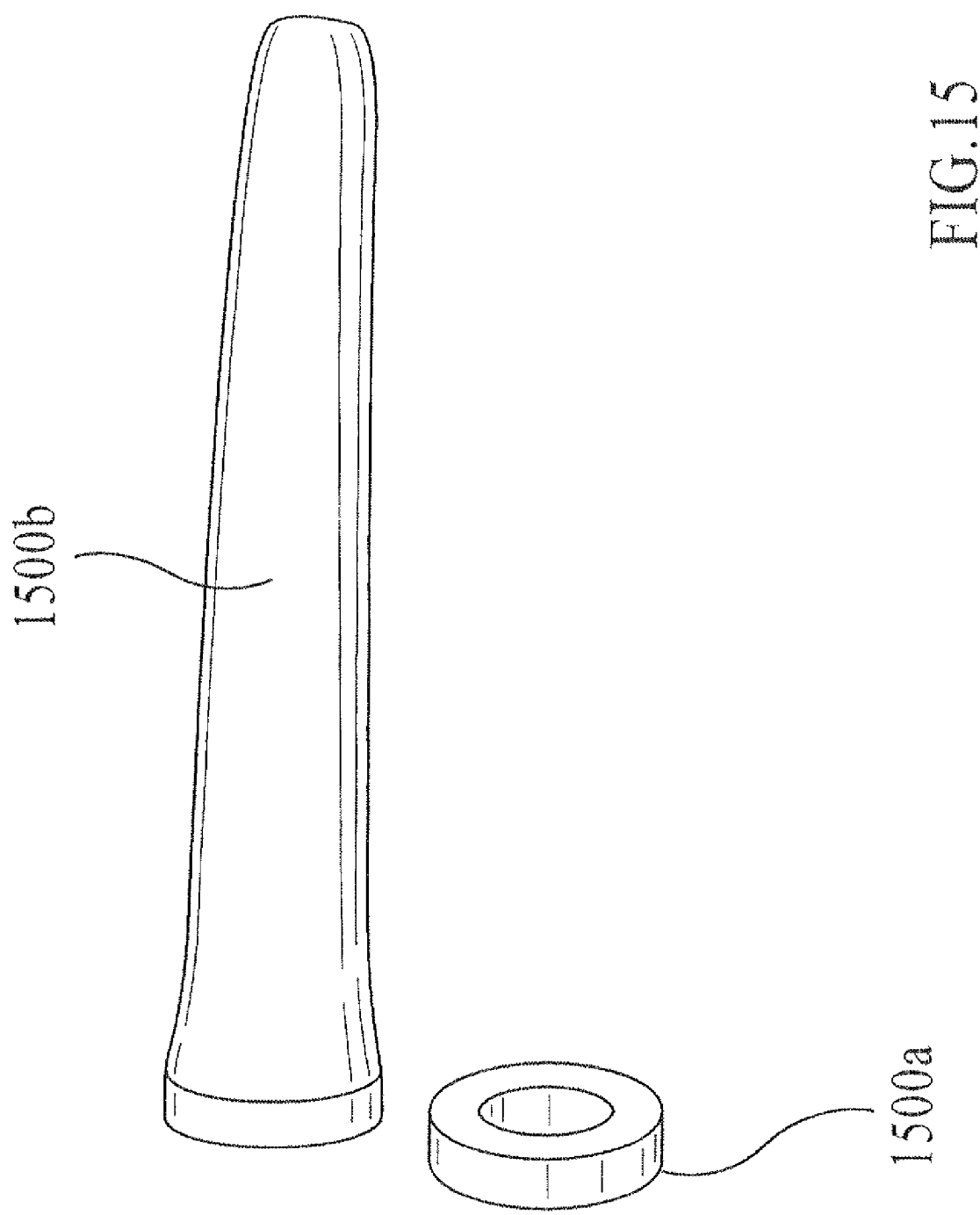

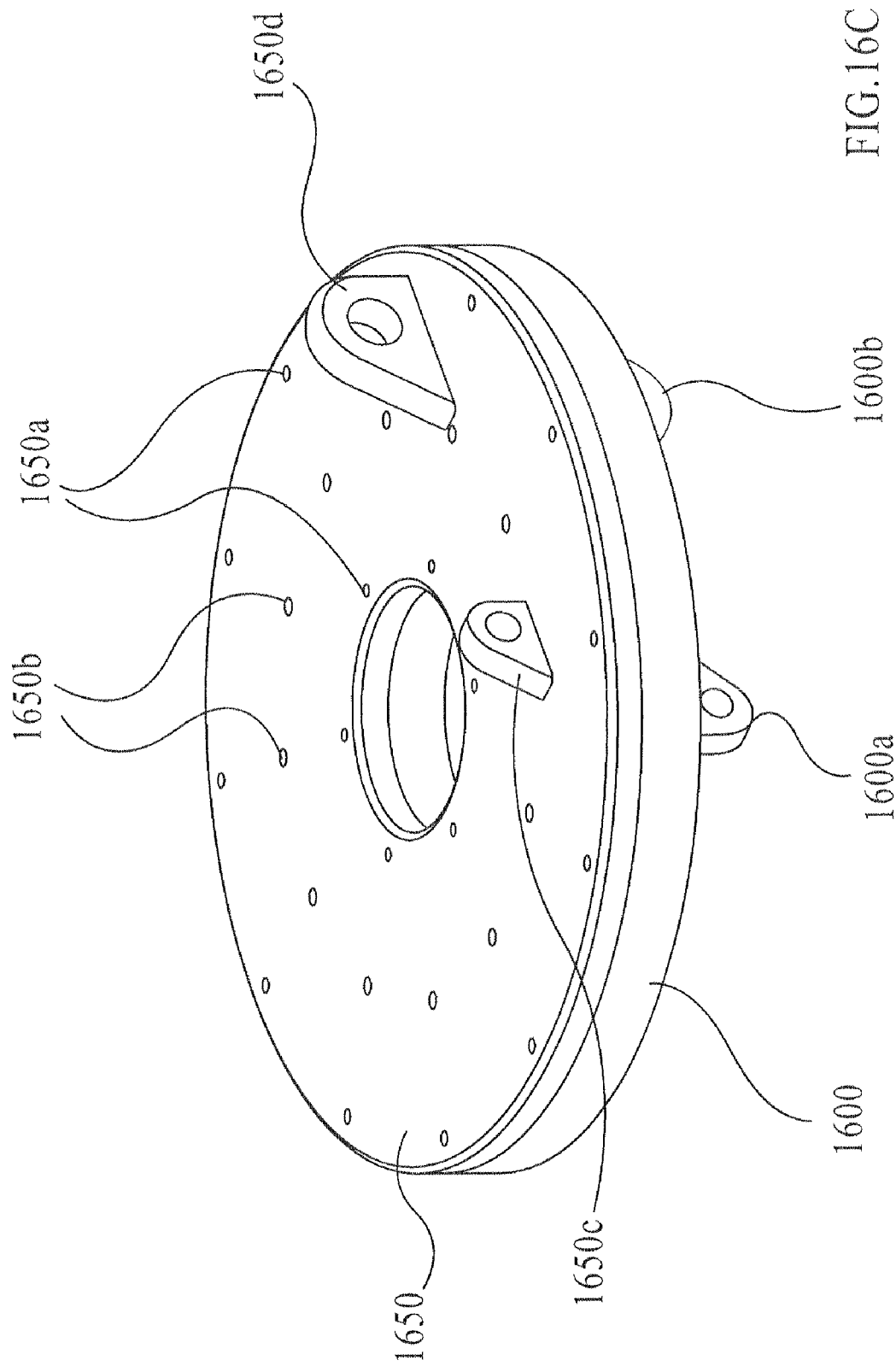

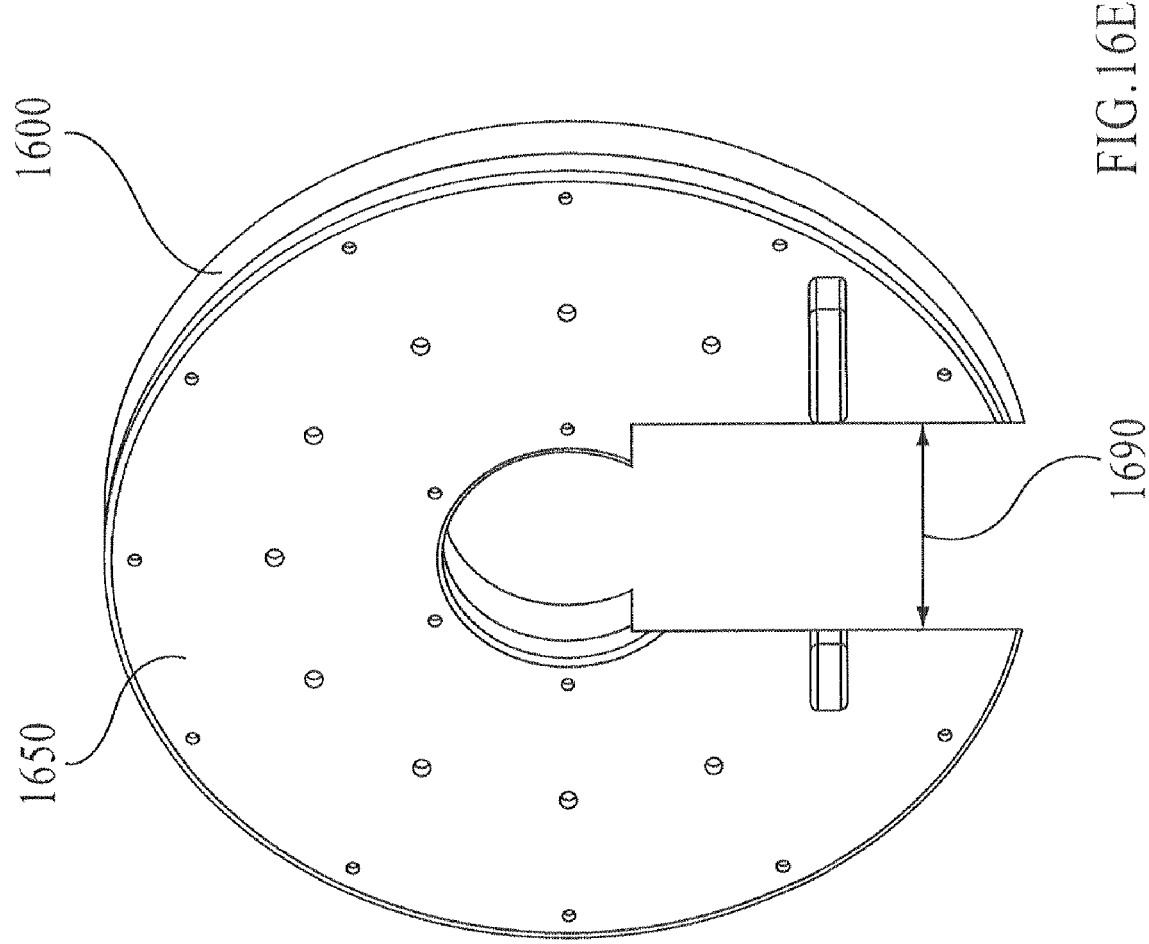

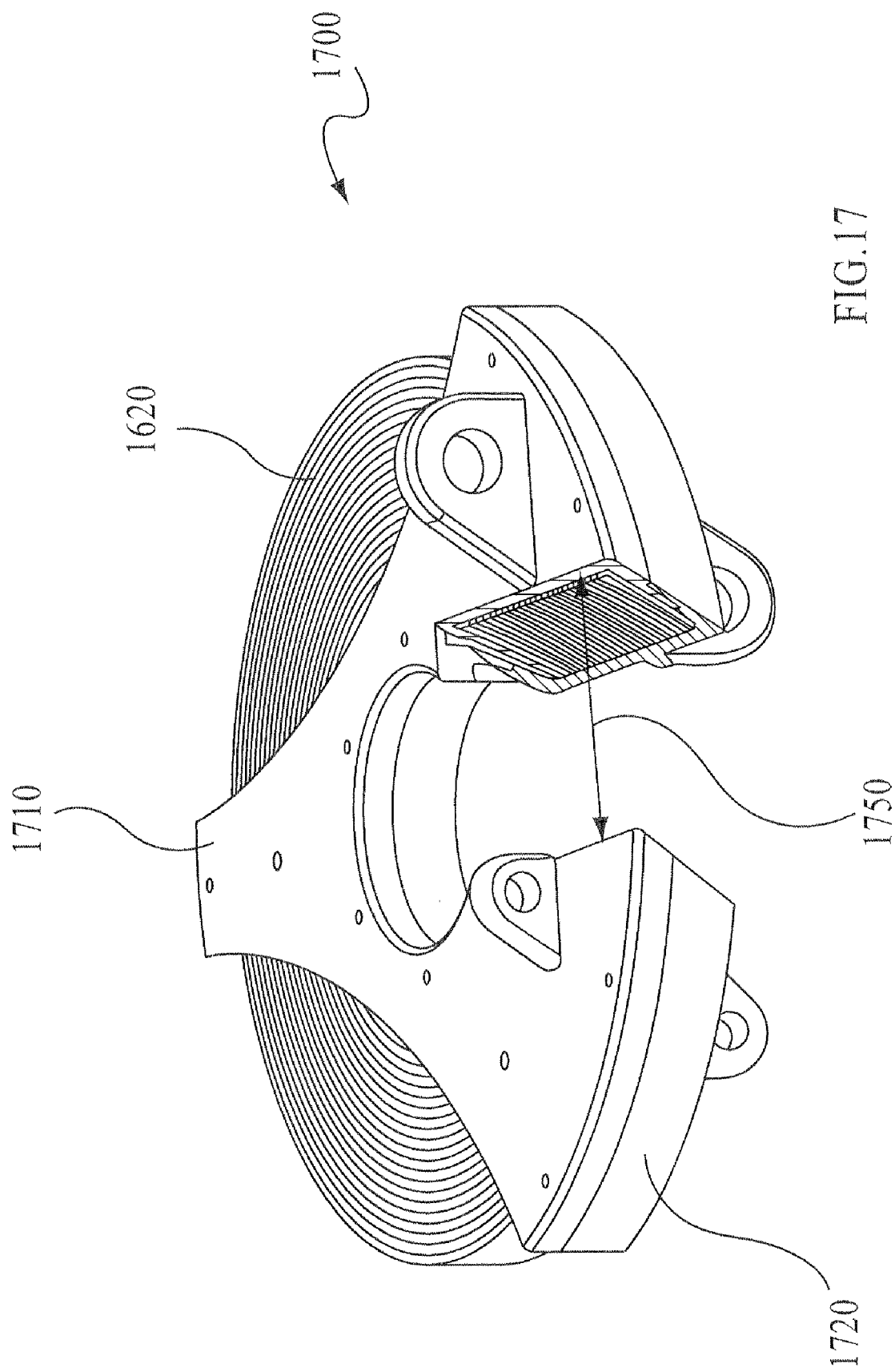

ELECTRICAL DEVICES HAVING TAPE WOUND CORE LAMINATE ROTOR OR STATOR ELEMENTS

This application claims priority to Applicant's U.S. Provisional Patent Application No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, U.S. Provisional Patent Application No. 61/064,162 titled "ELECTRICAL OUTPUT GENERATING DEVICES AND DRIVEN ELECTRICAL DEVICES, AND METHODS OF MAKING AND USING THE SAME" filed Feb. 20, 2008, U.S. Provisional Patent Application No. 61/064,161 titled "LAMINATE ROTOR OR STATOR ELEMENTS FOR ELECTRICAL OUTPUT GENERATING DEVICES AND DRIVEN ELECTRICAL DEVICES, AND METHODS OF MAKING AND USING SUCH ELEMENTS AND DEVICES" filed Feb. 20, 2008, U.S. patent application Ser. No. 12/149,931, titled "ELECTRICAL OUTPUT GENERATING DEVICES AND DRIVEN ELECTRICAL DEVICES USING ELECTROMAGNETIC ROTORS, AND METHODS OF MAKING AND USING THE SAME" filed May 9, 2008, U.S. patent application Ser. No. 12/149,935, titled "ELECTRICAL OUTPUT GENERATING DEVICES AND DRIVEN ELECTRICAL DEVICES WITH REDUCED FLUX LEAKAGE USING PERMANENT MAGNET COMPONENTS, AND METHODS OF MAKING AND USING THE SAME" filed May 9, 2008, and U.S. patent application Ser. No. 12/149,934, titled "ELECTRICAL OUTPUT GENERATING AND DRIVEN DEVICES USING DISK AND NON-DISK SHAPED ROTORS, AND METHODS OF MAKING AND USING THE SAME" filed May 9, 2008 and U.S. patent application Ser. No. 12/149,933, titled "POWDERED METAL MANUFACTURING METHOD AND DEVICES" filed May 9, 2008, the entirety of each of which is hereby incorporated by reference herein.

BACKGROUND OF THE INVENTION

1. Field of the Invention

Aspects of the present invention relate to the field of alternator or other electrical output generating devices and to electric motors and other electrically driven devices, and in particular to electrical output generating devices and electrically driven devices, and methods of making and use thereof, that, among other things, include rotor, stator, or other portions having laminate elements that reduce costs and complexity of manufacture, while in some cases allowing greater flexibility in operation over related art devices.

2. Background of the Technology

Existing multipole windings for alternators and electric motors typically require complex winding machines and often complex geometry windings in order to meet size and power needs. This problem is generally exacerbated with greater numbers of poles used. Greater numbers of poles have certain advantages, such as allowing higher voltage per turn, providing higher torque density, and producing voltage at a higher frequency.

There is an unmet need in the art for electrical output generating devices and electrically driven devices, and methods of manufacturing and use thereof, that improve efficiency of operation and reduce costs and complexity of manufacture, while allowing greater flexibility in operation over related art devices.

SUMMARY OF THE INVENTION

Particular variations of electrical output generating devices described in accordance with aspects of the present application may satisfy one or more of the above identified needs, as well as others, by providing electrical output generating devices and electrically driven devices, and methods of making and use thereof, that, among other things, include rotor, stator, or other portions having laminate elements that may reduce costs and complexity of manufacture, while allowing greater flexibility in operation over related art devices. With these features and others, aspects of the present invention thereby provide other advantages, such as enabling higher torque density to be obtained, and a wide speed range to be used, allowing flexibility in location of windings, and allowing such devices to operate at higher speeds and temperatures, without the need for enhanced cooling features.

Particular aspects of the present invention provide a more economical to manufacture and/or more efficiently operating electrical output generating devices and electrically driven devices over related art devices. Among other things, particular aspects of the present invention overcome some difficulties in manufacturing of many typical electrical output generating devices and electrically driven devices that use high numbers of and/or complex windings. In order to overcome problems with complex windings, among other things, particular aspects of the present invention provide for methods and features to allow flux paths to be used in operation, via flux conducting materials, comprising laminated and/or other portions, rather than requiring use of complex winding paths.

In a first exemplary aspect of the present invention, a rotor portion (or, alternately, if fixed for operation, a stator portion) has a plurality magnetic pole portions for conducting flux. The rotor is operated in conjunction with a plurality of laminate flux conducting material portions in a stator portion that nestably encompasses the rotor portion. The positions of the stator and rotor may be moved relative to one another. The stator portion further encompasses an output coil portion. In the first exemplary aspect of the present invention, the rotor portion is moveable, such that corresponding flux conducting material portions may generally be variably located in close proximity to one another. Among other things, this arrangement allows both field and output coils to be small in diameter (e.g., thereby having lower resistance), while allowing the flux conductors to be positioned as far as possible from the rotational center of the device (e.g., thereby allowing larger poles for transmitting greater flux, with wider spacing so as to reduce leakage).

Further, for example, the configuration of the first exemplary variation of a device decouples the number of poles from the physical area required for windings. In the related art using multiple windings for poles, for example, if the pole count is increased, the corresponding area available for each phase (e.g., for windings) is decreased. In contrast, with the first exemplary variation of the device, the number of poles is not limited by restrictions on physical space for windings. Among other things, this variation thereby allows much higher numbers of poles to be used (e.g., where optimal), with corresponding contribution to higher power density over such prior art approaches.

The configuration of the first exemplary variation of a device also allows the length of the output wire for the windings, for example, to be much shorter than related art multiple winding approaches allow. This advantage is obtainable, for example, because such windings do not have to thread around each pole, but only around a central pole. Among other things, this additional advantage allows much lower resistance power coils to be achieved, thereby producing higher efficiency and further reducing cost over prior art multiple winding devices.

Other aspects of the present invention relate to tape wound flux conducting material devices usable with stator and/or rotor portions of electrical output generating devices and electrically driven devices, and electrical output generating devices and other electrically driven devices using such tape wound flux conducting material devices. Yet other aspects of the present invention relate to adherence of windings to stator and/or rotor portions of such electrical output generating devices and/or electrically driven devices.

Other aspects of the present invention relate to manufacture and/or adaptation of tape wound flux conductors, including manufacturing such conductors using infused adhesive or other binding material, and use of containment features for cutting, holding, and securing such conductors.

Yet other aspects of the present invention relate to assembly methods for electrical output generating devices and/or electrically driven devices that incorporate tape wound flux conductors. These other aspects can include, for example, methods and features for housing prepared tape wound flux conductors within cassette-like holders for use in electrical output generating devices and/or electrically driven devices, including features to shape such tape wound flux conductors, and/or other features for improving operation and/or efficiency of such devices.

Additional advantages and novel features relating to electrical output generating devices and/or electrically driven devices will be set forth in part in the description that follows, and in part will become more apparent to those skilled in the art upon examination of the following or upon learning by practice of aspects of the invention.

BRIEF DESCRIPTION OF THE FIGURES

In the drawings:

FIGS. 13A-17 show several variations of containment housings for the tape wound core and manufacture and use thereof FIGS. 13A-17 show several variations of containment housings for the tape wound core and manufacture and use thereof;

DETAILED DESCRIPTION

Figure 1:
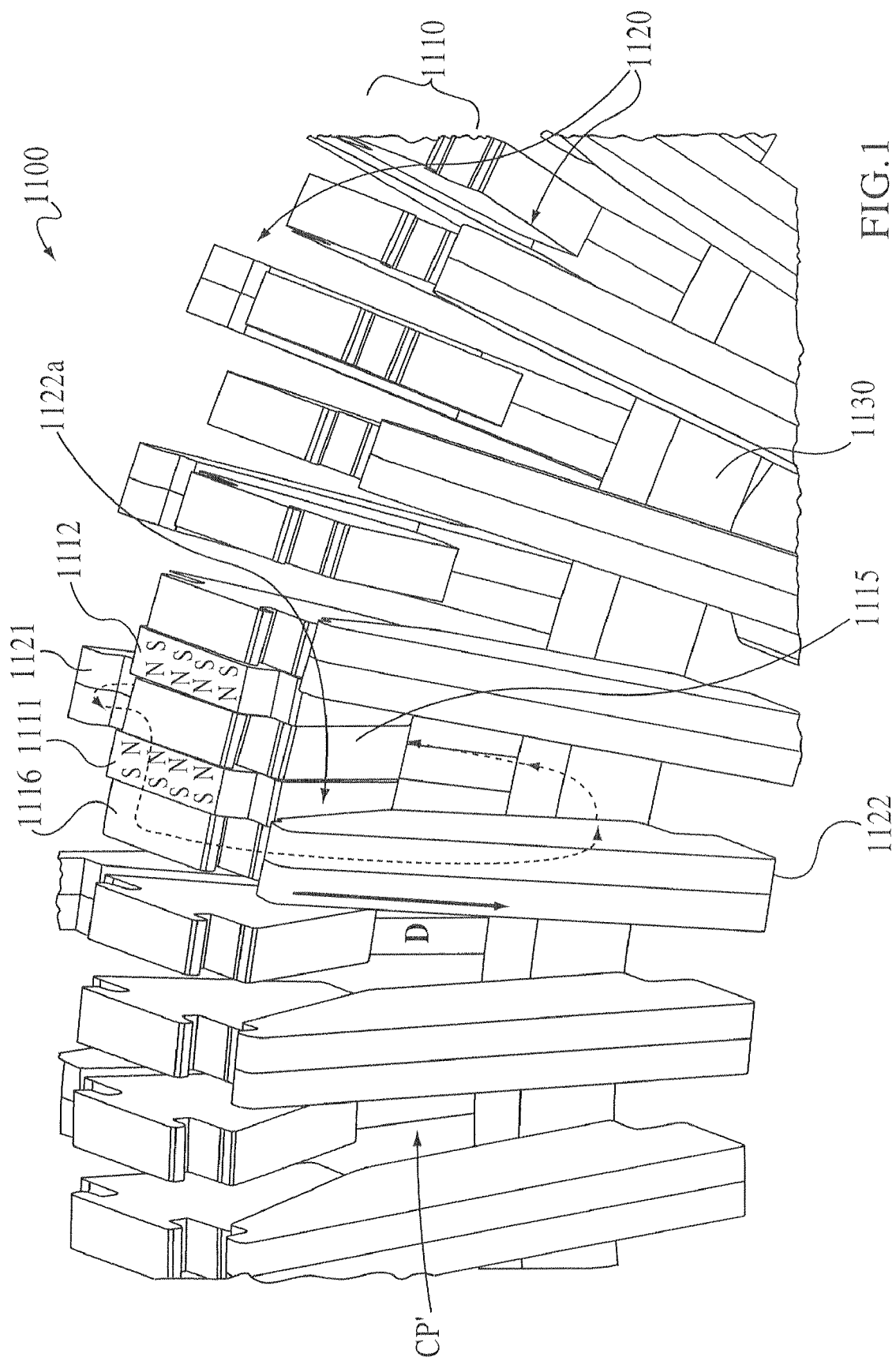
FIG. 1 shows the internal components of an exemplary electrical output device or electrically driven device in an assembled view, in accordance with a first variation of a device according to aspects of the present invention.

Aspects of the present invention and implementations thereof, are not limited to the specific components or assembly procedures disclosed herein. Many additional components and assembly procedures known in the art consistent with the intended electrical output generating devices, electrically driven devices, and/or assembly procedures for electrical output generating devices and/or electrically driven devices will become apparent for use with particular aspects and implementations from this disclosure. Accordingly, for example, although particular electrical output generating devices and/or electrically driven devices are disclosed, such electrical output generating devices and/or electrically driven devices and implementing components may comprise any shape, size, style, type, model, version, measurement, concentration, material, quantity, and/or the like usable for such electrical output generating devices and/or electrically driven devices and implementing components, consistent with the intended operation of electrical output generating devices and/or electrically driven devices.

Description of exemplary aspects and implementations of electrical output generating devices and/or electrically driven devices will now be made with reference to the appended drawings.

Disk Type Device with Sandwiched Flux Conducting Features

FIGS. 1-4B (which are similar to FIGS. 12-15A of Applicant's co-pending U.S. patent application Ser. No. 12/149,934, now U.S. Pat. No. 7,868,511 titled "ELECTRICAL DEVICES USING DISK AND NON-DISK SHAPED ROTORS" filed May 9, 2008, and corresponding U.S. Provisional Patent Appl. No. 61/064,162 titled "ELECTRICAL OUTPUT GENERATING DEVICES AND DRIVEN ELECTRICAL DEVICES, AND METHODS OF MAKING AND USING THE SAME" filed Feb. 20, 2008) present diagrams of portions of an exemplary device, in accordance with aspects of the present invention. The illustrative device of FIGS. 1-4B is somewhat similar in overall shape and/or outward appearance to that of FIGS. 9A-11 of Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, and similar device description is provided in portions of Applicant's co-pending U.S. patent application Ser. No. 12/149,934, now U.S. Pat. No. 7,868,511 titled "ELECTRICAL DEVICES USING DISK AND NON-DISK SHAPED ROTORS" filed May 9, 2008, and corresponding U.S. Provisional Patent Appl. No. 61/064,162 titled "ELECTRICAL OUTPUT GENERATING DEVICES AND DRIVEN ELECTRICAL DEVICES, AND METHODS OF MAKING AND USING THE SAME" filed Feb. 20, 2008. Exemplary aspects of devices having layouts generally as shown in conjunction with FIGS. 1-4B are interchangeably referred to herein as being "disk type."

Although variations shown herein generally have magnets on the rotor portion and flux conducting extensions on the stator, it should be noted that other, variations may be made in accordance with aspects of the present invention. For example, flux conductive extensions may be mounted onto the rotor, and a series of permanent magnets onto the stator portion. Alternatively, flux conductive extensions can be mounted onto the rotor and an electromagnet onto the stator portion substantially reversing a configuration shown herein. A number of other relationships between the stator and rotor are also possible, not limited to mounting either the stator or the rotor as the exterior-most component or rearranging magnets and flux conductive extensions in order to conduct magnetic flux in such a way as to either generate electrical output or to drive the rotor. In addition, flux conductive extensions and either permanent or electromagnets can be mounted to the same component, e.g., to the rotor or stator assembly.

FIG. 1 shows a sectional view of a device 1100 having a rotor portion 1110, a stator portion 1120, and a coil portion (for clarity of illustration, the coil is not shown in FIG. 1; see location for coil portion CP' indicated). (Note: although the device portion 1110 is referred to as a rotor portion and the portion 1120 is referred to as a stator portion with respect to FIGS. 1-3 and similarly with respect to FIGS. 4A-4C, the device 1100 may alternatively be constructed or operated such that portion 1110 is fixed so as to serve as the stator portion, with the portion 1120 rotating, so as to serve as the rotor portion; further, the coil may be designed to be fixed to the stator portion or rotated with the rotor portion, depending on the implementation and/or need.) As shown in FIG. 1, the rotor portion 1110 includes alternating pairs of magnet portions (e.g., example magnet portions 1111, 1112, only a single pair of which is shown for clarity of illustration) sandwiching flux conducting portion 1115. The magnet portions are oriented such that only edges of a single polarity from both sandwiching magnet portions abut the sandwiched conducting portion (e.g., North polarity "N" for both magnet portions 1111, 1112 abutting sandwiched conducting portion 1115; similarly, only alternating South polarity "S" magnetic portions abut alternating conducting portions, such as conducting portion 1116). The stator portion 1120 includes first stator extensions 1121 and second stator extensions 1122, as well as a core portion 1130.

The first stator extensions 1121, second stator extensions 1122, and core portion 1130 of the stator portion 1120 about the entire circumference of the device 1100 form a generally disk or torroidal shaped rotor. The magnet portions 1111, 1112 and flux conducting portions 1115, 1116 of the rotor portion 1110 about the entire circumference of the device 1100 form a generally disk or torroidal shape that nestably fits at the outer periphery of the stator portion 1120.

In operation, the rotor portion 1110 is rotatable relative to the stator portion 1120. When an energizing current (e.g., alternating current, AC) is provided to the coil, at the position shown in FIG. 1, a flux is transmitted through the first stator extension 1121, a first one of the flux conducting portions 1115, the magnet portion 1111, a second one of the flux conducting portions 1116, the second stator extension 1122, and the core 1130. Similarly to other variations of devices described in Applicant's co-pending U.S. patent application Ser. No. 12/149,931, now U.S. Pat. No. 7,800,275 titled "ELECTRICAL USING ELECTROMAGNETIC ROTORS" filed May 9, 2008, claiming priority to U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, the relative positions of the stator extensions 1121, 1122 may be varied so as to effect proper "timing" for most efficient or other operation of the device. For example, relative position may be varied in order to vary output, such as when power generation is not needed or needs to be reduced.

Figure 2:
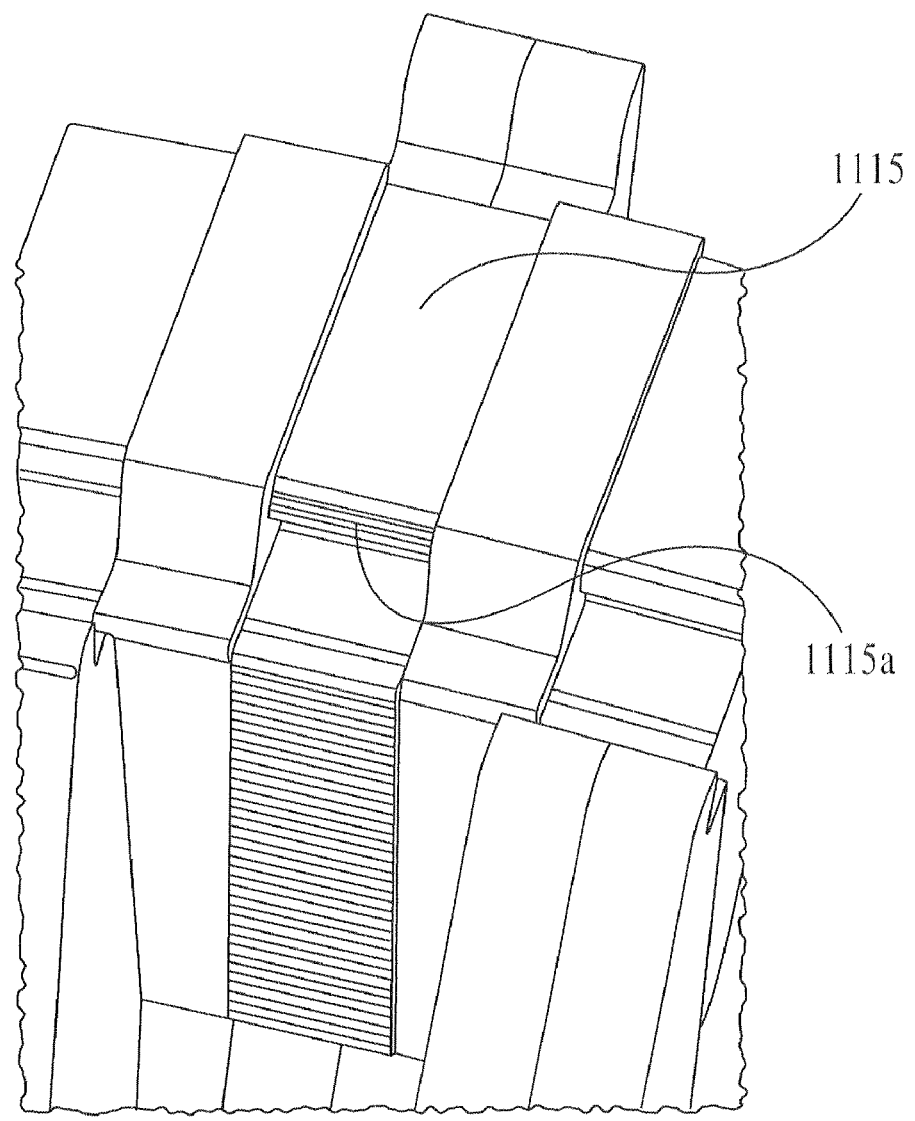
FIGS. 2-4B present diagrams of portions and views of the exemplary device of FIG. 1.
Figure 3:
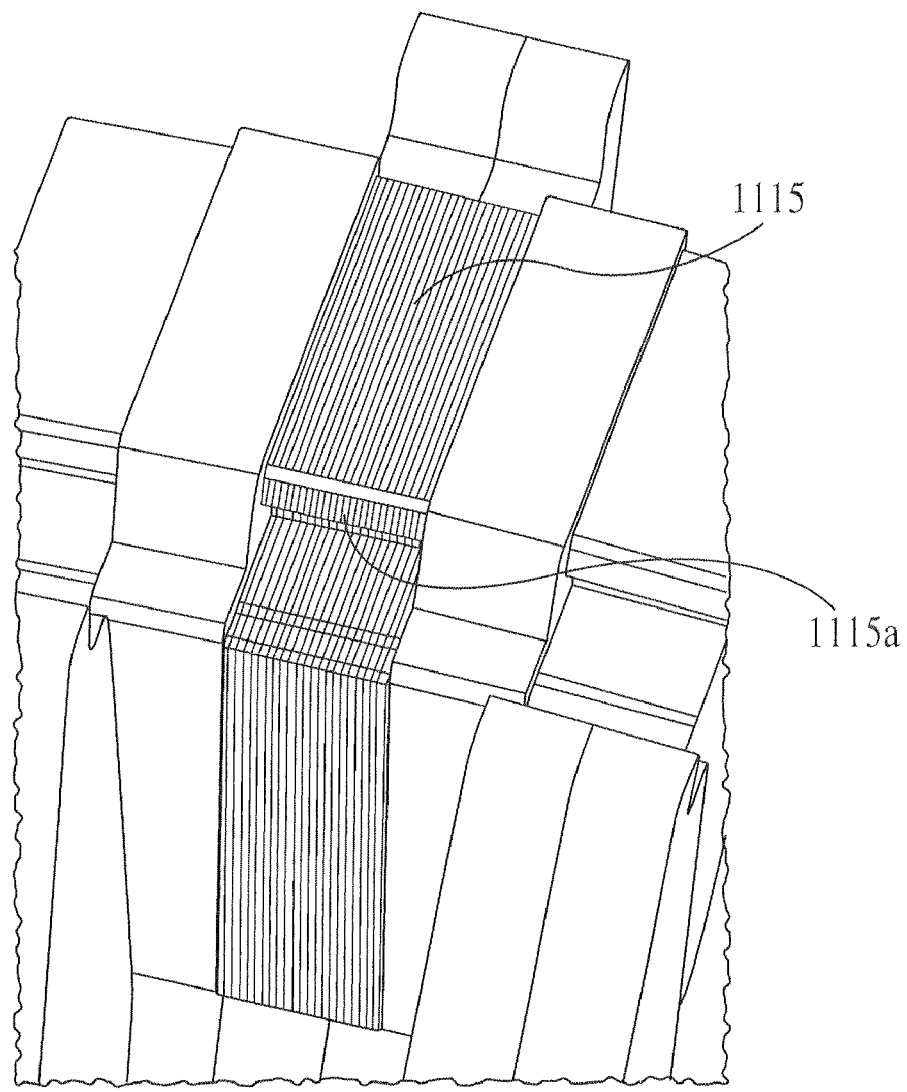

The shapes of the rotor portions 1110 for the exemplary device of FIGS. 1-3 are selected to enhance overall the strength and ease construction of the device 1100, among other things. For example, in one illustrative variation, as shown in FIG. 2, the flux conducting portions 1115 may comprise stacked laminated steel (or other flux conducting material) and having extension portions 1115a for securing the rotor to a hub having mating extensions (see e.g., FIG. 4A). In the variation of FIG. 2, assembly of the flux conducting portions 1115 is eased by stacking the laminations from the inner radius to the outer radius of the device 1100. Among other things, the orientation of the laminations may be varied to enhance flux transmission in the direction of flow across each flux conducting portion 1115 between the stator extensions 1121, 1122 (e.g., the planar surfaces of the laminations are parallel to the direction of flux transmission, thereby reducing eddy currents and/or other losses relating to operation in the absence of laminated parts).

In another illustrative variation, as shown in FIG. 3, the flux conducting portions 1115 are assembled using laminations oriented in a radial direction. Among other advantages, this approach eases assembly (e.g., by allowing each lamination to be identical) and enhances mechanical strength of the flux conducting portions (e.g., each lamination is mechanically secured by the hub at the extensions 1115a, rather than requiring a securing feature between laminations in the inner to outer radial direction, as may be needed for some assemblies of laminations for the exemplary variation of FIG. 2).

In some variations of devices in accordance with aspects of the present invention, cogging and noise reduction techniques are used for the device. For example, in some variations, when some of the rotor extensions 1121, 1122 are aligned relative to proximate stator flux conducting portions 1115 at a given rotational position of the stator/rotor 1120/1110, other rotor extensions 1121, 1122 are not so aligned relative to proximate flux conducting portions 1115, and vice versa when the other rotor extensions 1121, 1122 are aligned with corresponding flux conducting portions 1115. In other variations, the shapes and sizes of the flux conducting portions 1115 and/or magnet portions 1111, 1112 vary slightly about the radial direction of the device 1100, so as to reduce cogging and noise. Further, orientation of the flux conductors and/or magnets at an angle relative to the circumferential path of the rotor may be used to reduce noise and/or cogging.

Figure 4A:
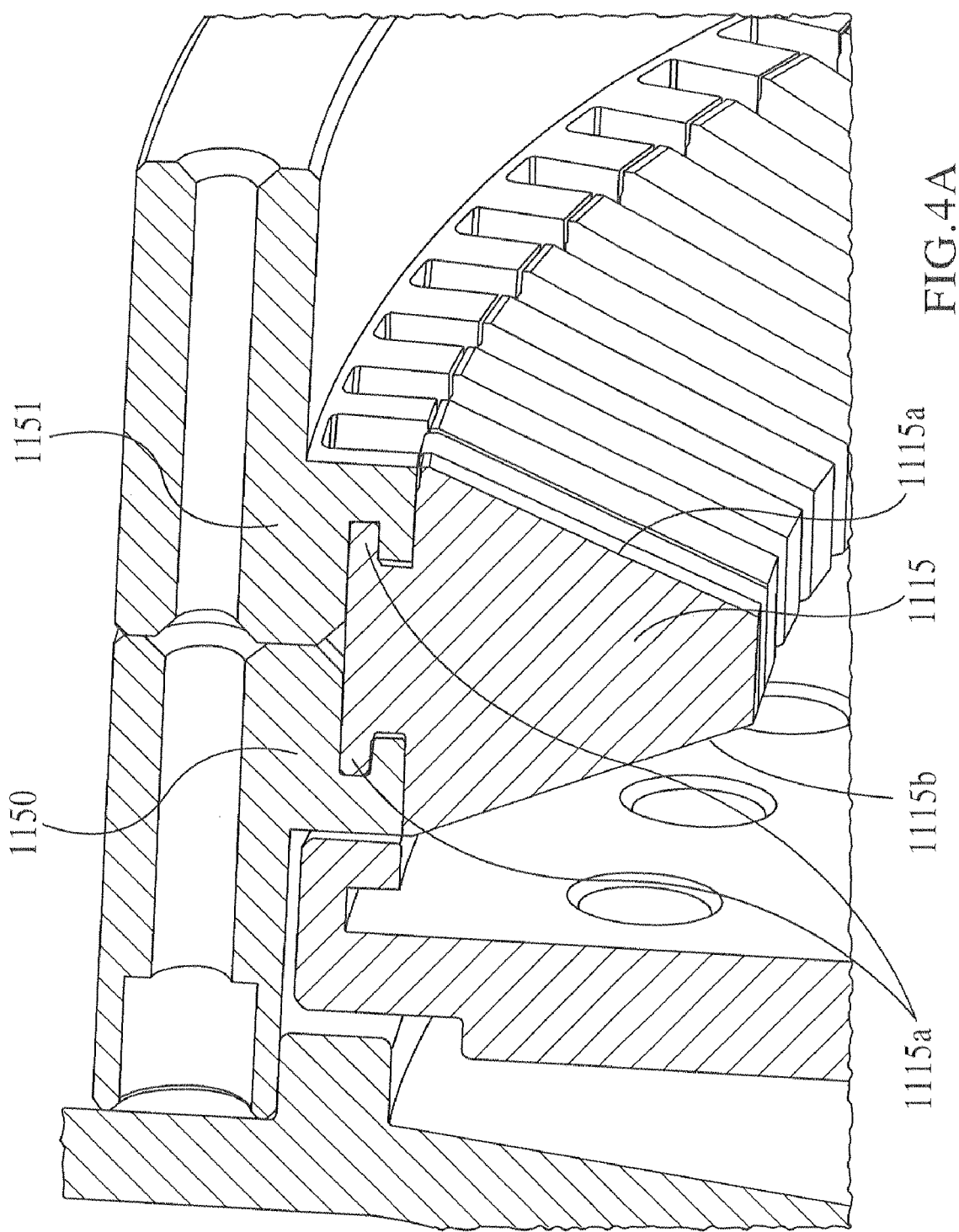

FIG. 4A shows an end view of exemplary two piece flux concentrator/magnet supporting ring 1150, 1151 for use in assembling flux conducting portions and/or magnets sandwiched therebetween 1115 having extension portions 1115a.

Figure 4B:
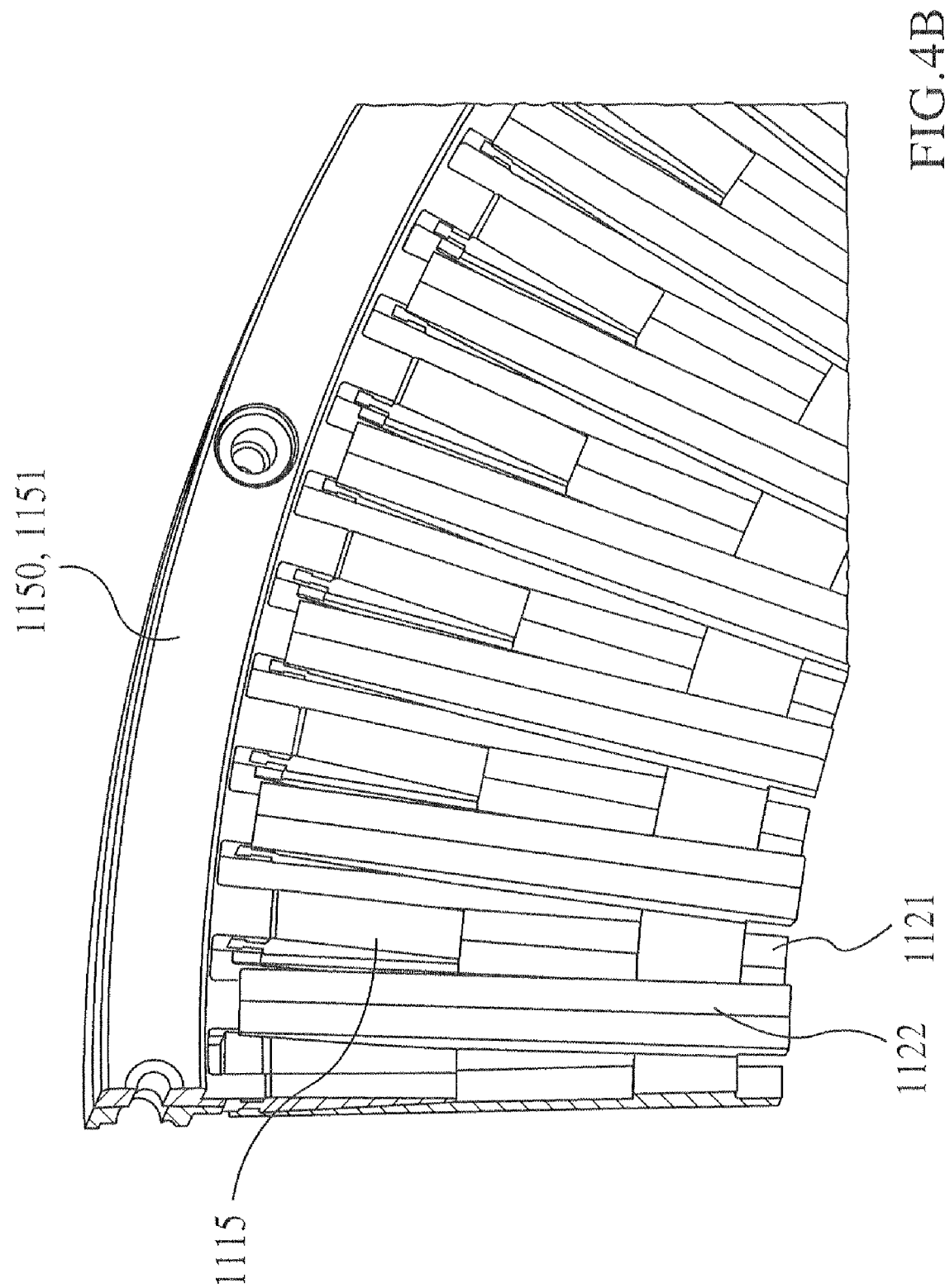

FIG. 4B shows a partial side view of the exemplary two piece ring 1150, 1151 of FIG. 4A. Hoop strength, a property of the ring 1150, 1151 to resist initial binding loads occurring as a result of attraction of the magnet portions to the nearest flux conducting portions can be important in some variations of devices in accordance with aspects of the present invention to allow practical operation, particularly for high strength magnets and/or multiple phases and/or designs having higher axial thrust loads.

In some variations of the ring 1150, 1151 of FIGS. 4A and 4B, the portions of the ring 1150, 1151 engaging the extension portions 1115a comprise and/or are coated with a non-magenetically conducting material to prevent "shorting" of the flux conducting path between flux conducting material and/or magnet portions 1115. In accordance with aspects of the present invention, ring portions 1150, 1151 primarily or entirely comprise non-magnetically conducting material.

Figure 4C:
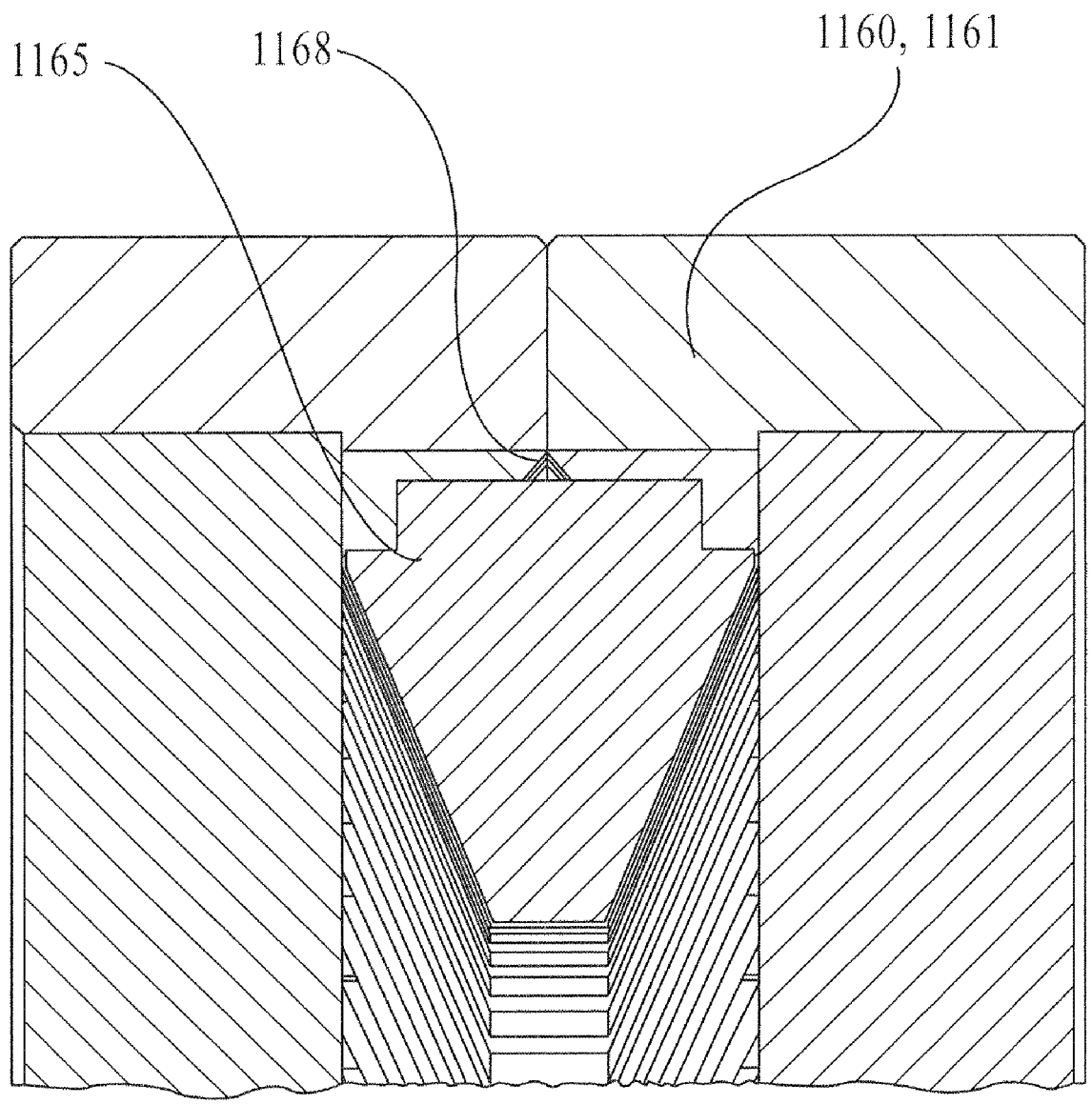

FIG. 4C presents another exemplary variation of a two piece flux concentrator/magnet supporting ring 1160, 1161 for use in assembling flux conducting portions and/or magnets sandwiched therebetween 1165. In this illustrative example, the ring portions 1160, 1161 form a recess 1168 (also interchangeably referred to herein as a "notch"). In some variations, an adhesive (e.g., epoxy) or other binding material or feature is emplaced within recess 1168 to retain or assist in retaining (e.g., along with frictional retention) of the magnets and/or flux conducting portions 1165.

The shape and orientations of the magnet and flux conducting portions shown in the variations of device components of FIGS. 1-4C may provide some particular advantages over other shapes and orientations. For example, the generally triangular shape of the rotor magnet and flux conducting portions (1115 in FIGS. 1-4B; 1165 in FIG. 4C) may be oriented and shaped such that the magnet portions, in particular, are relatively thin in width, so as to maximize ease of flux travel therethrough in the width direction. The angled sides of these portions (see, e.g., sides 1115a, 1115b shown in FIG. 4A) may have increased length over sides for a square or rectangular portion of the same length, thereby increasing the potential area for flux travel through these sides and into/from flux conducting stator extensions (e.g., extensions 1121, 1122 of FIG. 1) proximate thereto during operation. Similarly, the corresponding angled sides (see, e.g., angled side 1122a of extension 1122 shown in FIG. 1) of the flux conducting extensions may provide greater cross-sectional area as the flux travels lengthwise through the extensions in the outer to the inner radial direction (e.g., direction D shown in FIG. 1). This greater cross-sectional area can enhance flux travel efficiency, for example, by providing the increased cross-sectional area (e.g., along direction D) as a function of flux travel into the angled side 1122a (i.e., more cross-sectional area for flux conducting is available coincidentally with additional flux input into the extension 1122 as flux flows into the extension 1122 and travels in the direction D through the extension 1122).

Tape Wound Flux Conductor Features

Among additional problems with manufacture and operation of aspects of the present invention are difficulties in addressing high temperature issues and/or high losses, particularly at high speed operation of electric motors, alternators, and other driving and/or driven devices. Some elements of these problems relate to the higher pole pitch and/or associated higher magnetic frequencies within the flux conducting materials (e.g., 120 poles in some exemplary variations of driving and/or driven devices).

Further, some aspects of these devices give rise to difficulties with manufacturing. For example, one approach to flux conduction in stator and/or rotor elements involves use of laminate flux conducting materials. However, manufacturing of such components can be difficult, depending on the geometry, the number of poles of the device, and the preferred direction of lamination, among other issues.

In accordance with these and other problems, aspects of the present invention include use of specialized materials to address temperature, losses, and manufacturing difficulties, while maintaining advantages of laminate features for certain components of devices.

Aspects of the present invention include use of specialized thin profile materials that have flux conducting properties and/or that comprise materials that resist effects of high temperature and other effects of high speed operation under certain circumstances, such as Metglas® brand material, made by Metglas, Inc., of Conway, S.C., a wholly owned subsidiary of Hitachi Metals America, Ltd. In addition, use of thin profile materials in the manner and orientations discussed further below may reduce some losses (e.g., eddy-current losses) that may occur with use of other materials, such as powdered metal.

For example, Metglas® brand material is manufactured using a process involving high speed cooling of a sprayed metal (e.g., a flux conducting metal) that comprises Amorphous Metals, also known as metallic glass alloys, which differ from traditional metals in that they have a non-crystalline structure and possess specialized physical and magnetic properties that combine strength and hardness with flexibility and toughness (see, e.g., http://www.metglas.com/about.htm as viewed Feb. 3, 2008, which is incorporated herein by reference in its entirety). As stated at http://www.metglas-.com/faq/?faq_id=1, as viewed on Feb. 3, 2008, the entirety of which is also incorporated by reference herein:

> Amorphous metal does not have crystalline structure like other magnetic materials. All the atoms in an amorphous metal are randomly arranged, thus giving it a higher resistivity (about three times) value than that for crystalline counterparts. Amorphous alloys are prepared by cooling the melt at about million degrees per second. This fast cooling does not give the atoms enough time to rearrange into stable crystalline form. As a result one gets metastable amorphous structure. Because of the absence of crystalline structure amorphous alloys are magnetically soft (lower coercivity, lower core loss, higher permeability, . . . ). High resistivity gives lower loss at higher frequencies. The losses are among the lowest of any known magnetic materials.

As a result of the above described process, for example, Metglas® brand material, while having excellent flux conducing properties (e.g., permeability of Metglas® brand material, for example, may be up to hundreds of thousands of times the permeability of silicon steel), is also resistant to the effects of heat and losses (e.g., losses for devices using Metglas® brand material, compared to these using silicon steel, may be reduced from about 800 watts to about 30 watts or less, in some exemplary applications), such as may occur with high speed operation of devices in accordance with aspects of the present invention, and such that higher speed operation may be obtained without the need for auxiliary cooling, for example (e.g., 10 times the speed of operation of a device using Metglas® brand material in place of silicon steel). In turn, these features allow the power to weight ratios of devices to correspondingly increase.

Figure 5:
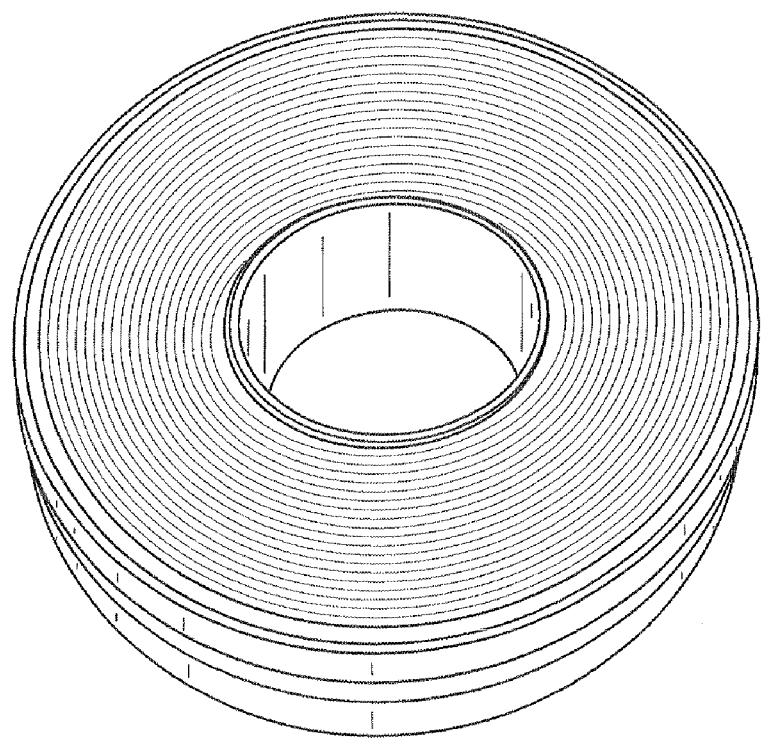
FIG. 5 is an exemplary tape-like roll flux conducting material product for use in accordance with aspects of the present invention.

As available in standard manufacturing form, Metglas® brand material is often in tape-like rolls (see, e.g., the Photostat image of an unmodified Metglas® brand material exemplary tape-like roll product shown in FIG. 5; the exemplary device of FIG. 5 is approximately an inch to an inch and a half in diameter, although other sizes may be produced and utilized with aspects of the present invention, depending on the particular application). The tape-like thickness may, for example be on the order of 20 microns.

Problems with such Metglas® brand material products with respect to use in conjunction with aspects of the present invention include that such products are crystalline in structure, and, as such, may be both hard and brittle. As a result, bending or other manipulation of the products may result in damage. The effects of these features in terms of handling difficulties can, for example, be analogized to handling mica. Because of these properties, as well as limitations on use as a result of the typical manufactured form of such materials and products (e.g., very thin profile tape-like rolls), these materials and products have not typically been amenable for use in related art electric motor applications.

However, aspects of the present invention are amenable to certain applications and devices described herein. For example, in some variations of electrical output generating devices and/or electrically driven devices in accordance with aspects of the present invention, flux conducting materials are also used inside certain coil portions (e.g., within the coil portions 140, 170 and between the flux conducting material portions 150, 160, as shown in FIGS. 1 and 2 of Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007). One problem with the geometry of using the flux conducting materials within the coil portions 140, 170 shown in the arrangement of FIGS. 1 and 2 of that application, and in other locations having similar physical size limitations, is that the thickness of, for example, steel (or other flux conducting material) laminate layers may be generally pie-shaped and narrow significantly near the center of the coil portions 140, 170.

In some variations of electrical output generating devices and/or electrically driven devices in accordance with aspects of the present invention, the problem with physical size limitations, such as occurs within coil portions, may be addressed by using torroidal shaped flux conducting portions comprised of tape-like wound laminations. With these variations, the flux conducting material portions 150, 160 abut the torroidal shaped portion within the coil portions 140, 170.

Figure 6A:
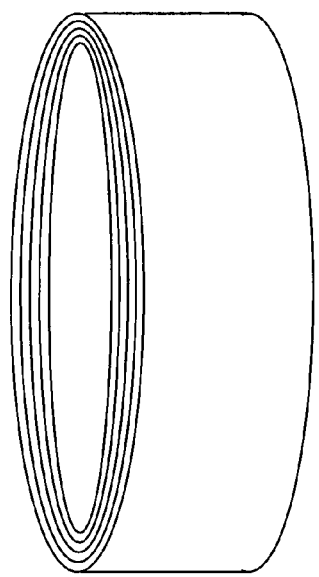
FIGS. 6A and 6B show a representative perspective drawing and a partial cutaway drawing of an exemplary square or rectangular cross-sectionally shaped torroidal flux conductor, in accordance with aspects of the present invention.
Figure 6B:
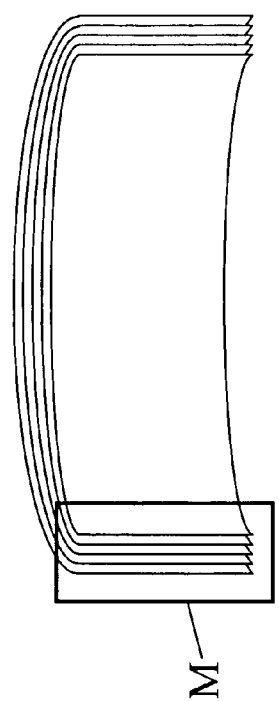
Figure 6C:
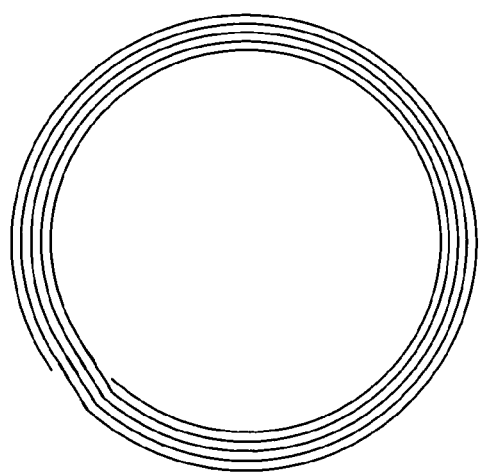

In some variations, the torroidal shape of this portion of the flux conducting material has a generally square or rectangular cross-sectional shape. The torroid may comprise flux conducting material in a tape-like form. FIGS. 6A-6C present representative views of the flux conducting torroidal shape, in accordance with this variation. FIGS. 6A and 6B show a representative perspective drawing and a partial cutaway drawing of an exemplary rectangular cross-sectionally shaped (see, e.g., area M of FIG. 6B) torroidal flux conductor. FIG. 6C is a representative drawing of the winding used to create the torroidal flux conductor of FIG. 1 from a side view, showing the "tape-like" wind features.

A similar result for this portion of the device (e.g., minimizing eddy current effects and/or otherwise enhancing flux transmission) can be achieved using powdered iron; however, powdered iron generally does not conduct magnetic flux as efficiently as, for example, steel laminate (or other flux conducting material, such as Metglas® brand material) and does not include the physical layer features potentially useful in minimizing or otherwise addressing eddy current and other losses. In addition, the use of powdered iron has the further drawback of increased hysteresis losses.

Application of Tape Wound Flux Conductors to Stators and Rotors in Accordance with Aspects of the Present Invention Other features of problems with addressing high speed and/or high temperature applications of aspects of the present invention, as shown and described above with respect to FIGS. 1-4B, as well as, for example, in Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, is the issue of how to form flux conducting paths in, for example, stator portions, such that the paths transmit flux from one radial location on a first side of a rotor portion to a second radial location on a second side of a rotor portion (e.g., the path from first stator extensions 1121 to second stator extensions 1122 shown in FIG. 1, essentially completing a flux path between flux conducting portion 1115 and flux conducting portion 1116 of the rotor portion 1110).

As further shown, for example, in FIG. 3, above, and text relating thereto, conducting portions 1115 may comprise stacked laminated steel or other flux conducting material having a laminate axial direction parallel to the radial direction of the device, as shown in FIG. 3. Similarly, manufacturing and operation of devices in accordance with some aspects of the present invention may benefit from use of a similar laminate type approach for certain features, such as the stator extensions 1121, 1122 shown in FIG. 1.

One approach to manufacture of such laminate type flux conducting portions of, for example, stator portions of a device in accordance with aspects of the present invention is to utilize a sectioned tape-like product shown in FIG. 5 (which is essentially similar to the representative diagram of a tape-like roll conducting torroidal shape of FIGS. 6A-6C).

Figure 7A:
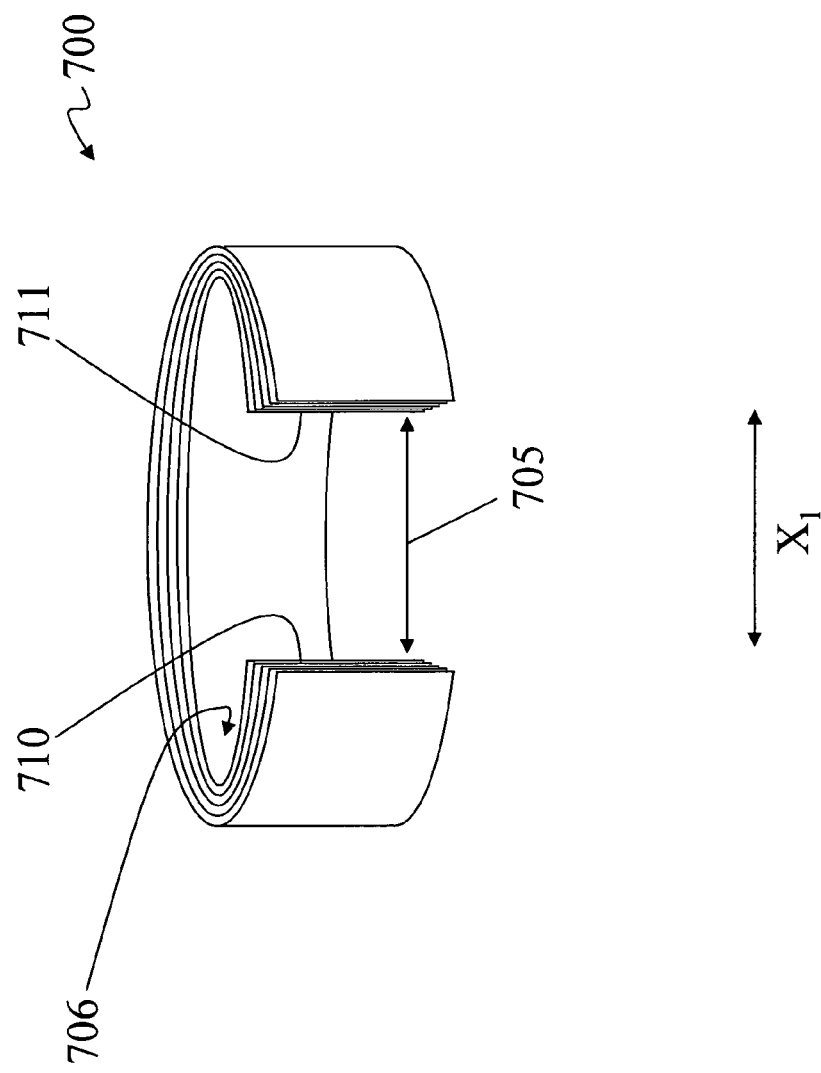
FIGS. 7A-7D show exemplary sectioned tape-like flux conducting features in accordance with aspects of the present invention.
Figure 7C:
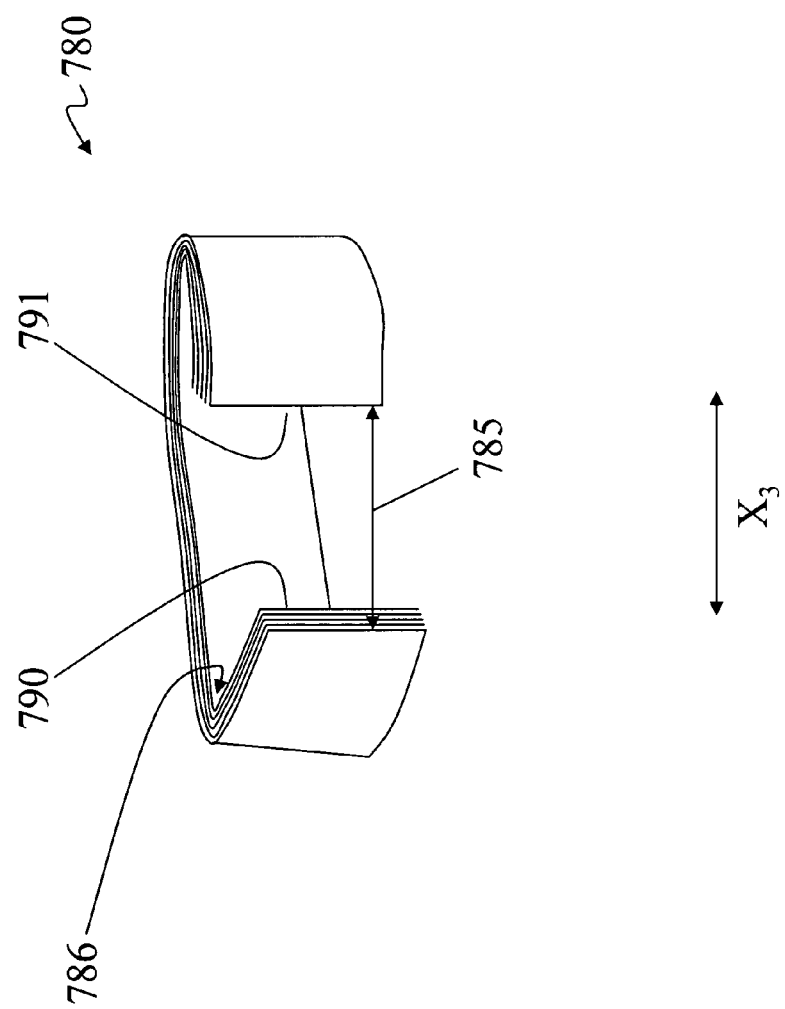

FIGS. 7A-7C show representative diagrams of exemplary sectioned tape-like flux conducting features in accordance with aspects of the present invention. In FIG. 7A, a tape-like roll conducting torroidally shaped flux conductor 700 has removed section of width 705, such that the cross-sectional view (from an overhead perspective with respect to the view of FIG. 7A) of the conductor 700 has a generally "c-shaped" profile having a convex interior opening 706. The edges 710, 711 of the removed section having width 705 are generally perpendicular to the direction $X_1$ of the conductor 700. The removed section having width 705 may be removed, for example, by laser cutting, high-speed grinding, water jet cutting, wire electrical discharge machinery (EDM) vaporization, or other removal technique that does not negatively impact the integrity of the remaining flux conducting laminate (e.g., by cracking or shattering the laminate layers).

The tape-like roll conducting torroidally shaped flux conductor 750 of FIG. 7B has a removed section of width 755, but the edges 760, 761 of the removed section of width 755 are generally at an acute angle relative to the direction $X_2$ of the conductor 755. A convex interior opening 756 is thereby formed in the conductor 750.

In FIG. 7C, a variation of a conductor 780 is shown that is initially shaped similarly to that shown in FIG. 7B, but that has subsequently been "twisted," in accordance with aspects of the present invention. As shown in FIG. 7C, after removal of the section having width 785, so as initially to reach a similar conductor shape to that shown in FIG. 7B, a first cut end 790 is then skewed downward, as shown in FIG. 7C, and a second cut end 791 is skewed upward, as shown in FIG. 7C, relative to the positions of the cut ends 790, 791 as they would appear in FIG. 7B. To accomplish this skewed version of the conductor 780, for example, any adhesive between the layers may be selected so as to be sufficiently flexible to allow the skewing of the cut ends 790, 791, without separating the layers from one another. The skewed conductor 780 may then be secured in the skewed orientation, such as by epoxy or other adhesive addition to the conductor 780 after emplacement within a housing.

Figure 7E:
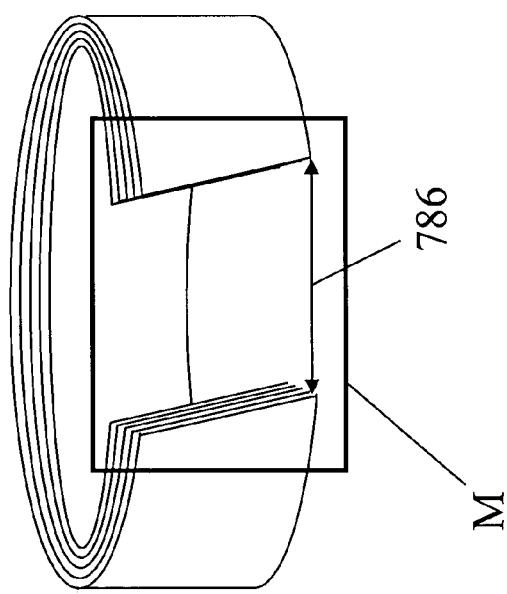
Figure 7F:
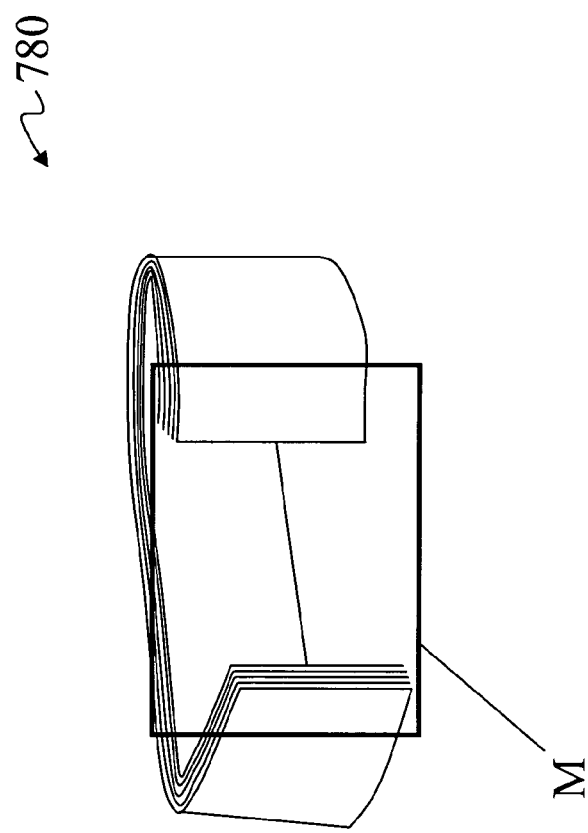

In yet another variation in accordance with aspects of the present invention, rather than using a flexible adhesive between the layers of the conductor 780 so as to allow skewing, a less flexible adhesive may be emplaced between the layers in only a section of the conductor 780, as shown in area M of FIG. 7D. A section 786, identical to section 755 of FIG. 7B, is then removed from the conductor 780; adhesive remains in the area M of the conductor 780 that has not been removed, as shown in FIG. 7E. As shown in FIG. 7F, the conductor 780 may be skewed in areas not containing adhesive, while the area of the conductor 780 containing adhesive remains essentially unskewed.

Figure 8:
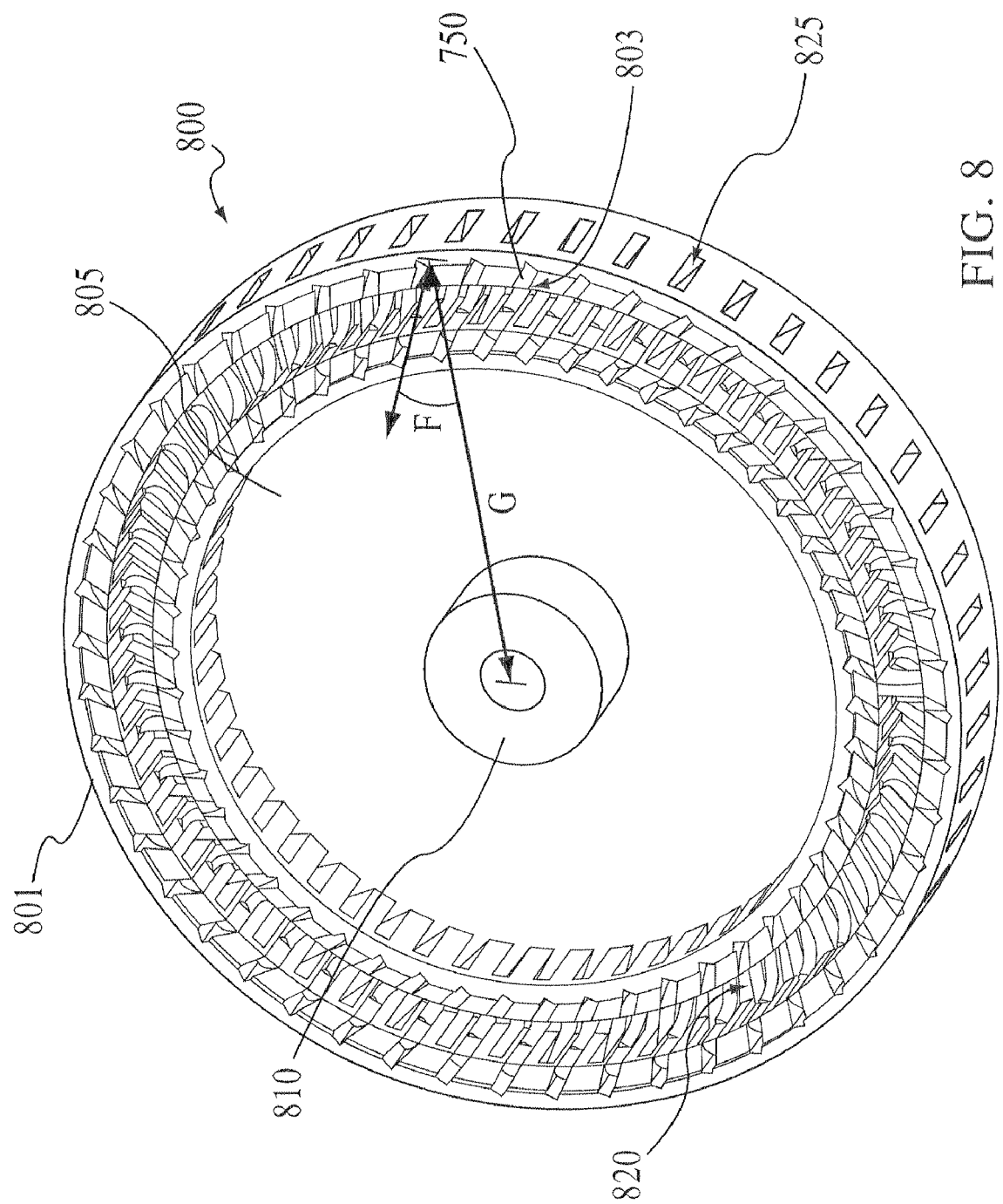
FIG. 8 shows elements of an exemplary stator portion of an electrical output generating device or driven electrical device using a plurality of the tape-like roll conducting torroidally shaped flux conductors of FIG. 7B, in accordance with aspects of the present invention.

FIG. 8 shows elements of an exemplary stator portion of an electrical output generating device or driven electrical device using a plurality of tape-like roll conducting torroidally shaped flux conductors 750 of FIG. 7B, in accordance with aspects of the present invention. As shown in FIG. 8, the plurality of conductors 750 may be fittably located within a stator body portion 800 having a ring shaped flange housing portion 801, which, for example, may be integral with or attached to a disk-shaped wall portion 805, in turn integral with or attached to a central hub 810. Also shown in the exemplary stator portion 800 of FIG. 8 are a plurality of openings 825 for use with certain cooling features and/or for other purposes, as described further below.

Each of the plurality of conductors 750 may, for example, be frictionally and/or adhesively or otherwise secured within a plurality of corresponding slit openings 803 in the ring shaped flange housing portion 801. In the exemplary variation shown in FIG. 8, each of the slit openings 803 are arranged at an acute angle F relative to radial direction G between the hub and the outer edge of the ring shaped flange housing portion 801.

The ring shaped flange housing portion 801 includes a recessed opening 820, and this opening 820 is aligned with the convex interior openings 756 of the plurality of conductors 750 so as to form a generally ring-shaped recess thereby.

In some variations of an electrical output generating device or driven electrical device having a stator (or rotor) portion in accordance with FIG. 8, when further assembled, a windings portion (e.g., a copper coil) may be receivably located in the generally ring-shaped recess formed by the combination of the recessed opening 820 of the housing portion 801 and the convex interior openings 756 of the plurality of conductors 750.

In accordance with some aspects of the stator (or rotor) portion 800 of FIG. 8, the portion 800 may be assembled by emplacing and retaining each of the plurality of conductors 750 within respective slit openings 803 in ring shaped flange housing portion 801. For example, the conductors 750 may be retained by epoxy and/or a mechanical feature (e.g., retaining ring emplaced within a groove in recessed opening 820).

Heat dissipation with this arrangement—e.g., using a material such as Metglas® brand material retained inside a metallic ring-shaped flange housing portion 801—is sufficient for high (e.g., on the order of 10,000) RPM operation.

Figure 9:
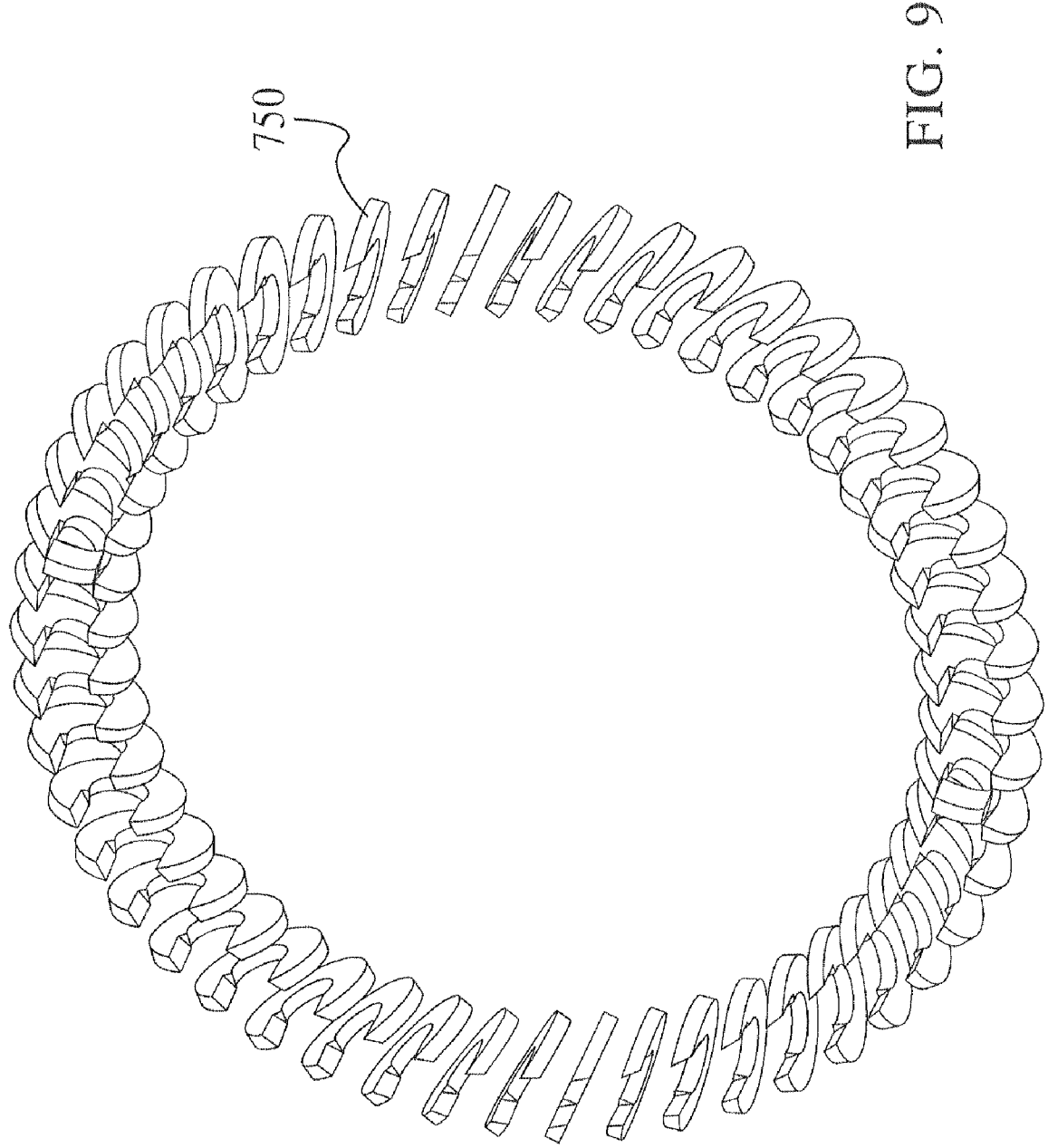
FIG. 9 shows a cutaway view of the arrangement of the plurality of conductors for the stator portion shown in FIG. 8.

FIG. 9 shows a representative view of the arrangement of the plurality of conductors 750 for the stator portion 800 shown in FIG. 8.

Figure 10A:
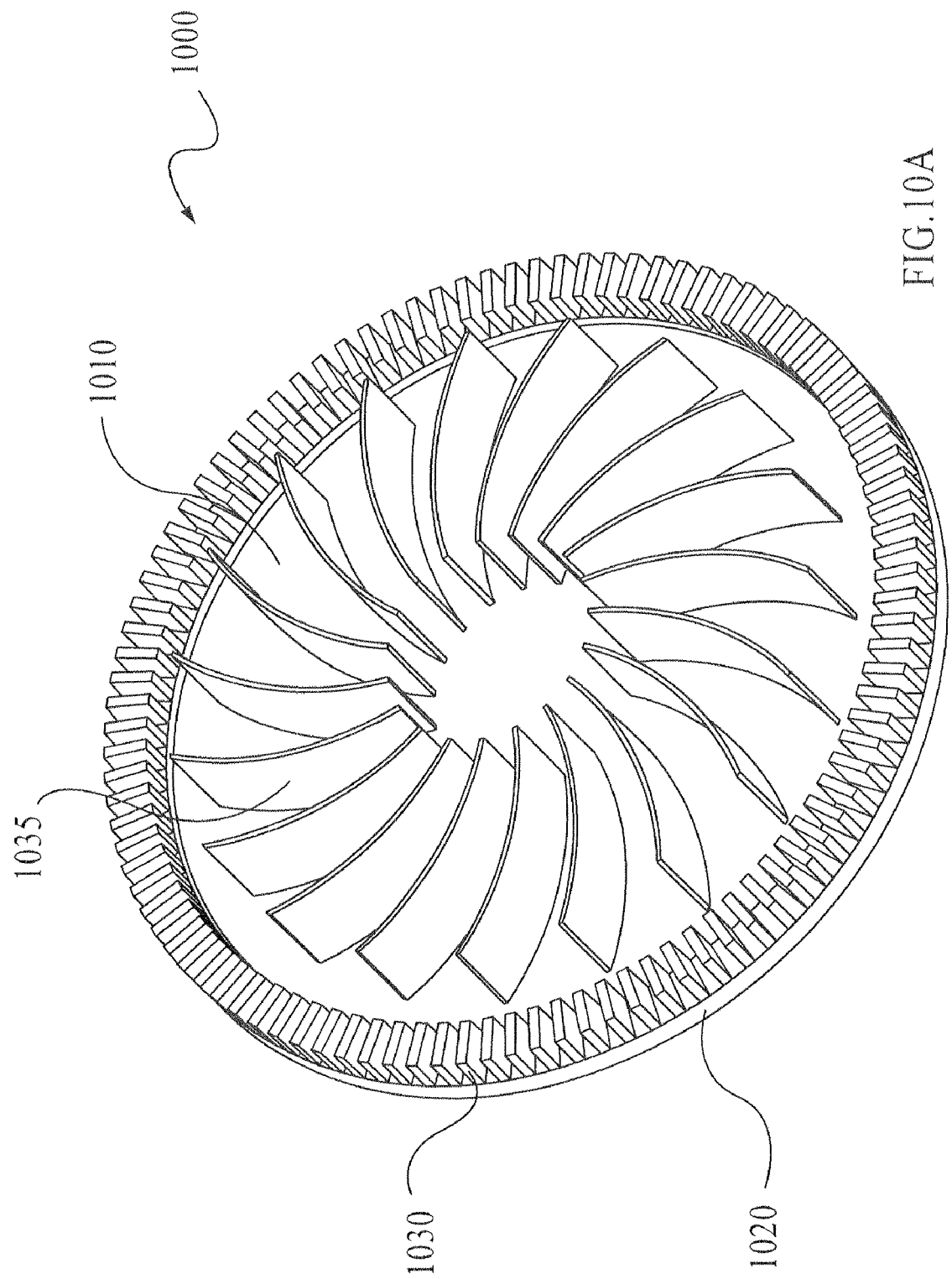
FIGS. 10A-10C present portions of and views of an exemplary rotor portion usable in conjunction with the stator portion of FIG. 8, in accordance with one exemplary variation of an electrical output generating device or driven electrical device in accordance with aspects of the present invention.
Figure 10B:
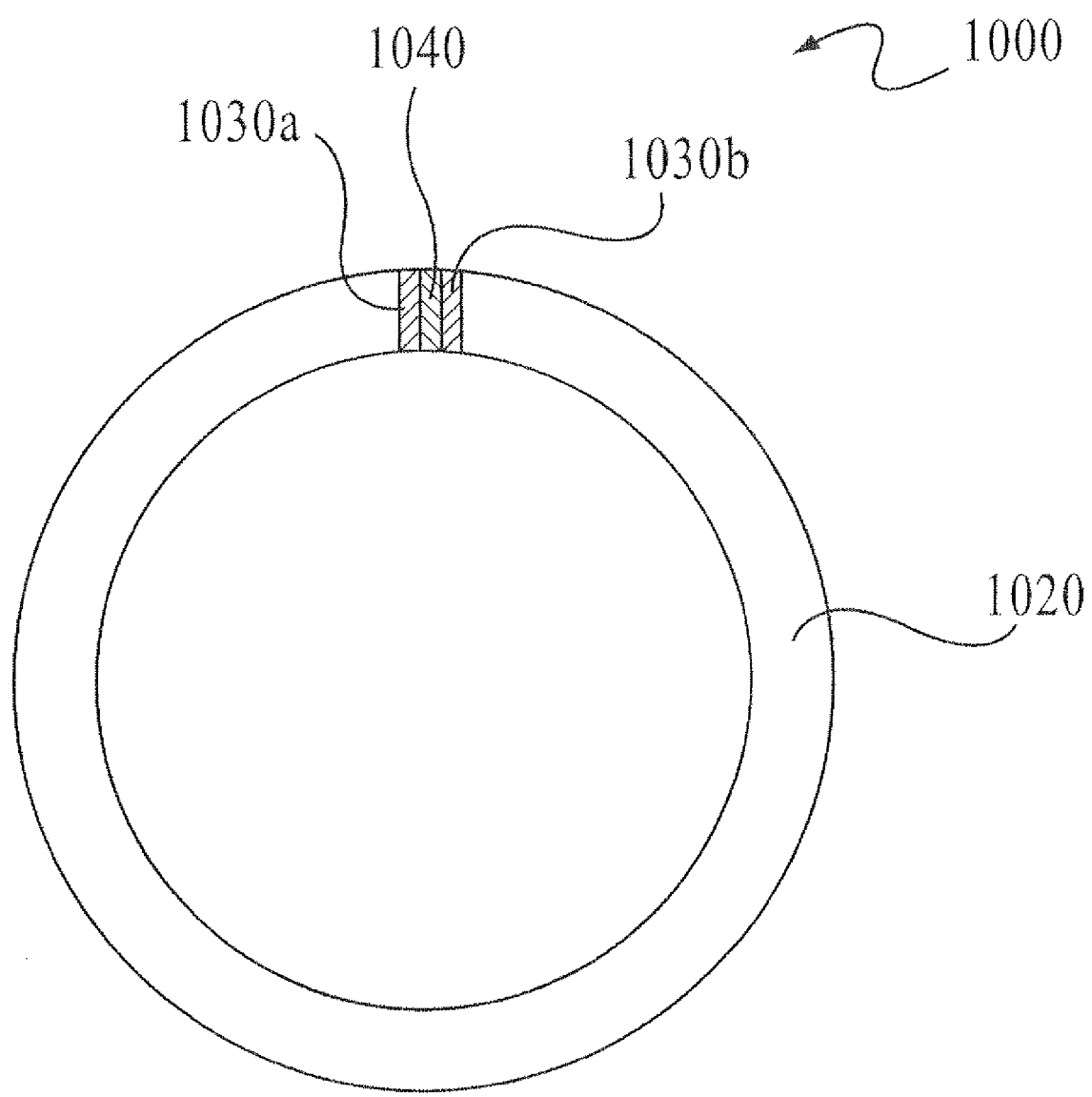
Figure 10C:
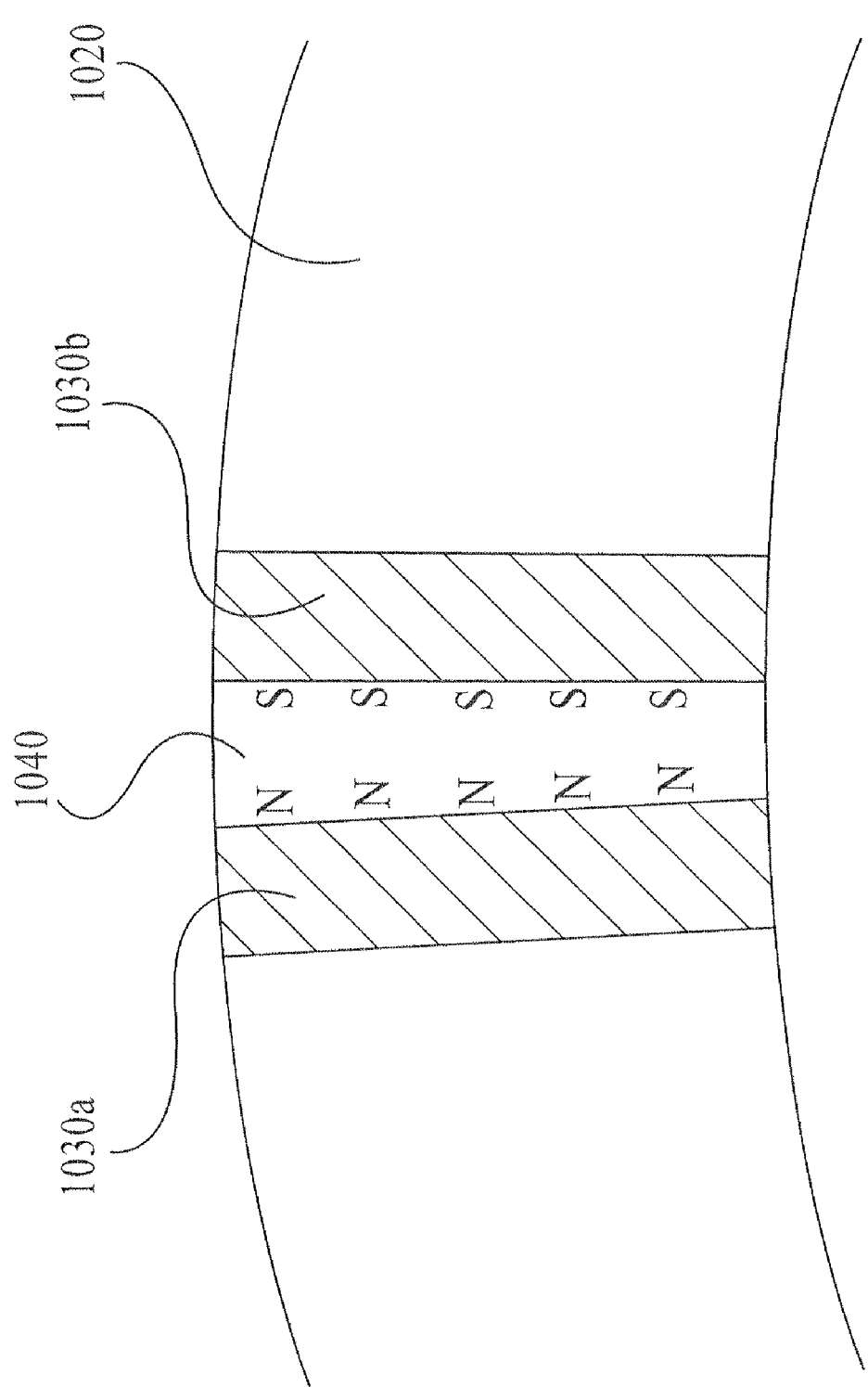

In one exemplary variation of an electrical output generating device or driven electrical device having a stator portion 800 in accordance with FIG. 8, the stator having the stator portion 800 operates in conjunction with a rotor having rotor portion 1000, as shown in FIGS. 10A-10C. Rotor portion 1000 shown in FIG. 10A includes an axial disk portion 1010, having a flange portion 1020. Attached to and extending from flange portion 1020 are a plurality of rectangular or wedge shaped plates 1030a, 1030b of flux conducting material, and between each pair of plates 1030a, 1030b, in the circumferential direction, is a wedge or rectangular shaped magnet (not shown in FIG. 10A; see, e.g., FIGS. 10B and 10C and accompanying description) abuttably fitting therebetween. (Note: as with other variations of electrical output generating devices and/or driven electrical devices in accordance with aspects of the present invention, the stator and rotor portions may be interchanged—i.e., the portion referred to as the "rotor" in exemplary implementations may be fixed, so as to be the stator, and the portion referred to as the "stator" may be rotated, so as to be the rotor.)

Such plates 1030, as shown in FIG. 10A, may, for example, be affixed using powdered metal formed over one or more flux conducting screws or other fastening extensions attached to flange portion 1020; other suitable securing approaches (e.g., use of adhesives and/or interlocking geometries for physical shapes of components, or otherwise bonded, such as by use of insert injection molding) may likewise be usable to sufficiently ensure attachment for operational conditions and preserve flux conduction. In yet another variation of assembly of the portion 1000 shown in FIG. 10a, the plates 1030 may be formed and attached via use of a large diameter spool of laminated material (e.g., a tape wound laminated conductor similar to that shown in FIG. 5, but with an outside circular diameter corresponding to the outside diameter of flange portion 1020, and an inside diameter corresponding to the inside diameter of flange portion 1020. After adhering the large diameter spool to the flange portion 1020, the spool may then be sectioned about its entire circumference, so as to remove the gapped portion between adjacent plates, with the plates remaining as formed with gaps therebetween as shown in FIG. 10A.

FIG. 10B shows a partial view of a rotor portion 1000 consistent with that described with respect to FIG. 10A, with an exemplary pair of rectangular shaped plates 1030a, 1030b indicated, abutting a wedge shaped magnet 1040 located therebetween. FIG. 10C shows a closeup representative view of the rectangular plates 1030a, 1030b and wedge-shaped magnet 1040 of FIG. 10B, with the polarity (north and south sides) of the magnet 1040 indicated.

In FIG. 10A, in addition, one or more centrifugally moving cooling blades 1035 may extend from the planar surface of the axial disk portion 1010 of the device portion 1000. Upon assembly of a combined device incorporating the fully assembled device portion 1000 of FIG. 1A, for example, and the portion 800 of FIG. 8, relative rotary motion of the portion 1000 to the portion 800 (e.g., clockwise relative motion of portion 1000 relative to portion 800) results in air flow as a result of relative motion of blades 1030 within the combined device, such as via openings 825 in device 800 shown in FIG. 8.

Another feature in accordance with aspects of the present invention involves implementation of the coil used in conjunction with the stator and rotor portions shown in FIGS. 8 and 10 (as indicated above, the coil may be located, for example, within recessed opening 820). In one illustrative variation, the coil is embedded within an adhesive shell, such as epoxy, or otherwise protected (e.g., via use of a housing) and adhered or otherwise attached to the generally rectangular and/or wedge shaped flux conducting plates 1030, and/or the magnets located therebetween, of the portion 1000 shown in FIG. 10A. Among other advantages, this approach helps adhere, strengthen, and protect the flux conducting plates 1030 and magnets. In addition, other features, such as one or more screws, may be used to further secure the coil to the portion 1000 in this variation.

In addition, in some variations of a device having a coil attached to the portion 1000, the plates 1030 and/or magnets to which the coil is adhered may include one or more notches, grooves, tapers, or other features for matably receiving a portion of the coil (e.g., one or a group of windings that extend into a groove formed by aligning notches in each of the plates 1030 and magnets). In addition to strengthening the overall combined coil and portion 1000, this variation has the further advantage of securing the positions of the magnets and plates 1030 relative to one another, via the securing coil within the groove.

Figure 11A:
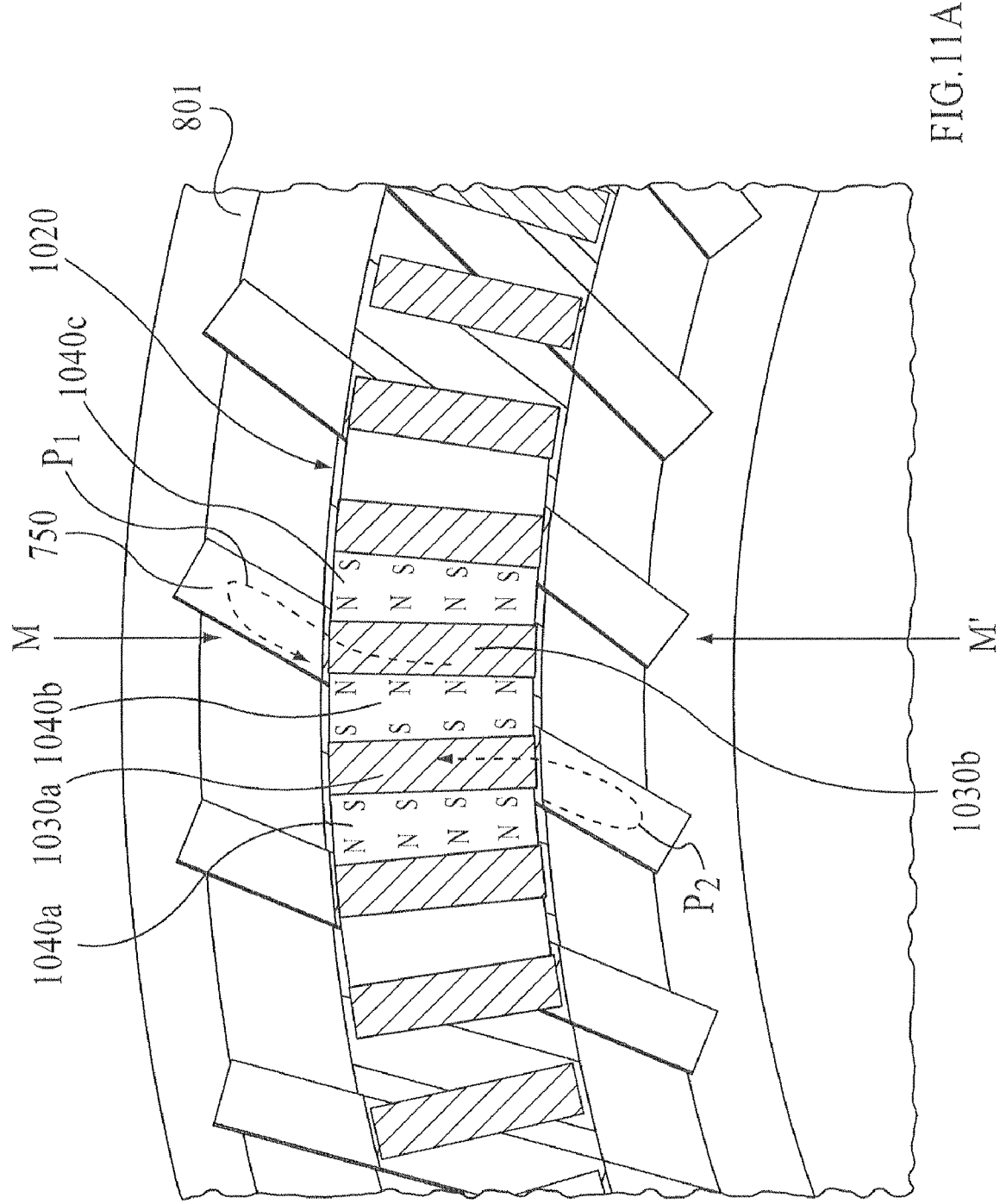
FIGS. 11A, 11B, and 11C show a partial side representative view, an overhead view, and a cross-cut view, respectively, of a combined assembly of the stator portion of FIG. 8 and the rotor portion of FIGS. 10A-10C, in accordance with aspects of the present invention.
Figure 11B:
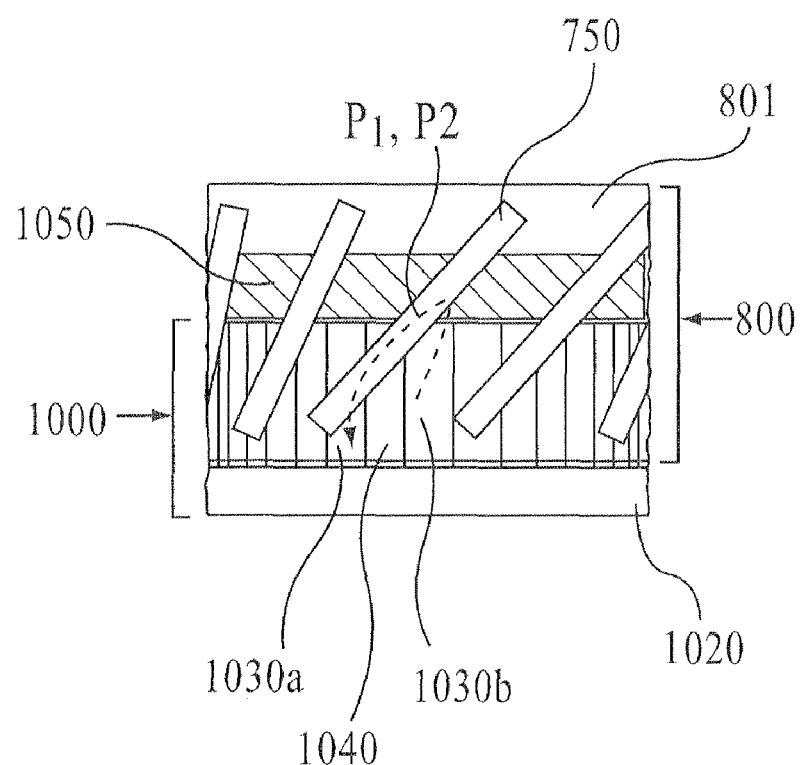
Figure 11C:
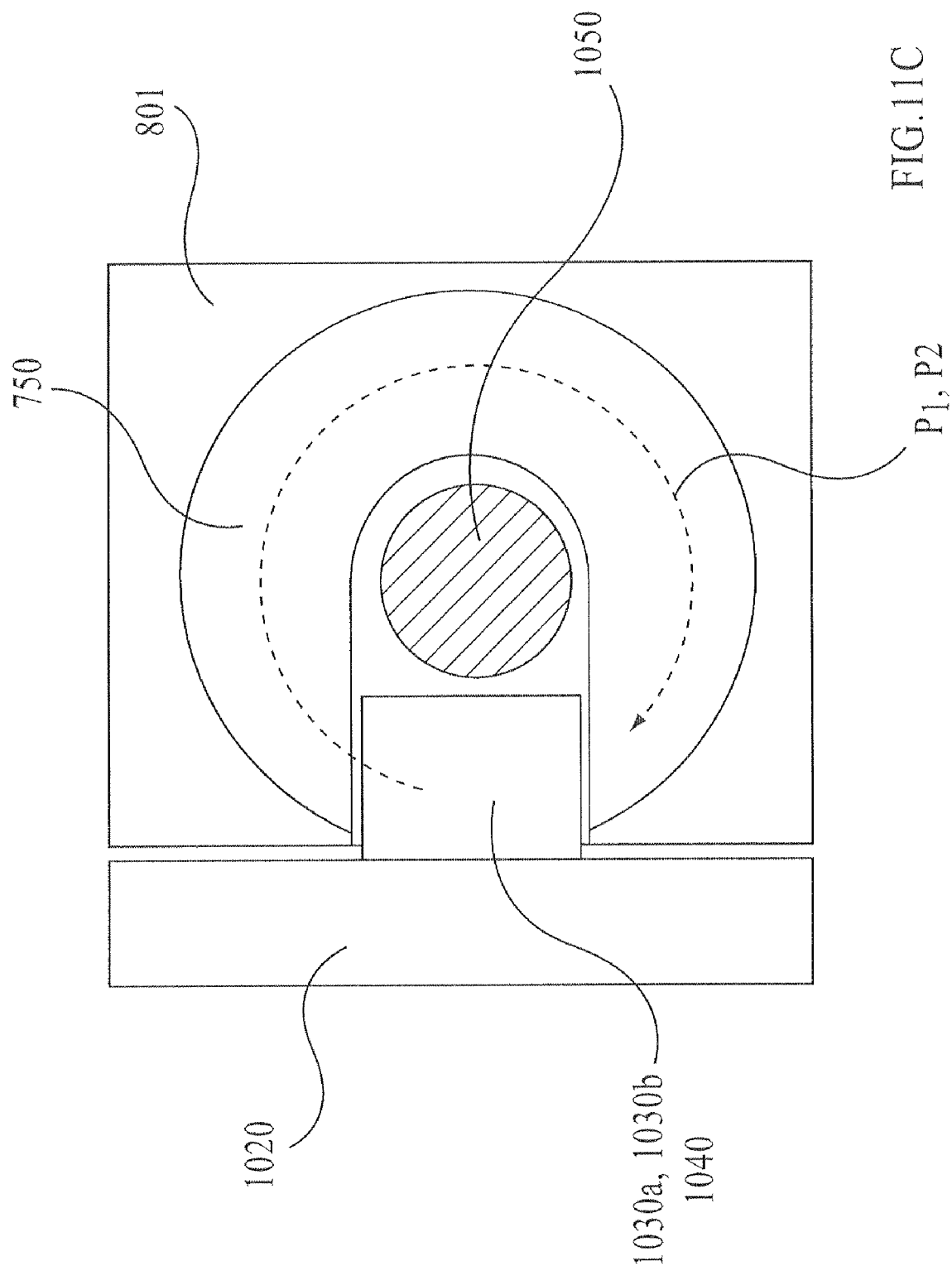

FIGS. 11A, 11B, and 11C show a partial side representative view, an overhead view, and a cross-cut view (a cutaway view through the line M-M' of FIG. 11A), respectively, of a combined assembly of the stator portion 800 of FIG. 8 and the rotor portion 1000 of FIGS. 10A-10C. As shown in FIGS. 11A-11C, upon assembly, the generally rectangular and/or wedge shaped flux conductors and magnets 1030a, 1030b, 1040 extending from flange portion 1020 of the rotor portion 1000 are partially nestably located within and adjacent to the ring shaped flange housing portion 801 of the stator portion 800. As shown in FIGS. 11A-11C, a flux flow path is formed by various features of the stator portion 800 and rotor portion 1000, with flux flow path $P_1$, $P_2$ and direction varying with relative position of the stator portion 800 to the rotor portion 1000.

For example, FIG. 11A shows relative positions of the flux conductor 750, rectangular plates 1030a, 1030b, and wedge-shaped magnet 1040 sandwichably located therebetween. Orientation of successive magnet pairs is such that each plate 1030a, 1030b is sandwiched by the same polarity of the abutting pair of magnets 1040, such that a flux path $P_1$, $P_2$ is generated from rectangular plate 1030b, through the flux conductor 750, and to the rectangular plate 1030a. FIGS. 11B and 11C show additional views of the flux path $P_1$, $P_2$, which generally encircles winding 1050.

Operation of this device is generally similar to that of the device shown in FIGS. 9A-9G and accompanying text contained in Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007.

Figure 12:
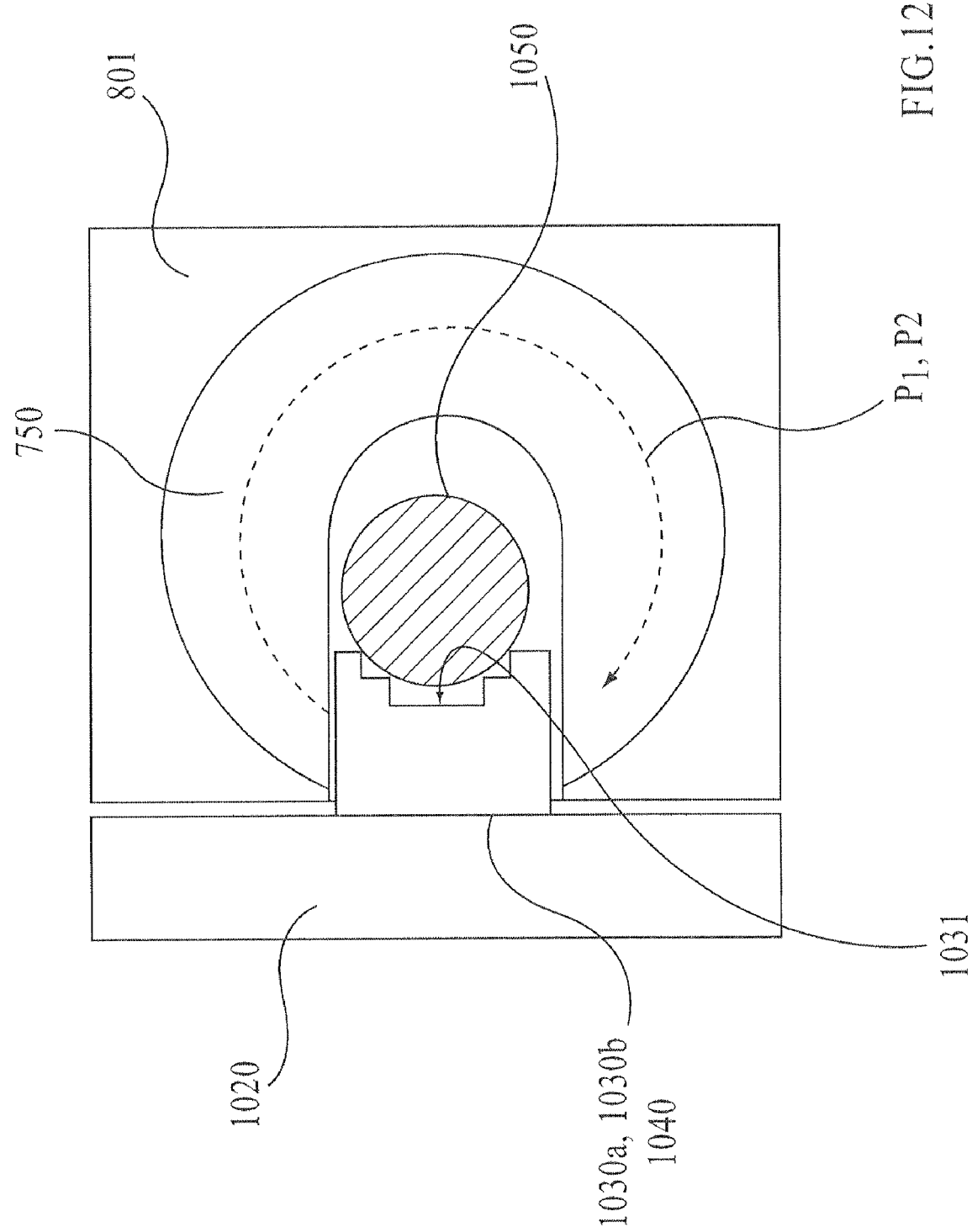
FIG. 12 presents an exemplary cross-sectional view of a section of a combined stator and rotor portions showing a coil attached to the plates and magnets via a notch in the plates and magnets forming a groove for receiving a portion of the coil, in accordance with aspects of the present invention.

FIG. 12 presents an exemplary cross-sectional view of a section of a combined stator and rotor portions (e.g., portion 800 of FIG. 8 and 1000 of FIG. 10) showing a coil 1050 attached to the plates and magnets 1030a, 1030b, 1040 via notches 1031 in each of the plates and magnets 1030a, 1030b, 1040, thereby forming a groove for receiving a portion of the coil 1050. Among other things the relative positioning of the components and space therebetween allows for water or other fluid flow (e.g., for cooling purposes). In one variation, fluid flow about coil 1050 and/or other appropriate components is used to produce a superconducting effect.

Another feature of some aspects of the present invention, as illustrated described in accordance with the exemplary devices shown in FIGS. 5-12, is the use of "side by side" (e.g., as opposed to the rotor portion being radially nested within the stator portion, as illustrated, for example in the aspects of the present invention shown in FIGS. 1-4B) nested assembled rotor and stator portions. Among other things, the side by side approach to design reduces the radial load on the device and can result in lighter weight and lower tolerance needs (e.g., use of less expensive and less robust bearings between the stator and rotor portions, as well as less rigid housing components for stator and/or rotor portions, than may be required by the radial nested approach).

Manufacture/Adaptation and Use of Tape Wound Flux Conductors in Accordance with Aspects of the Present Invention Among other things, the use of existing material in standard manufactured form and/or standard processing techniques for that form, such as use of tape wound oriented Metglas® material, as shown in FIG. 5, with standard manufacturing technique removal of a section of the material, greatly eases the manufacturing process for devices in accordance with aspects of the present invention over manufacturing and assembling only specialty parts. In some respects, this manufacturability with respect to electric motor and/or alternator applications, for example, is related to the particular transverse and other features of various designs of the devices in accordance with aspects of the present invention.

In particular, one challenge to manufacturability of the exemplary devices shown in FIGS. 5-12 is production of fine thickness laminated magnetic flux conducting material in a shape amenable to use in such devices. For example, such material must be assembled, the layers adhered together (e.g., via use of an adhesive), and then cut to size. Some commercially available existing manufactured appropriate tape wound oriented Metglas® material devices, such as that shown in FIG. 5, are already assembled, with the layers adhered, and are relatively inexpensive (e.g., compared to plate stack assembly by custom order/manufacture), and may further be easily sectioned in accordance with ordered specifications using standard manufacturing techniques provided by the manufacturer. The Metglas® material items shown in FIG. 5, for example, achieve low cost by their normal use in completely different applications for devices in accordance with aspects of the present invention (e.g., typical use in electronic circuit board and other applications).

Yet another feature of aspects of the present invention relating to use of tape wound laminated materials, such as the Metglas® brand material shown in FIG. 5, is addition of a containment housing for the material (e.g., a non-magnetic flux conducting metal or other appropriate container similar to the plastic housing shown in FIG. 5 about the exterior of the roll portion). The containment housing may be needed, for example, because the cutting or other manipulation of the material contained therein (e.g., Metglas® brand material) may be difficult or impossible, given the nature of the material (e.g., easily damaged), in the absence of physical containment. In some variations, for example, the containment housing is shaped so as to snugly enclose the laminated portion of the stator or rotor (e.g., the housing is shaped and sized as appropriate for use with the sectioned tape-like flux conducting features 750 shown, for example, in FIGS. 6A-11C), such that the laminated portion with the containment housing may be inserted into the stator or rotor portion (e.g., into slit openings 803 shown, for example, in FIG. 8).

In some variations, in addition to the housing being sized so as to be insertable into appropriate openings in the stator or rotor portion, an alignment tab and/or attachment feature (e.g., screw opening) may be included in the housing to allow secured positioning of the housing relative to the stator or rotor portion. Among other things, this securing feature can assist with properly orienting the conductor relative to the stator or rotor portion, assist with adjusting timing of the rotor relative to the stator (e.g., by allowing a range of adjustment in secured position), and prevent unnecessary vibration and/or other unwanted motion of the conductor.

Thus, for example, in some variations, the laminated portion initially has layers adhered to one another using vacuum (e.g., suction pressure) infused epoxy or other adhesion techniques. Next, the laminated portion is inserted into a housing (e.g., metal or other suitably rigid housing for use with devices in accordance with aspects of the present invention) and gaps between the housing and laminated portion are filled with epoxy or other adhesive to ensure the laminated portion is tightly secured relative to the housing. Alternatively to using an attachment feature, the housing may be secured by other attachment, such as by use of sonic welding, adhesive, solvent bonding, hot knife bonding, snap fit, or press or interference fit.

Among other things the strength and rigidity of the housing both securely holds the laminated portion and allows the housing to be secured, such as in high stress applications for device operation (e.g., where high magnetic and other forces may produce stress on the laminated portion and/or housing), as well as when manufacturing needs dictate (e.g., where use of housing would ease in cutting the material). In addition, the housing provides an anchor point for securing the laminated portion relative to the stator or rotor portion in which the laminated portion is inserted. The particular material comprising the housing can vary, depending, for example, on the particular application. Factors that may potentially affect housing material selection include, besides strength and rigidity, capability to conduct flux/be invisible to flux, electrical insulating capability, and heat dissipation properties, among others.

Any necessary sectioning (e.g., cutting a gap similar to the gap 755 for conductor 750 shown in FIG. 7B) of the combined laminated portion/adhesive/housing is then conducted to produce the conductor for use with the stator or rotor portion (e.g., into slit openings 803 shown, for example, in FIG. 8). In some variations of the conductor 705 in accordance with aspects of the present invention, the edges 760, 761 may be coated with adhesive (e.g., epoxy), but open with respect to the housing (i.e., the housing does not extend so as to cover these edges 760, 761). In other variations, a thin layer of housing covers these edges 760, 761.

FIGS. 13A-17 show several variations of containment housings for the tape wound core and manufacture and use thereof.

Figure 13A:
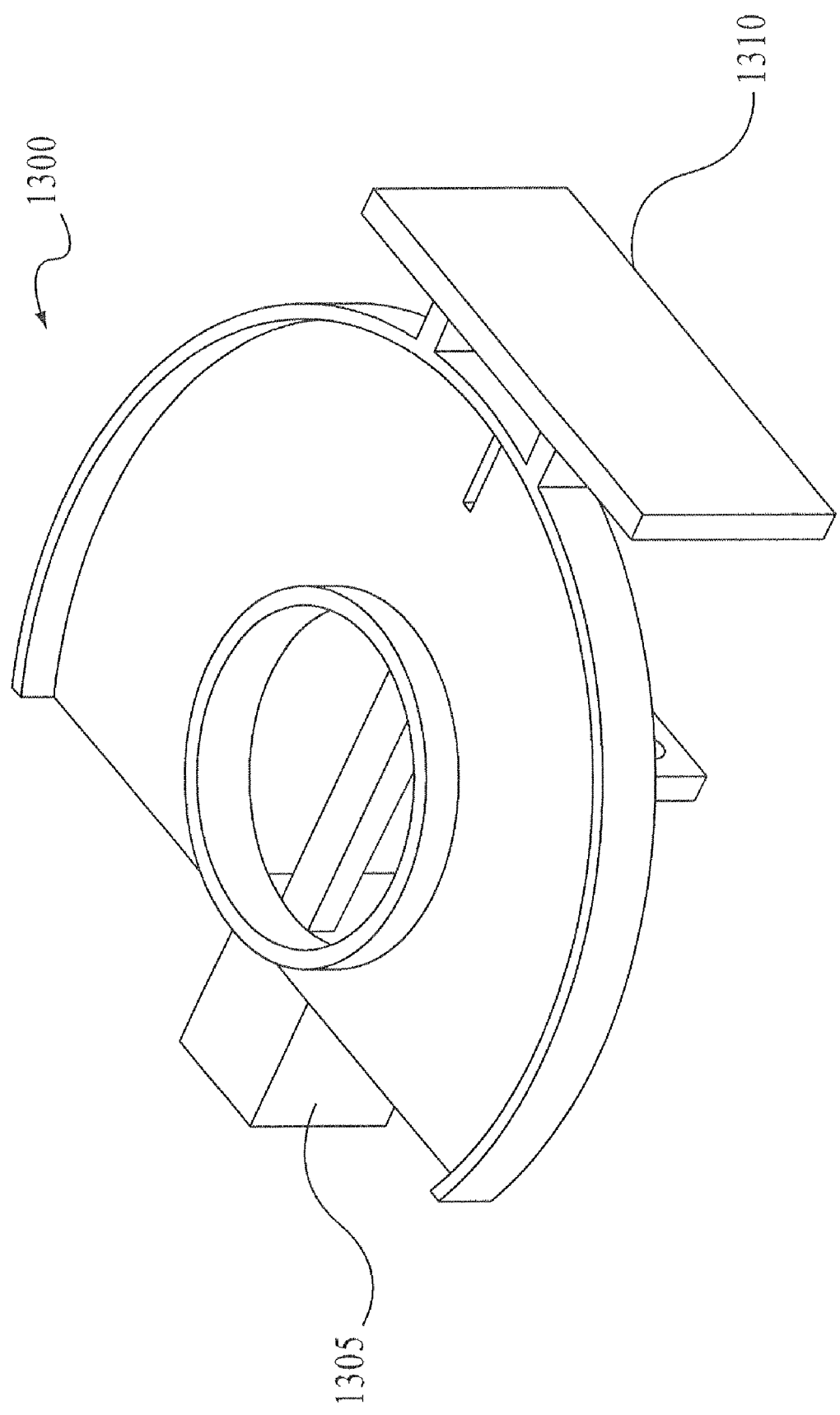
Figure 13B:
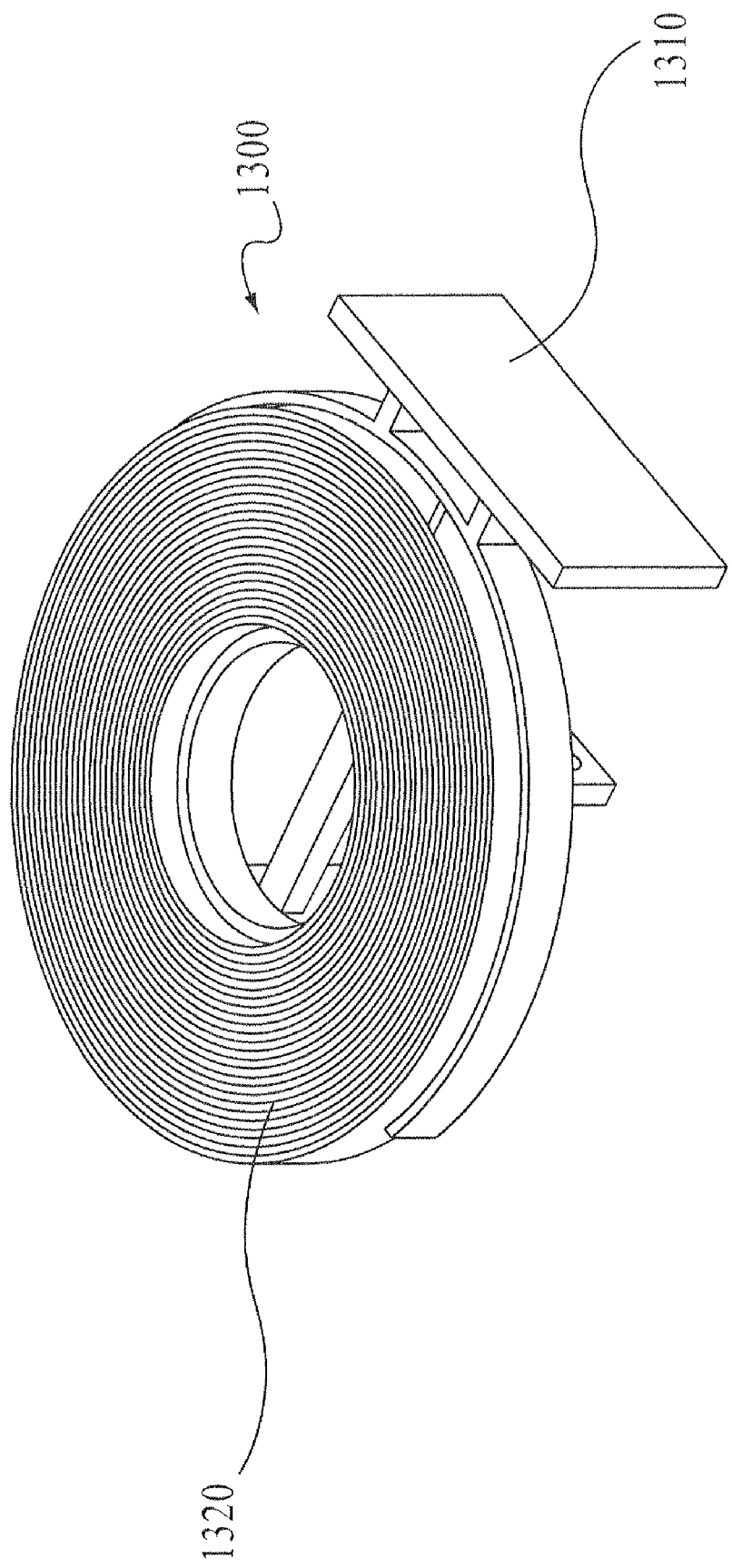
Figure 13C:
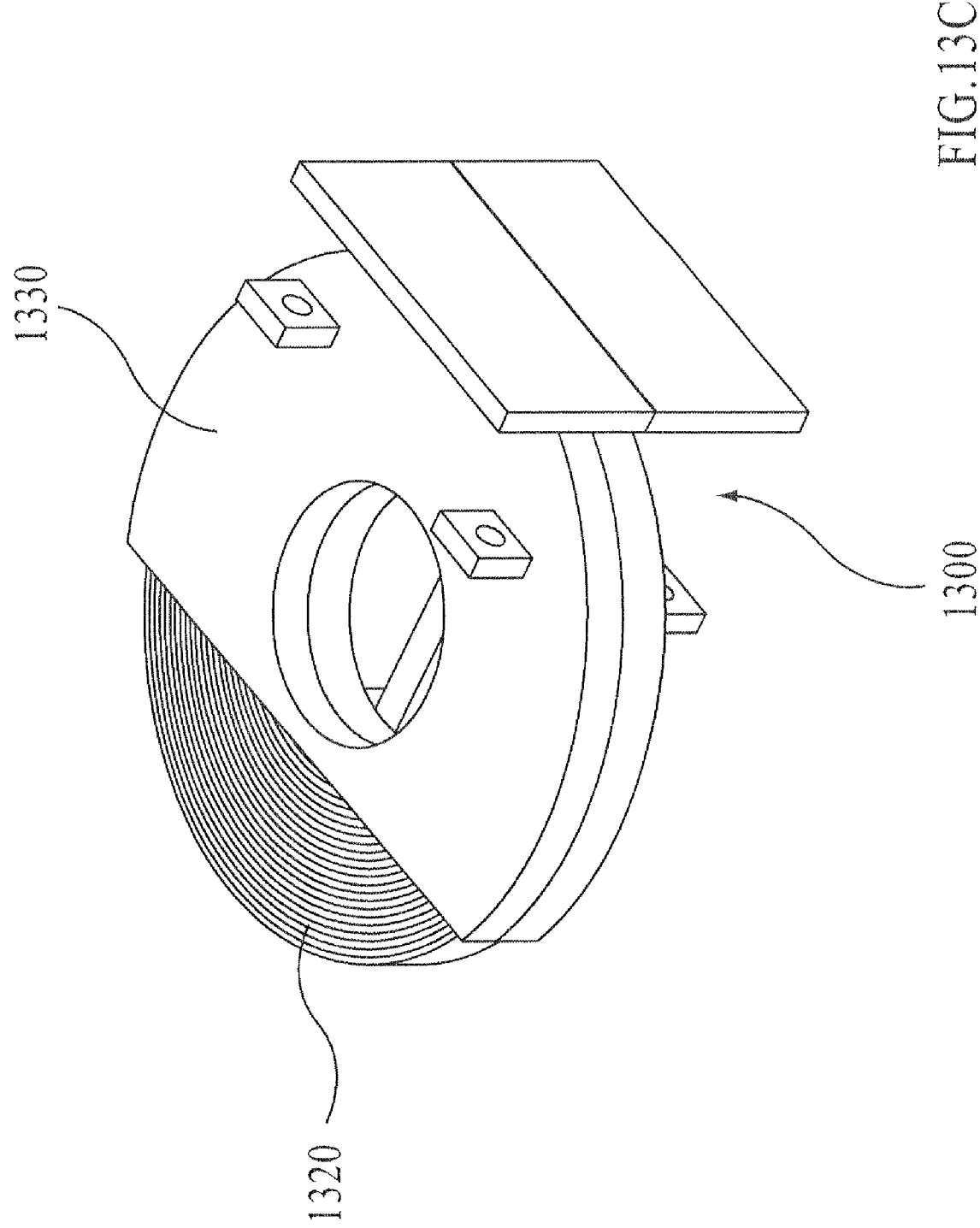

FIGS. 13A-13H show a first exemplary variation of a housing in accordance with aspects of the present invention. As shown in FIG. 13A, a first molded or otherwise formed component 1300 is provided that has an integral gravity drip reservoir assembly 1305 and a stand feature 1310 for use in encapsulating a tape wound core. In FIG. 13B, a tape wound core 1320 is shown as emplaced on the first molded component 1300. In FIG. 13C, a second molded or otherwise formed component 1330 is attached to the first component 1300, partially encapsulating the tape wound core 1320. Further, since the tape wound core 1320 is typically flexible prior to adhesive impregnation or other fusing, in some variations, the shape of the first and second components 1300, 1330 may be used to form the core 1320 to a desired shape during the adhesive or fusing process. By altering the shape of the core 1320, important factors like flux switch surface area and wire area can be optimized, for example. (See FIGS. 14D-14G and corresponding description for further exemplary description of shape formation and advantages.)

Figure 13D:
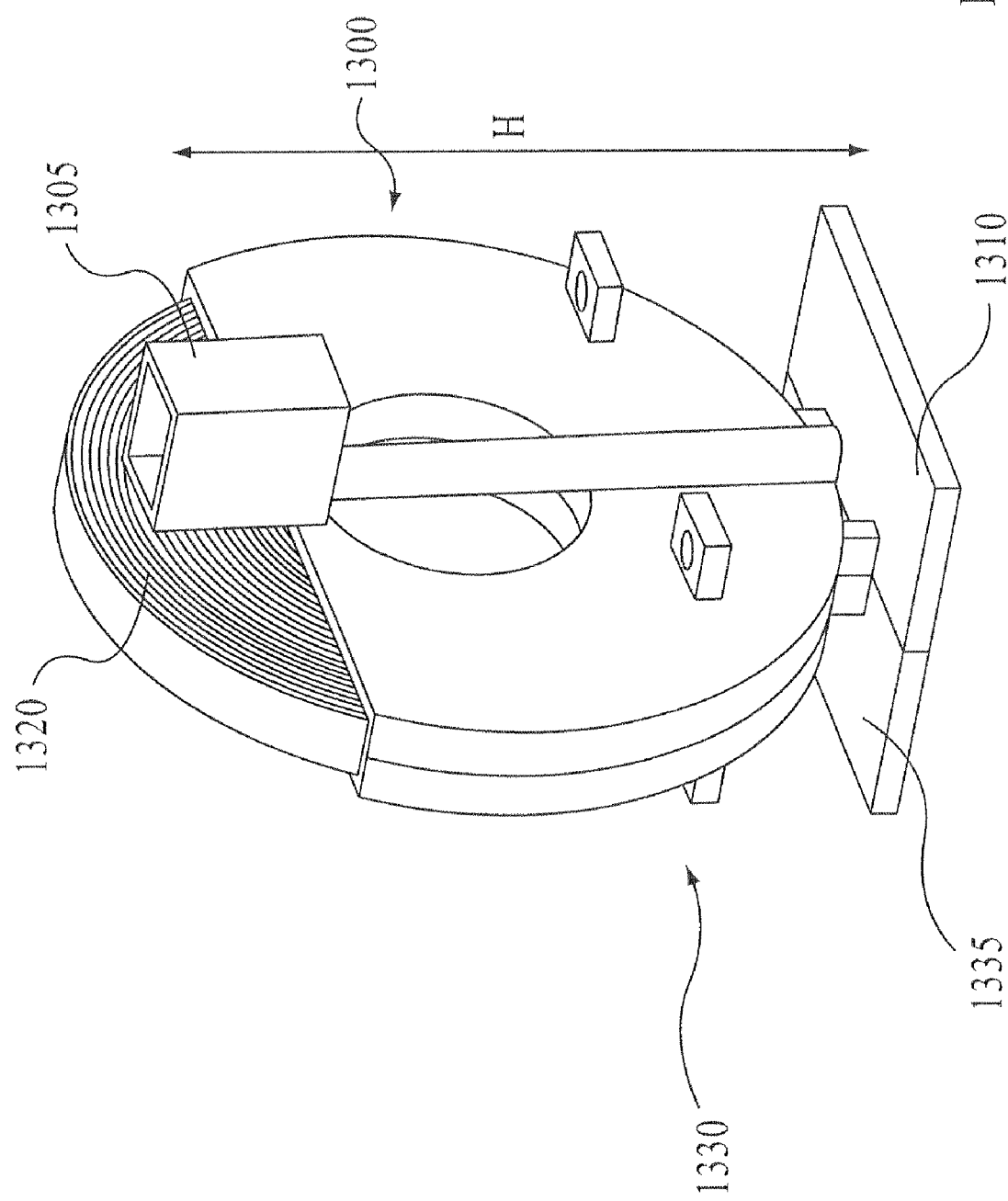

In FIG. 13D, the assembled first and second components 1300, 1330, with the partially encapsulated tape wound core 1320 are oriented upon the stand portions 1310, 1335. An adhesive (e.g., a liquid, semi-liquid, or otherwise flowable form adhesive) is then fed into the reservoir assembly 1305. The reservoir for the reservoir assembly 1305 may be sized and/or filled with to match a volume needed for a complete fill and may be designed to drip or otherwise deliver adhesive at an appropriate rate via gravity feed. The height H of the encapsulating portion 1300, 1330, as shown in FIG. 13D, may be selected to correspond to a determined height for appropriate adhesive fill or may be randomly selected to be greater than the anticipated fill height. Alternatively, the tape wound core 1320 may be completely encapsulated. Among other things, use of only partial encapsulation may provide cooling advantages for the tape wound core 1320 when used in machine operation over a fully encapsulated tape wound core 1320.

Figure 13E:
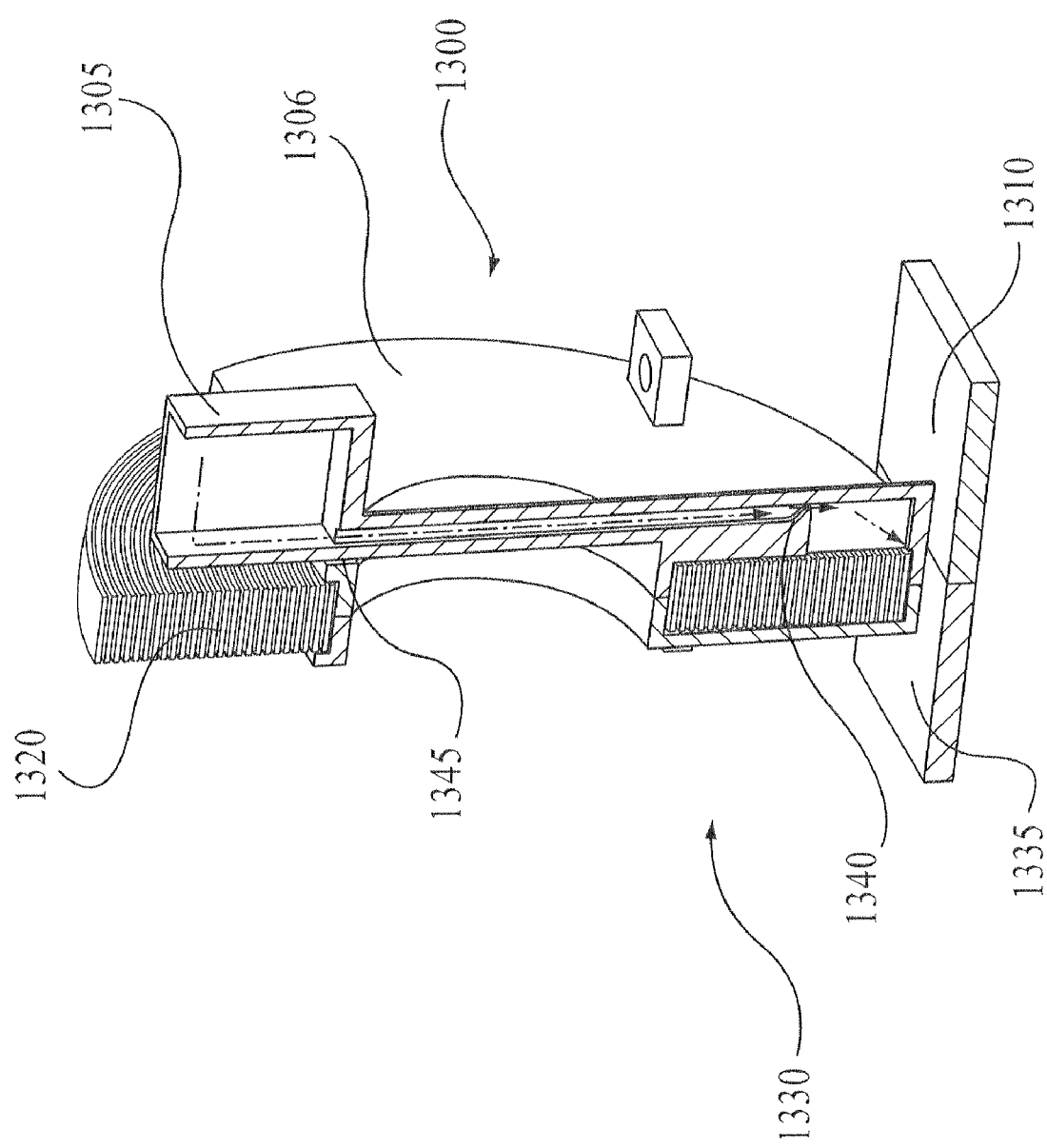

FIG. 13E is a cutaway view of the assembled and oriented device of FIG. 13D. As shown in FIG. 13E, a restrictor 1340 may be provided within the component portion 1300 to control the rate of delivery of adhesive from the reservoir 1305 to contact with the tape wound core 1320. The rate of flow through the restrictor 1340 may vary with the viscosity and/or other features of the adhesive. The size and other features of the restrictor 1340 may be varied to vary flowrate of delivery of the adhesive. Another feature shown in FIG. 13E is a gap 1345 between the reservoir assembly 1305 and the main body 1306 of the first component 1300. This gap 1345 eases removal of the reservoir assembly 1305 following completion of assembly.

Figure 13F:
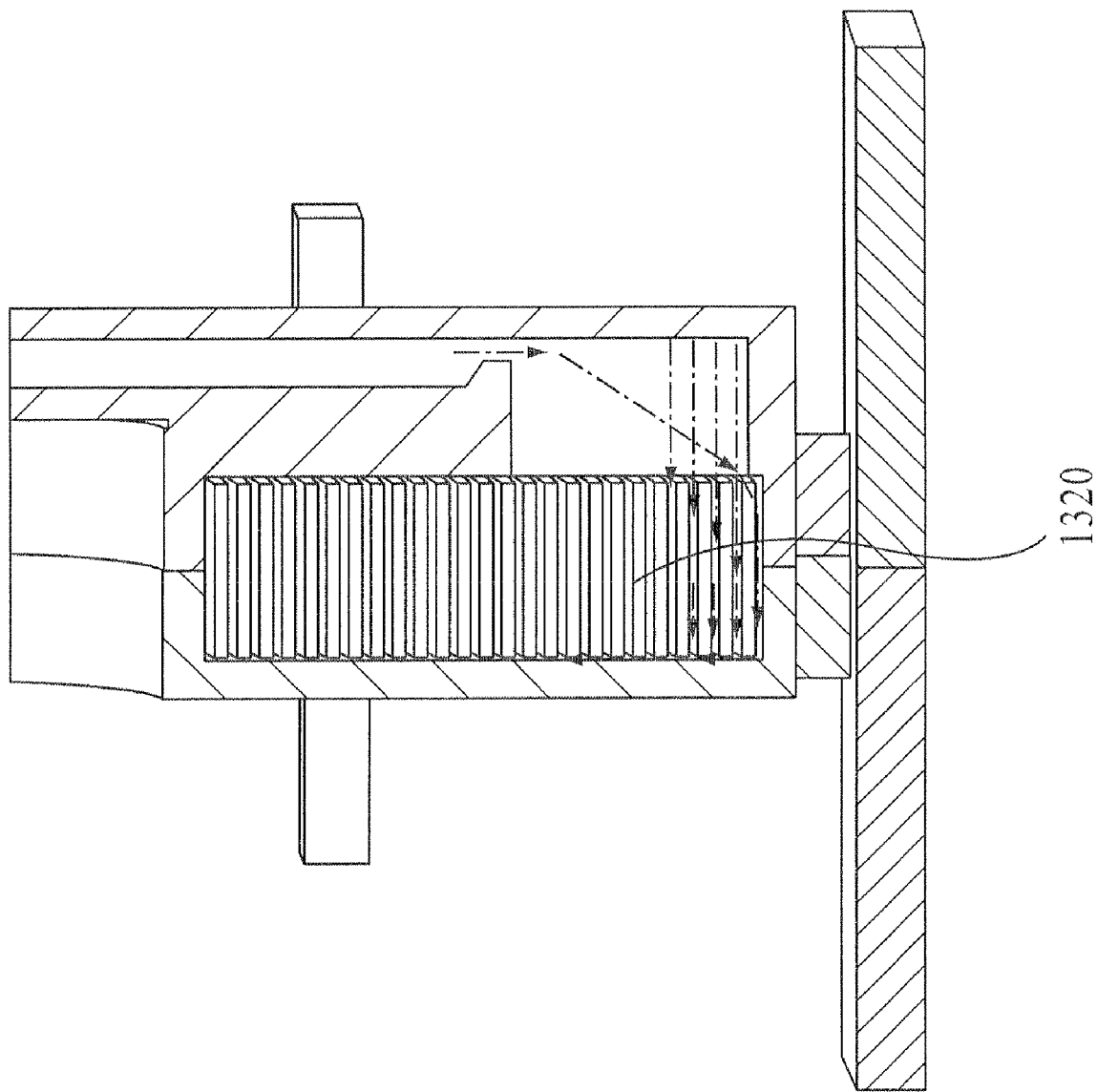
Figure 13G:
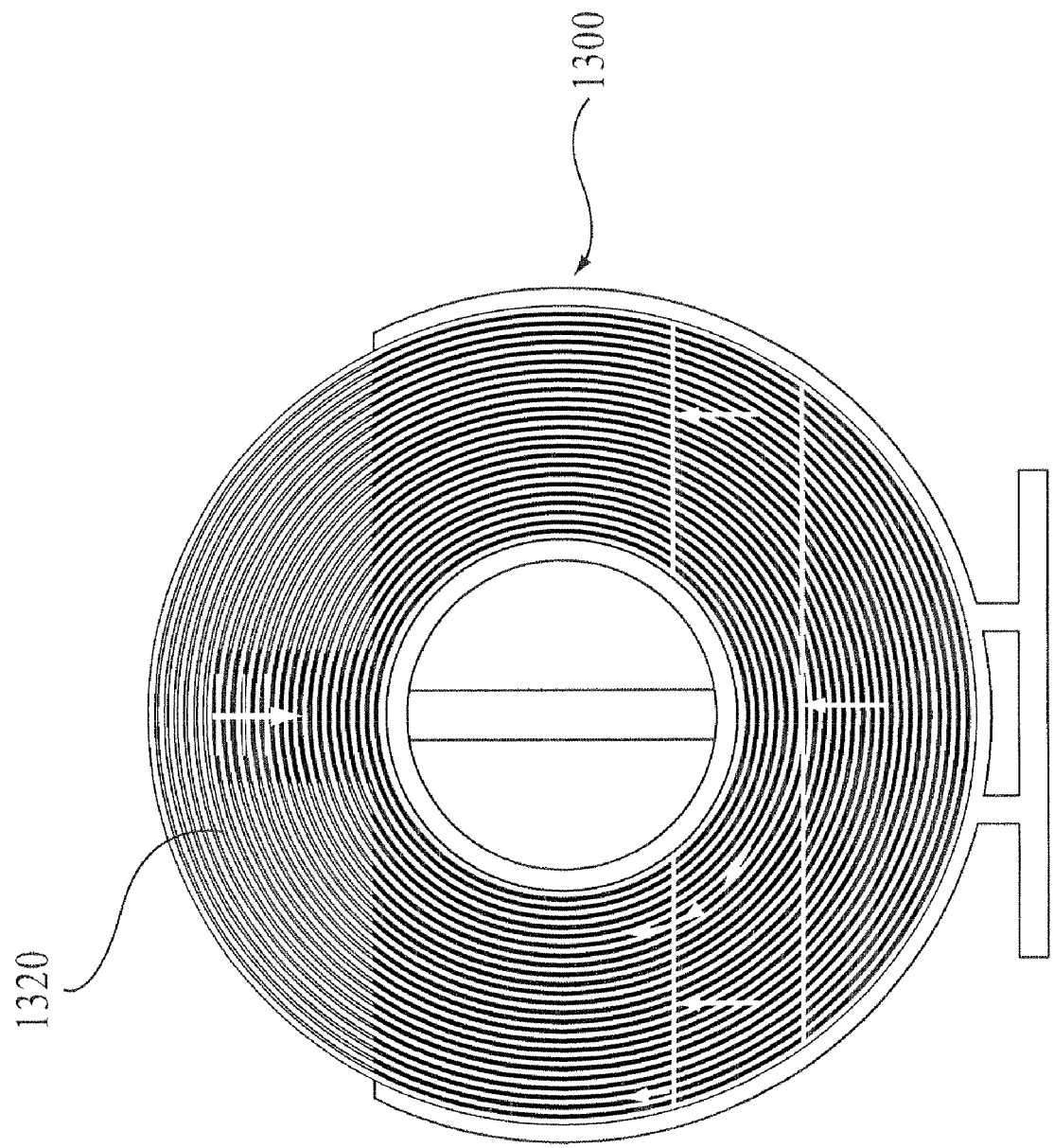

FIG. 13F contains a close-up view of certain aspects of adhesive delivery. As shown in FIG. 13F, utilizing capillary action, for example, air or other fluid initially located between the coils of the tape wound core 1320 may be displaced by the delivered adhesive as the adhesive flows into the tape wound core 1320. FIG. 13G is a cutaway view of the assembly shown in FIG. 13F. As shown in FIG. 13G, one advantage of the process shown in FIGS. 13E and 13F is that a slow fill occurs automatically as a result of the restrictor (e.g., after hand filling of the reservoir), without any special pressure delivery equipment being required. Fill speed and quality may be improved by imparting a vibration or other mechanical motion, or other flow distribution enhancement operation, to the device during filling. Further, as shown in FIG. 13G, gaps may be molded into the parts to enhance liquid flow around the tape wound core 1320 while it is filling.

Figure 13H:
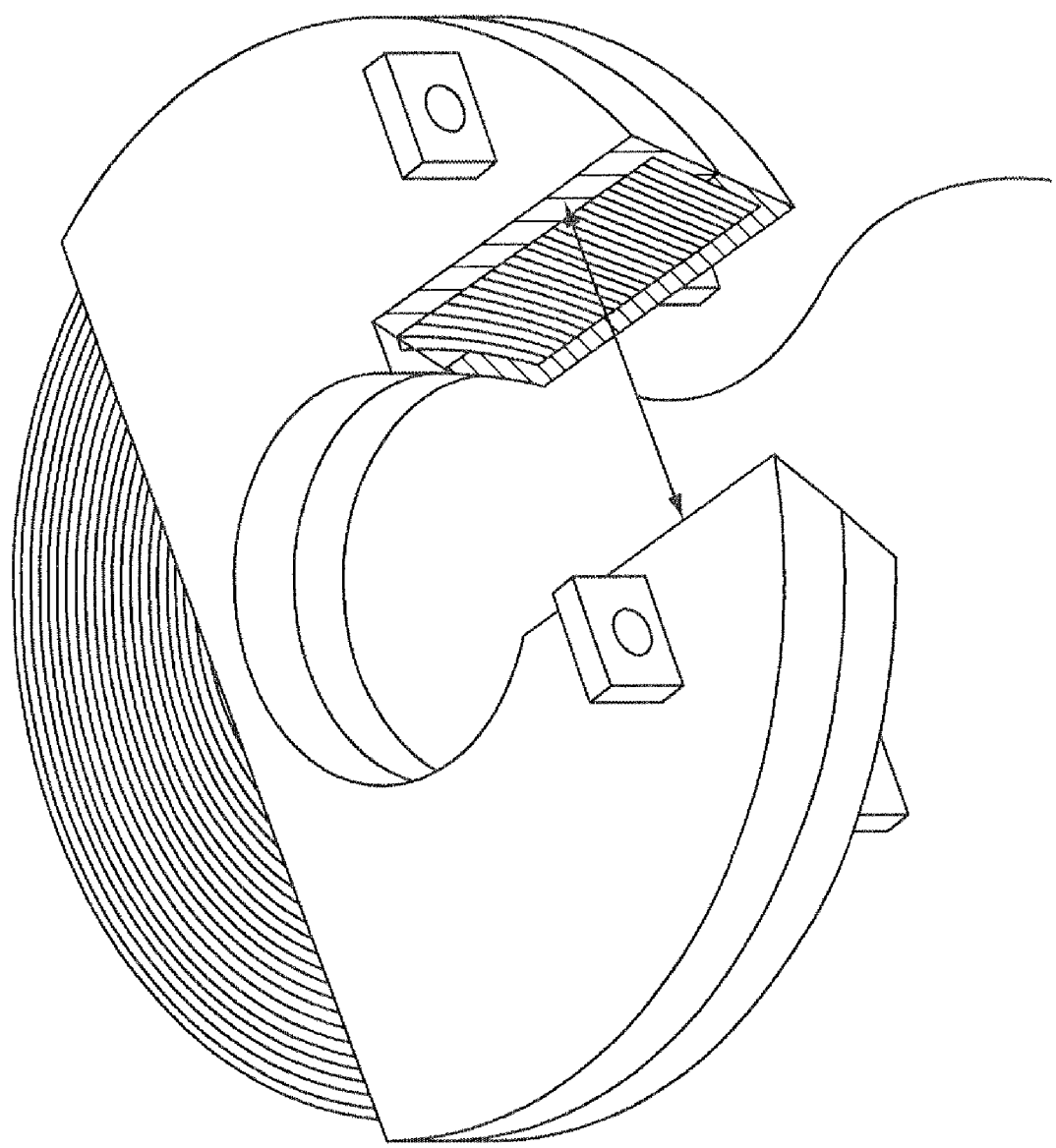

FIG. 13H shows the completed, filled component with a section removed, after curing of the adhesive. Also removed (e.g., by appropriate cutting or other detachment) are the reservoir assembly 1305 and the stand assembly 1310, 1335. Note that in some methods of removing, such as water jet cutting, the type of material being cut (e.g., Metglas® brand material) may necessitate certain conditions of the material being met, such as the fused material (e.g., adhesive) being substantially free of voids.

Figure 14A:
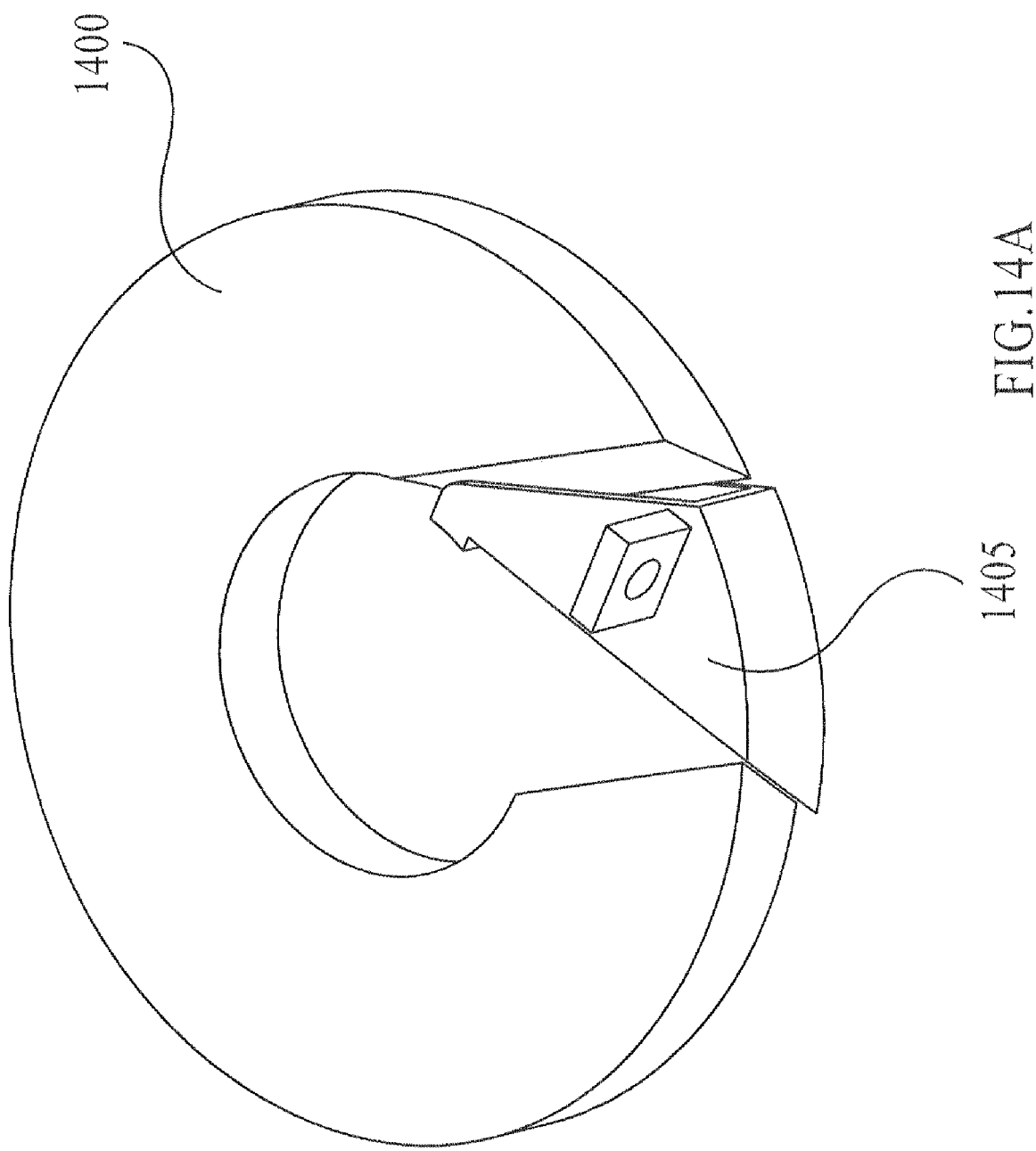
Figure 14B:
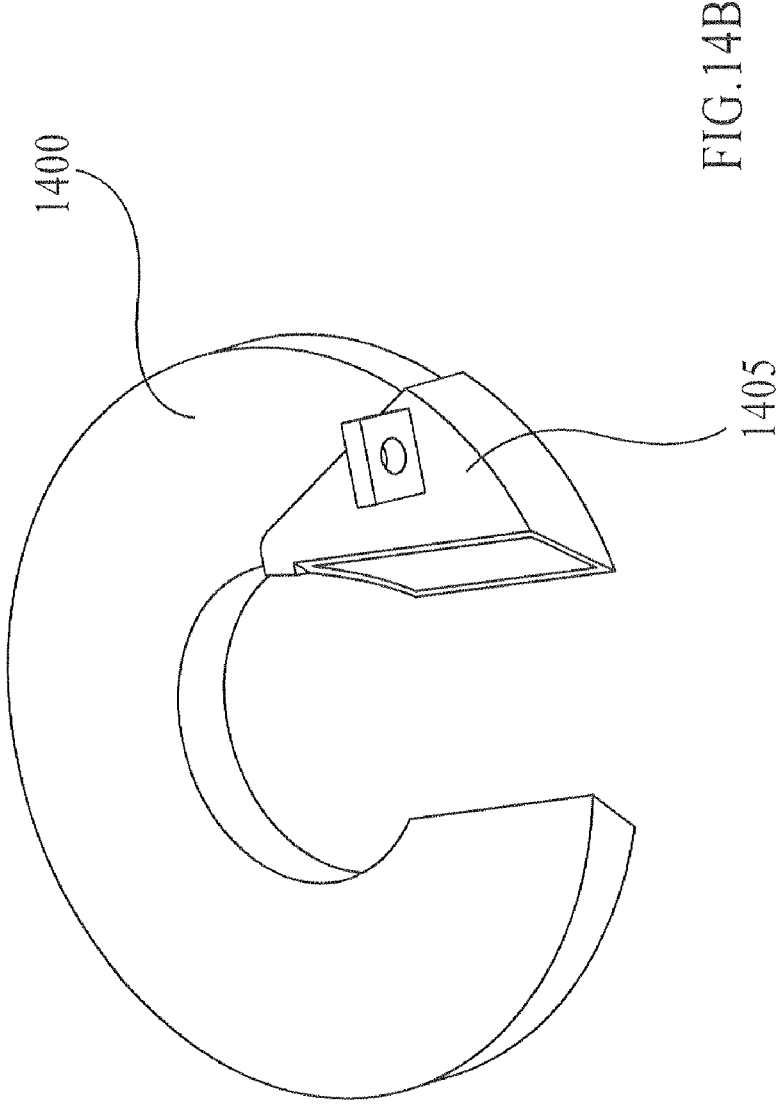

FIGS. 14A-14C show a structural holder 1405 for use with an epoxy dipped and cut tape wound core 1400 (e.g., a core similar to that shown in FIG. 7A), in accordance with aspects of the present invention. As further shown in FIG. 14B, in an assembled position, the holder 1405 aligns with one of the cut edges of the core 1400. FIG. 14C shows a variation having two holders 1405, 1406 assembled with a core 1400.

FIGS. 14D-14G present exemplary cross-sectional representations of tape wound cores formed into certain shapes that are advantageous for flux conducting, in accordance with aspects of the present invention. FIG. 14D shows an exemplary tape wound core 1450 constrained into a generally pentagon shape. FIG. 14E shows the core 1450 of FIG. 14D with a section 1451 removed. The shape of the core 1450 in this variation results in a larger cross-sectional area of the core 1450 at the cut edges 1451a, 1451b, than would occur for a cut at an unstretched location (e.g., across axis 1455).

Similarly, FIG. 14F shows an exemplary tape wound core 1460 constrained into a generally bulbous rectangular shape. FIG. 14G shows the core 1460 of FIG. 14F with a section 1461 removed. The shape of the core 1460 in this variation similarly results in a larger cross-sectional area of the core 1460 at the cut edges 1461a, 1461b, than would occur for a cut at an unstretched location (e.g., across axis 1465).

FIG. 15 shows an exemplary tape wound core in an unstretched orientation 1500a and in a fully stretched orientation 1500b. Adhesive may be induced to fill the gaps between coil layers by orienting the core in the stretched position 1500b, applying adhesive to the surface of the coil layers, and then returning the coil to the unstretched position 1500a. Similarly, the core may be treated between layers (e.g., to insulate between the layers) by stretching the core, adding the treating coating, and then returning the core to the unstretched position when cured.

Figure 16A:
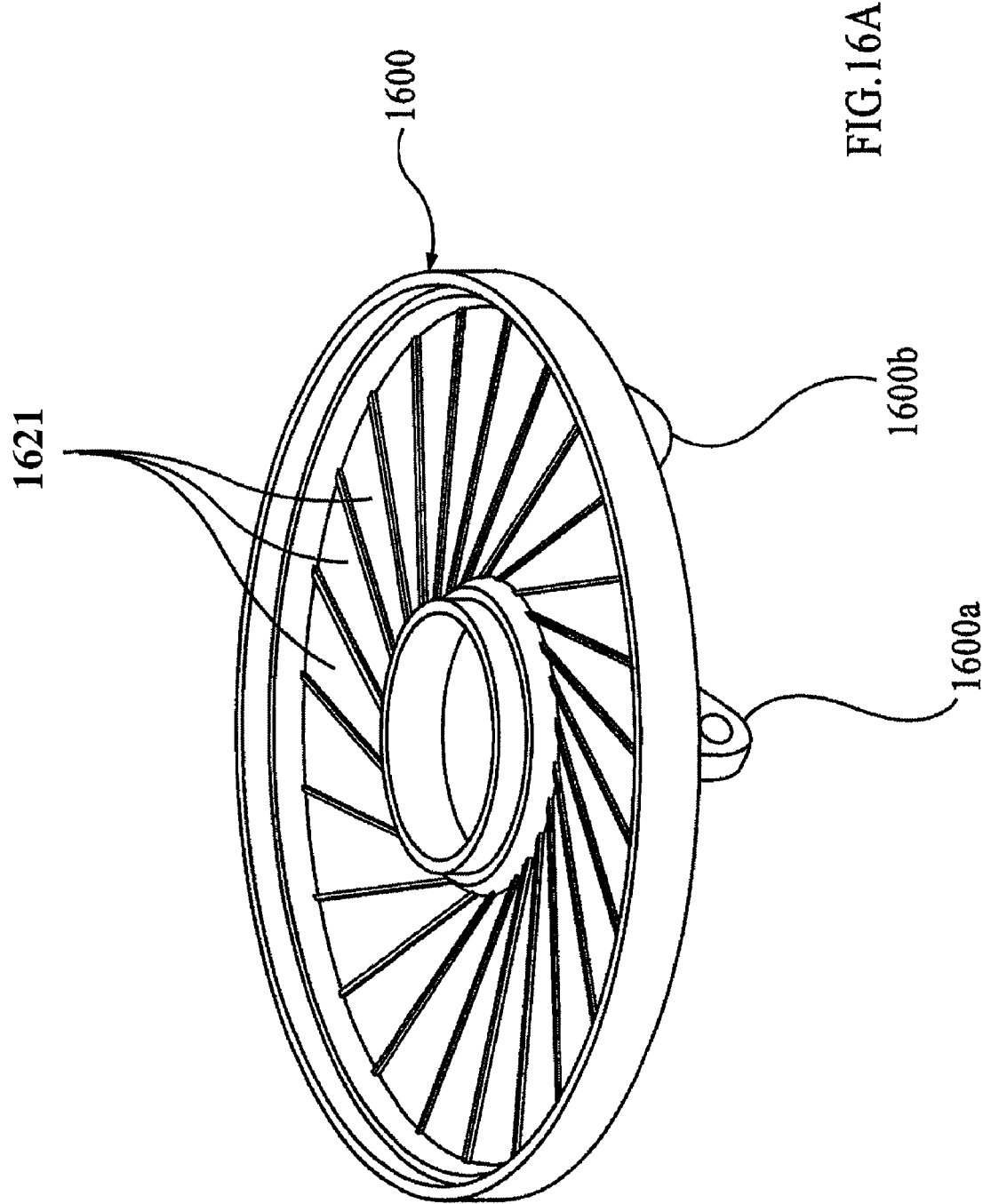
Figure 16B:
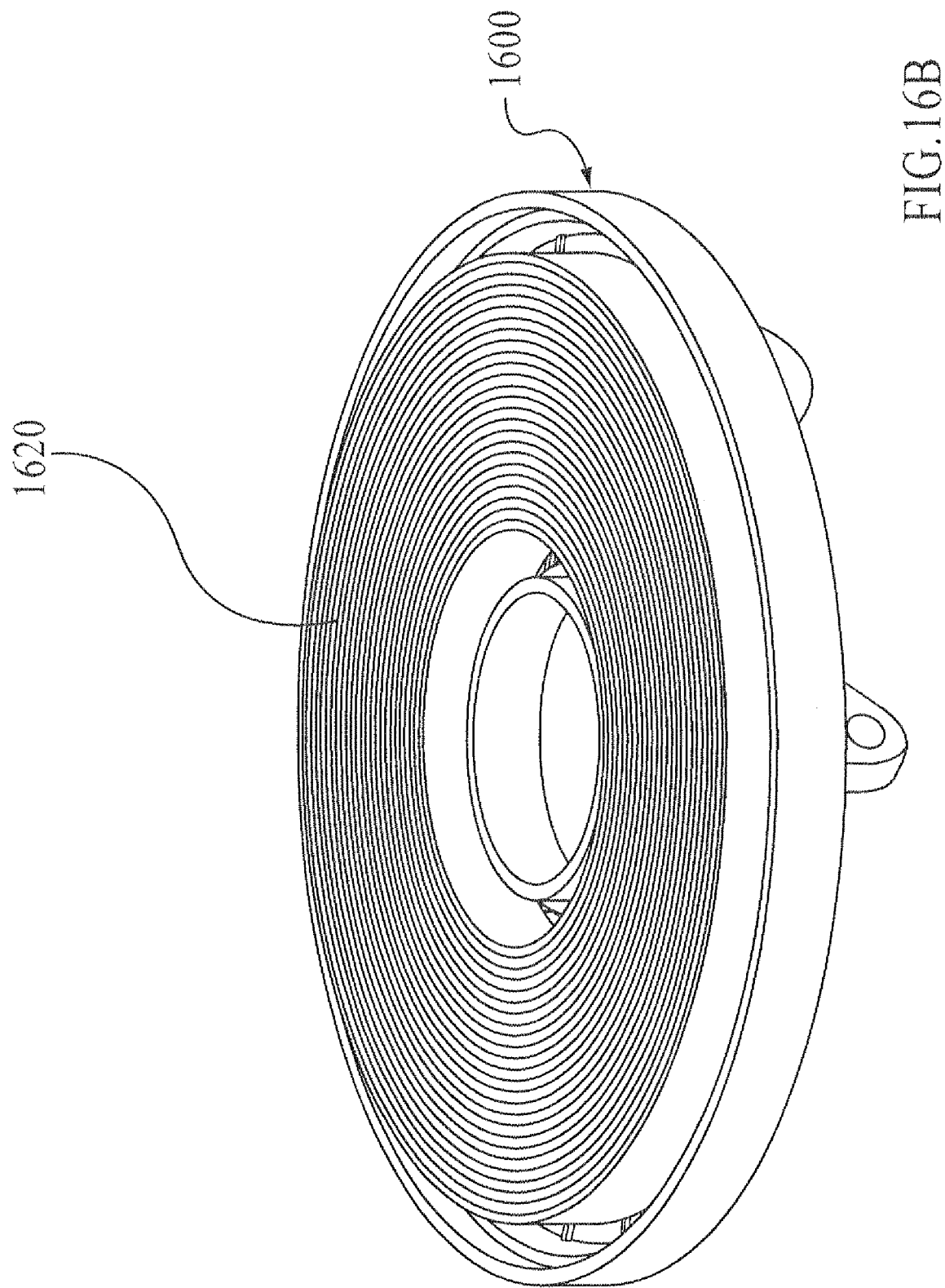

FIGS. 16A-16H show another variation of encapsulating features and method of encapsulating a tape wound core, in accordance with aspects of the present invention. As show in FIG. 16A, a first enclosure portion 1600 is provided for receiving the tape wound core (see FIG. 16B for tape wound core). The first enclosure portion 1600 optionally includes one or more flow channels 1621 for channeling flow of liquid or semi-liquid adhesive and has extending attachment tabs 1600a, 1600b. FIG. 16B shows the first enclosure portion 1600 of FIG. 16A after receiving a tape wound core 1620.

Figure 16D:
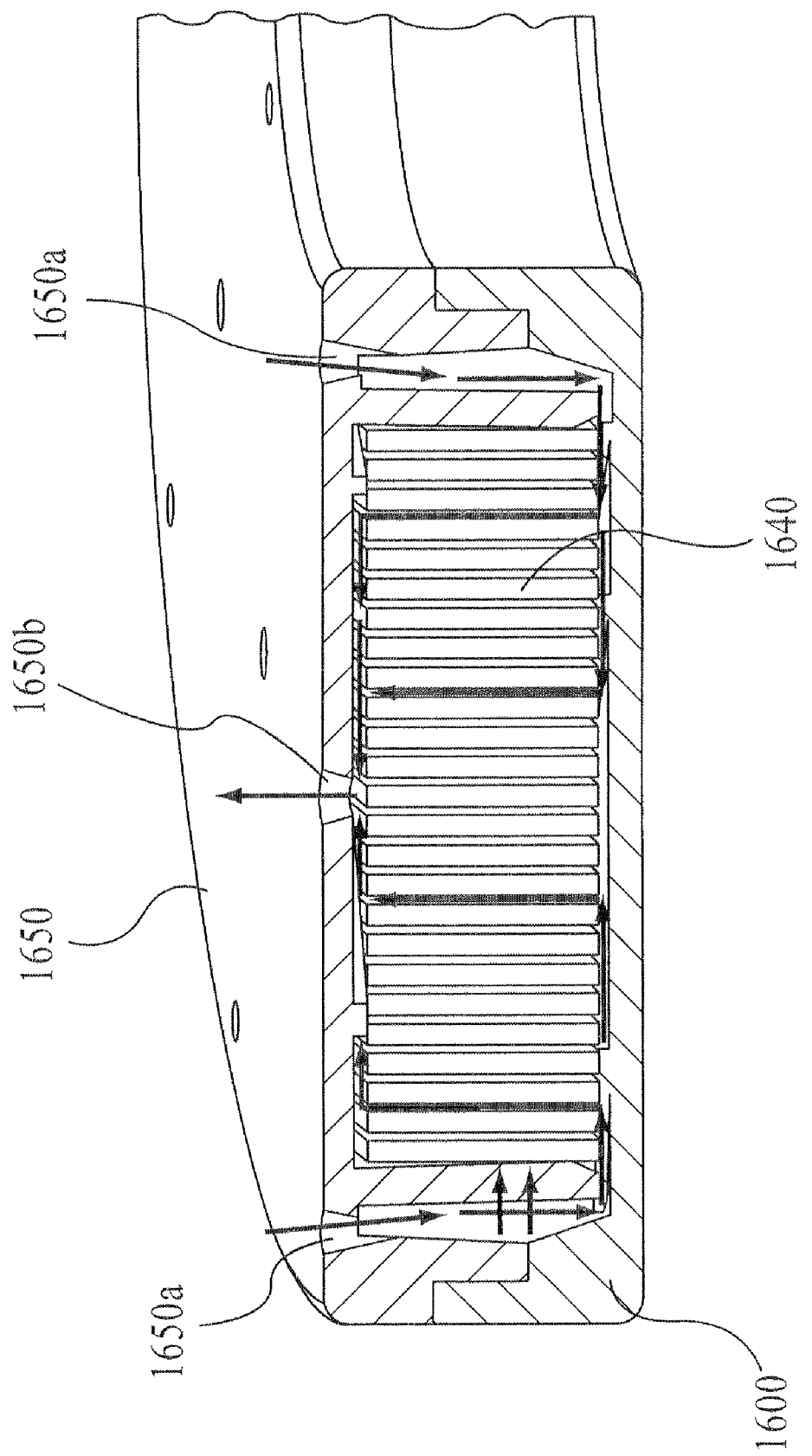

FIG. 16C shows a view of the tape wound core fully enclosed within the first enclosure portion 1600 and the second enclosure portion 1650. The second enclosure portion 1650 may be fused or otherwise attached to the first enclosure portion 1600. Second housing portion 1650 optionally includes one or more adhesive flow openings 1650a and one or more pressure port openings 1650b. In addition, second enclosure portion 1650 optionally includes first and second extending attachment tabs 1650c, 1650d. FIG. 16D shows a cutaway view of the enclosed tape wound core 1620 within first and second enclosure portions 1600, 1650. As shown in the exemplary implementation of FIG. 16D, the adhesive is delivered to the tape wound core 1620 within the first and second enclosure portions 1600, 1650 via one or more openings 1650a. The one or more flow channels 1621 enhance distribution of the adhesive throughout the tape wound core 1620 by creating a flow path. Optionally, to enhance adhesive flow, suction or other pressure may be communicated with the interior of the assembled device via one or more pressure point openings 1650b.

Figure 16F:
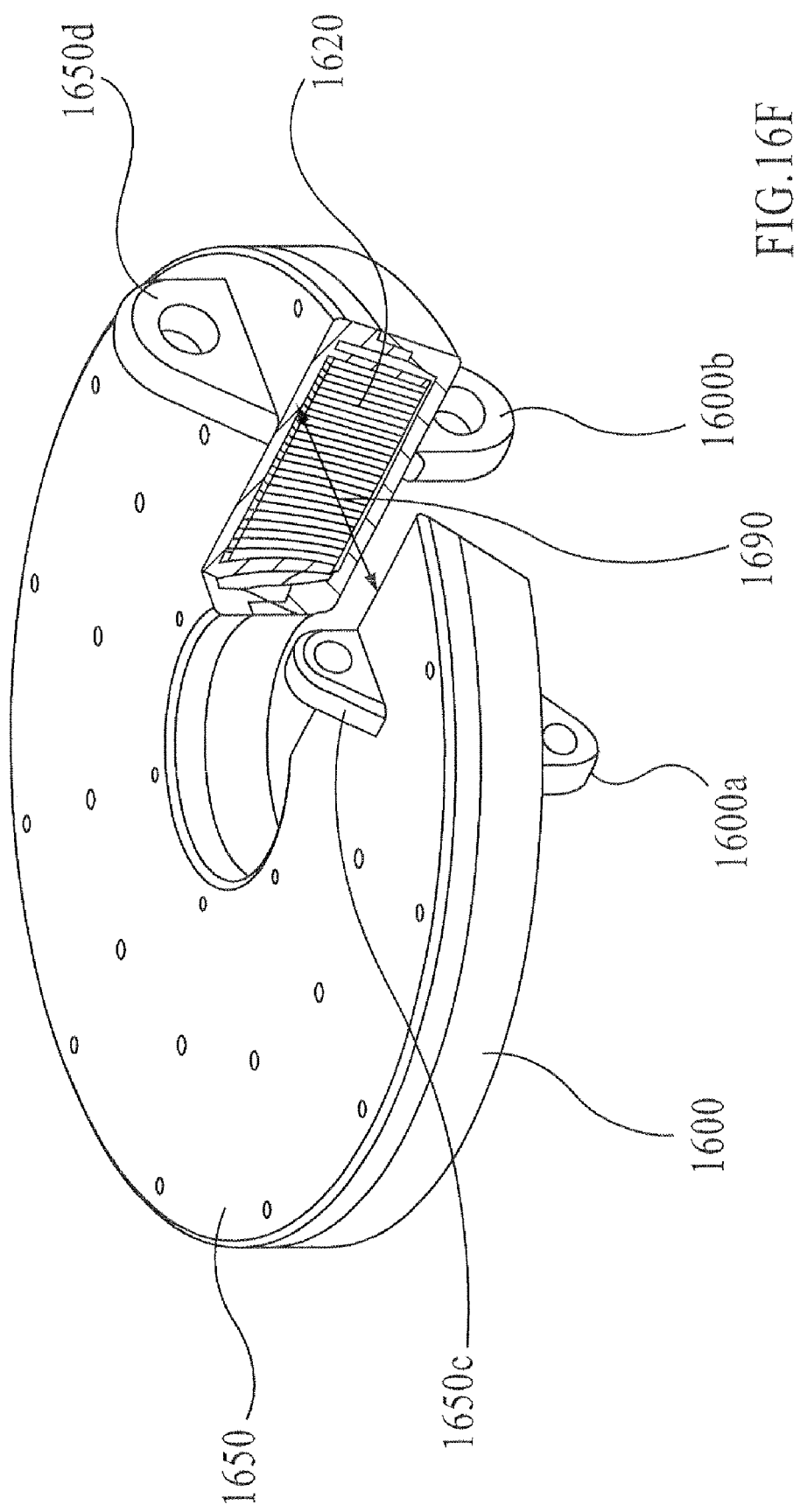

FIG. 16E shows a slight perspective view of the first and second enclosure portions 1600, 1650 with the tape wound core having adhesive applied and cured, with an opening 1690 thereafter formed (e.g., cut) in the device. FIG. 16F shows another perspective view of the device of FIG. 16E. After cutting the gap 1690, a protective coating, cover, or other treatment may optionally be applied to the exposed portion of the tape wound core 1620 at each cut edge; among other advantages, the use of such protective layer reduces rusting and/or moisture contamination, as well as protects against physical damage.

Figure 16G:
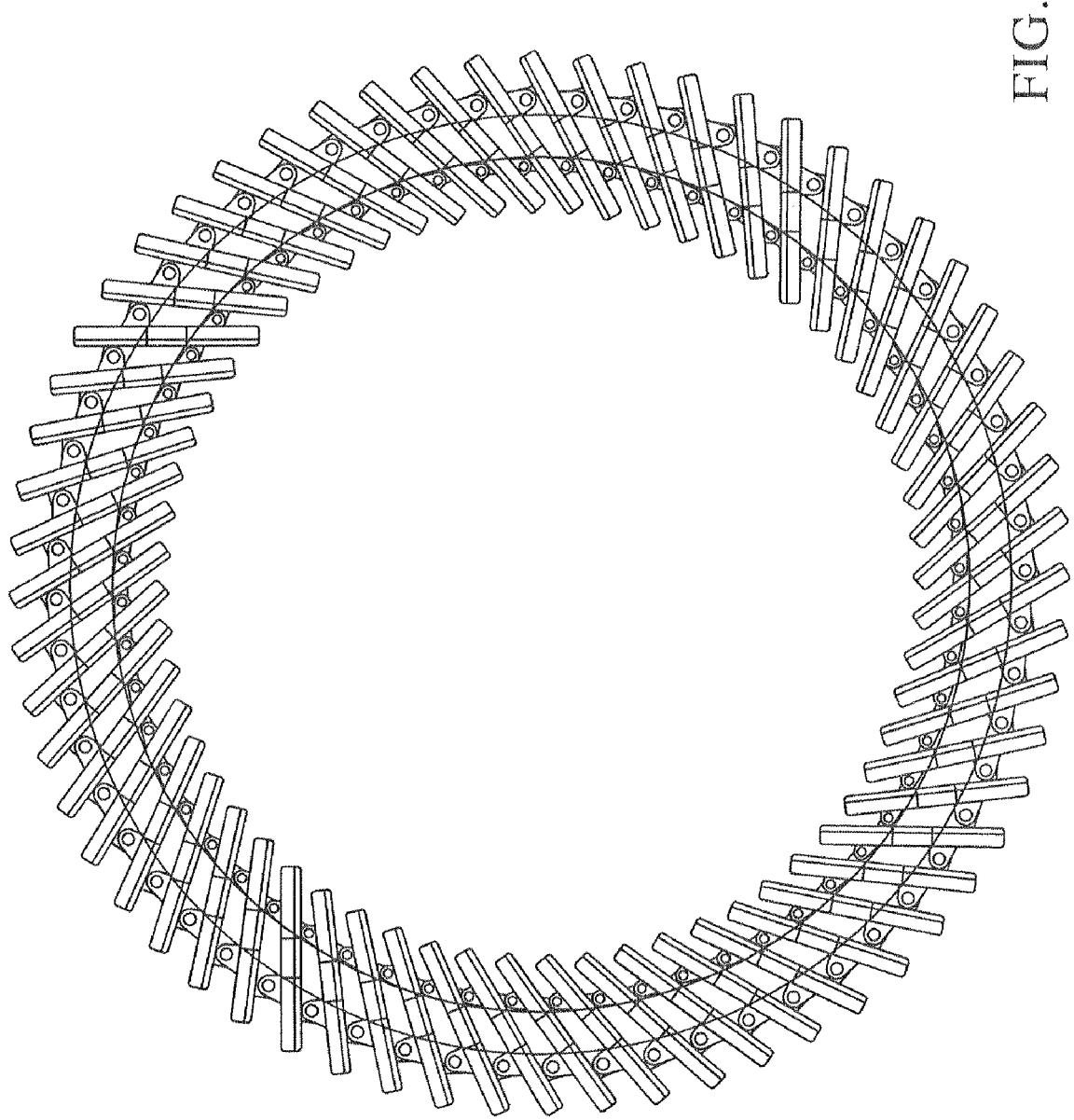
Figure 16H:
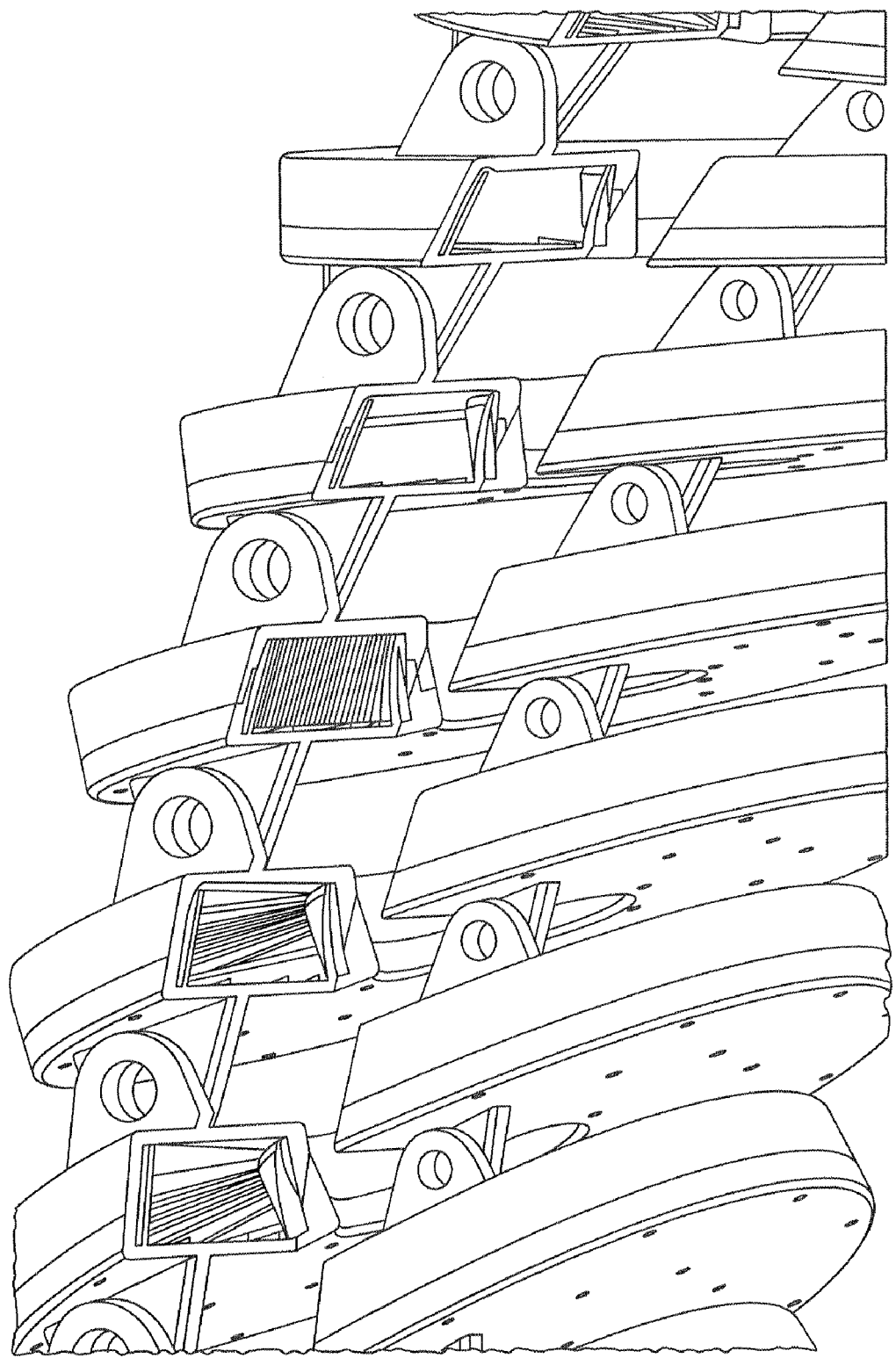

FIG. 16G shows a plurality of devices similar to the device of FIG. 16F attached via the extending attachment tabs (see tabs 1600a, 1600b, 1650c, 1650d, as shown in FIG. 16F) of each device, so as to form a radial assembly for use in electrical output generating devices or driven devices, in accordance with aspects of the present invention. FIG. 16H shows a close-up view of the interlocking features of the tabs and devices shown in FIG. 16G.

FIG. 17 presents another variation of an assembled housing for use with a tape wound core. As shown in FIG. 17, the device 1700 includes first and second partially encapsulating portions 1710, 1720 attached together. A portion of the encapsulating portions 1710, 1720, along with a portion of the tape wound core 1620 has been removed (e.g., cut) to form opening 1750. The method of manufacture and components of the device 1700 of FIG. 17 are similar to those for the device of FIG. 13H, except an additional portion of the tape wound core 1620 remains partially exposed (i.e., not fully encapsulated). Among other things, this variation may enhance cooling effects for the tape wound core 1620 during operational use.

Figure 18A:
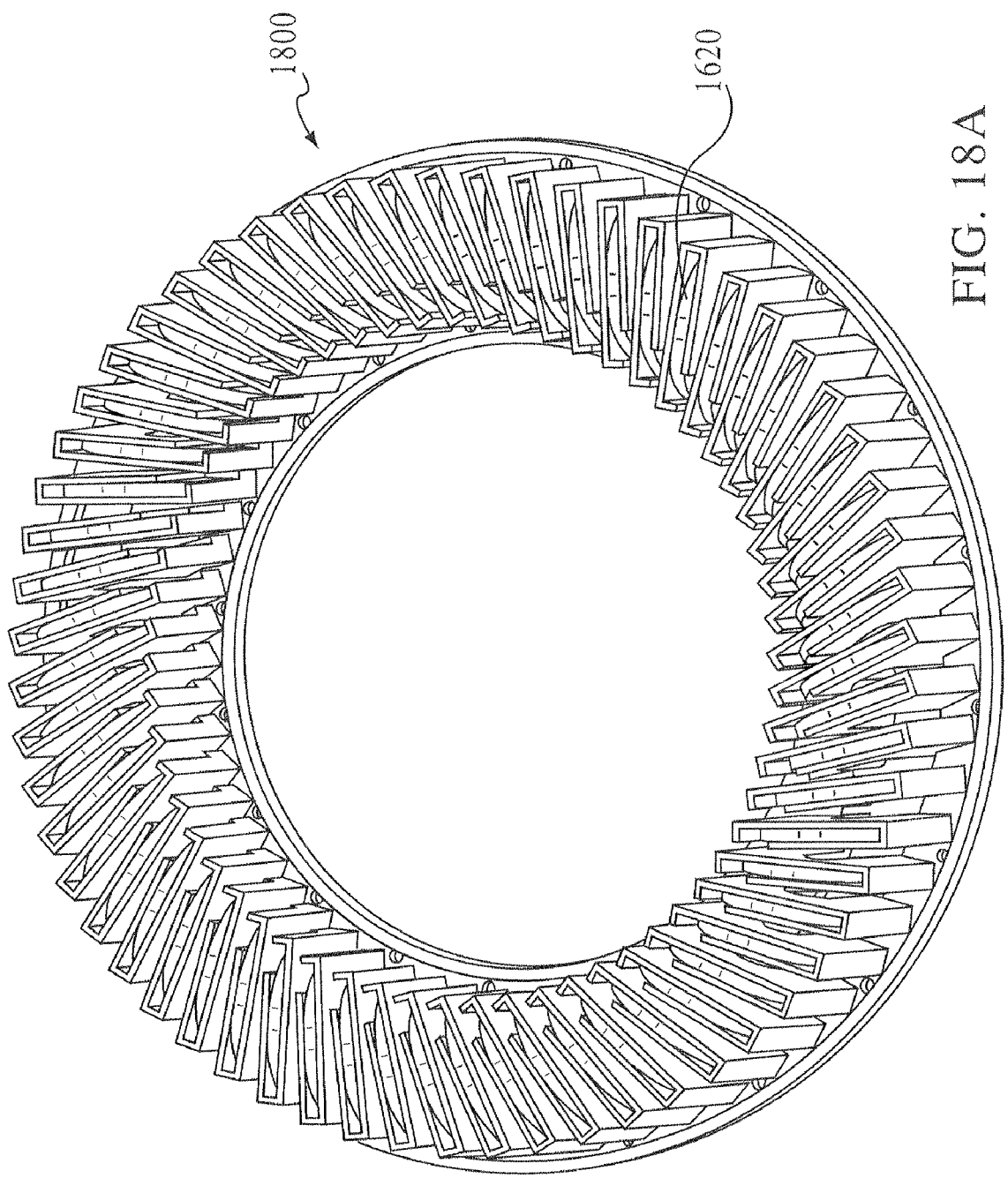
FIGS. 18A-18B show a perspective and close-up partial view, respectively, of an exemplary cassette-type rotor or stator portion for holding a plurality of tape wound core portions annularly about the generally ring-shaped cassette-type rotor or stator portion, in accordance with aspects of the present invention.
Figure 18B:
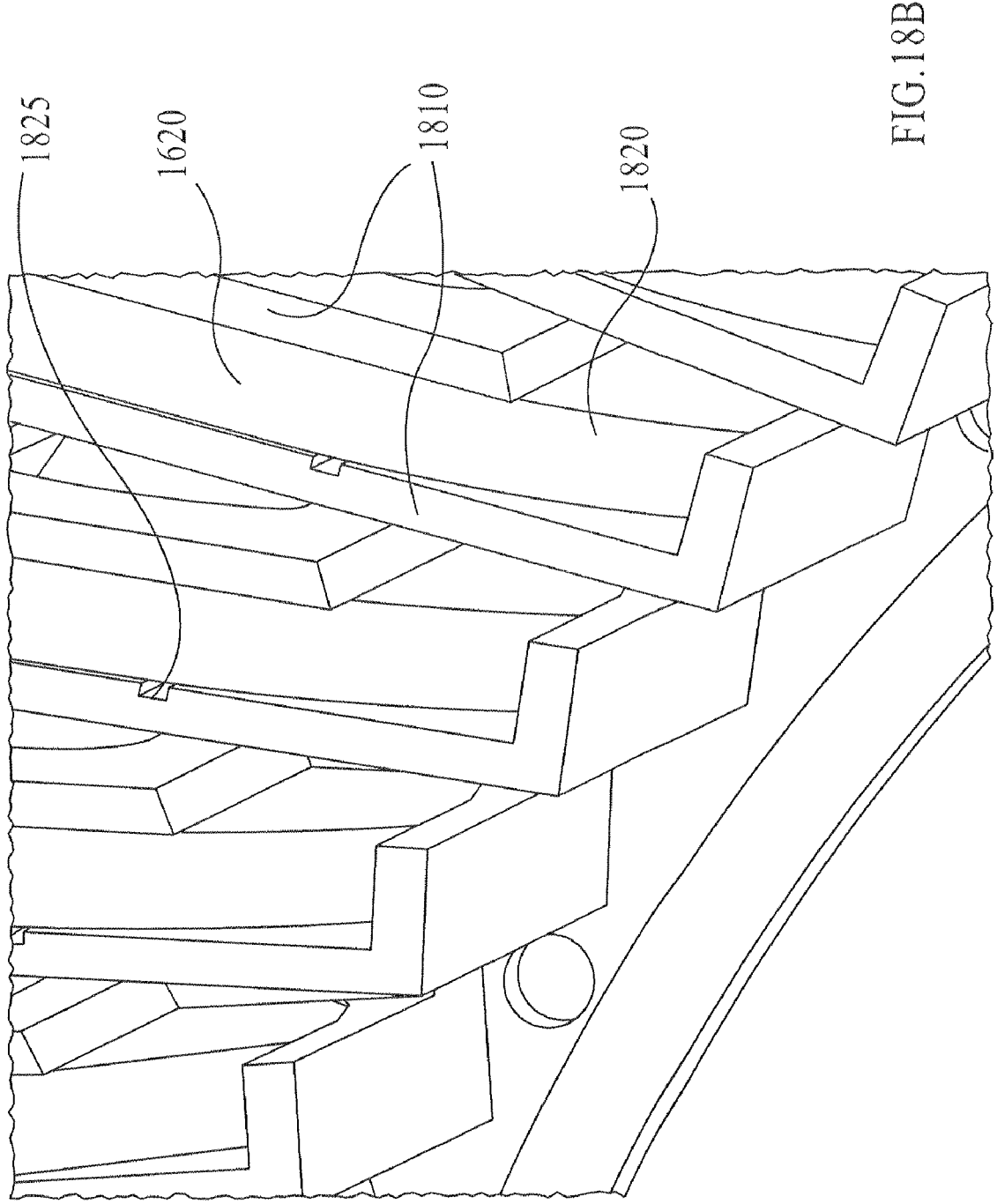

FIGS. 18A-18B show a perspective and close-up partial view, respectively, of an exemplary cassette-type rotor or stator portion 1800 for holding a plurality of tape wound core portions 1620 annularly about the generally ring-shaped cassette-type rotor or stator portion 1800, in accordance with aspects of the present invention. As shown most clearly in FIG. 18B, the tape wound core portions 1620 are each housed in a partially enclosing walled section 1810. Among other things, at least one opening 1820 in each partially enclosing walled section allows air or fluid to pass about the tape wound core portions to cool the tape wound core portion during operation of an electrical output generating device or driven device incorporating the cassette-type rotor or stator portion 1800 and plurality of tape wound core portions 1620. In some variations, the enclosing walled section may include one or more engagement slots or other retention and/or assembly enhancement features 1825.

Figure 19A:
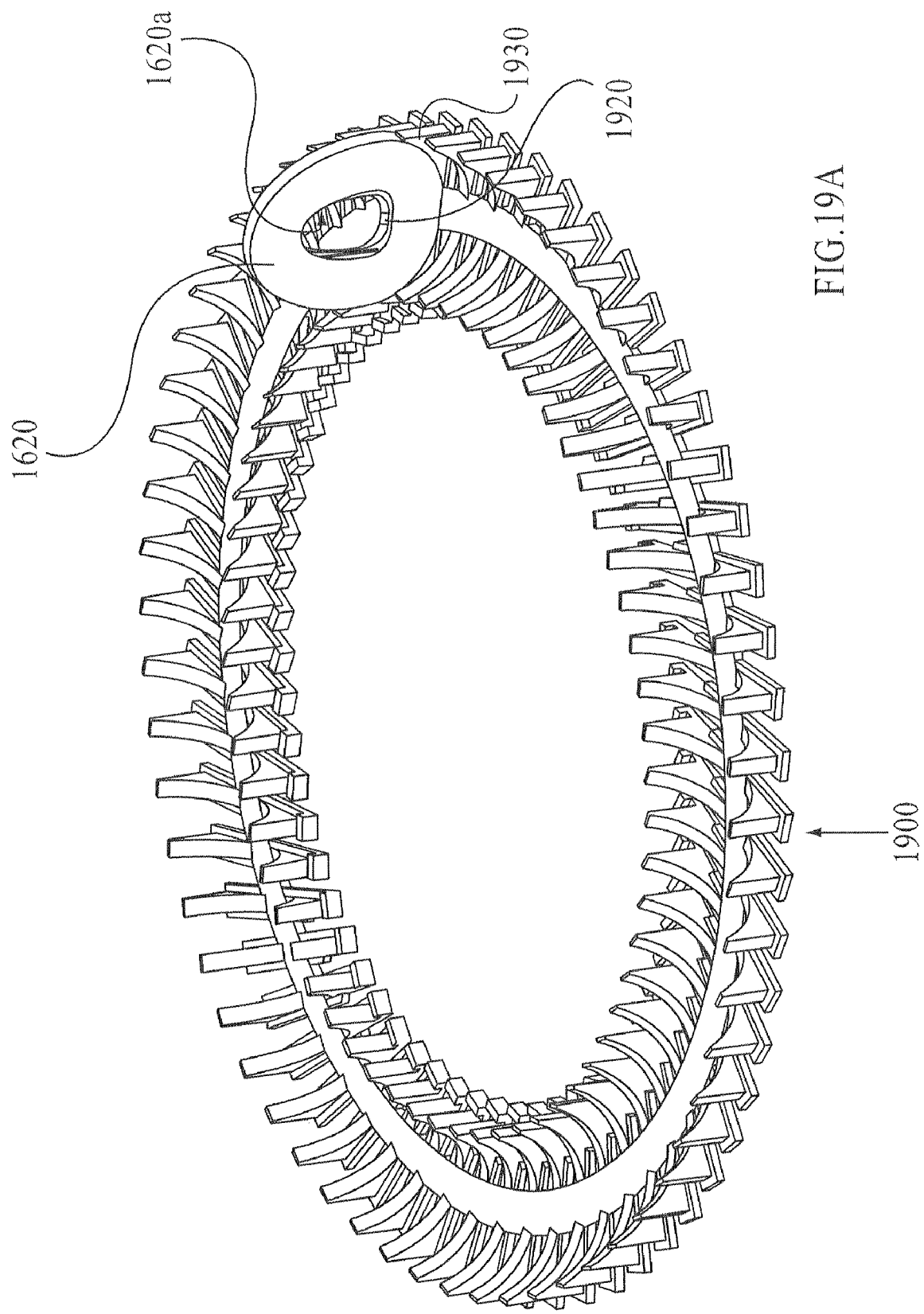
FIGS. 19A-19F present another exemplary cassette-type stator or rotor portion for housing a plurality of tape wound core portions, in accordance with aspects of the present invention.
Figure 19B:
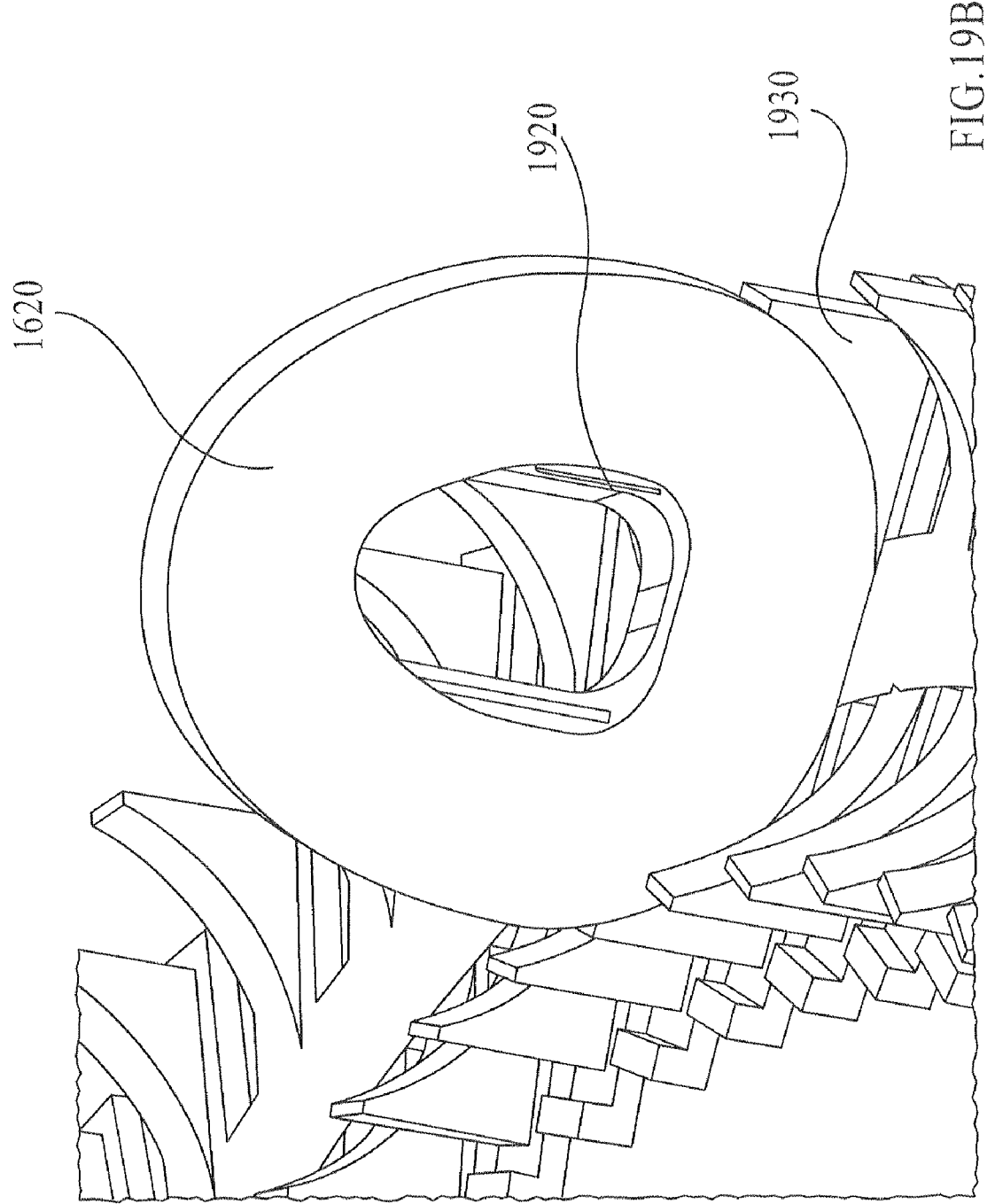
Figure 19C:
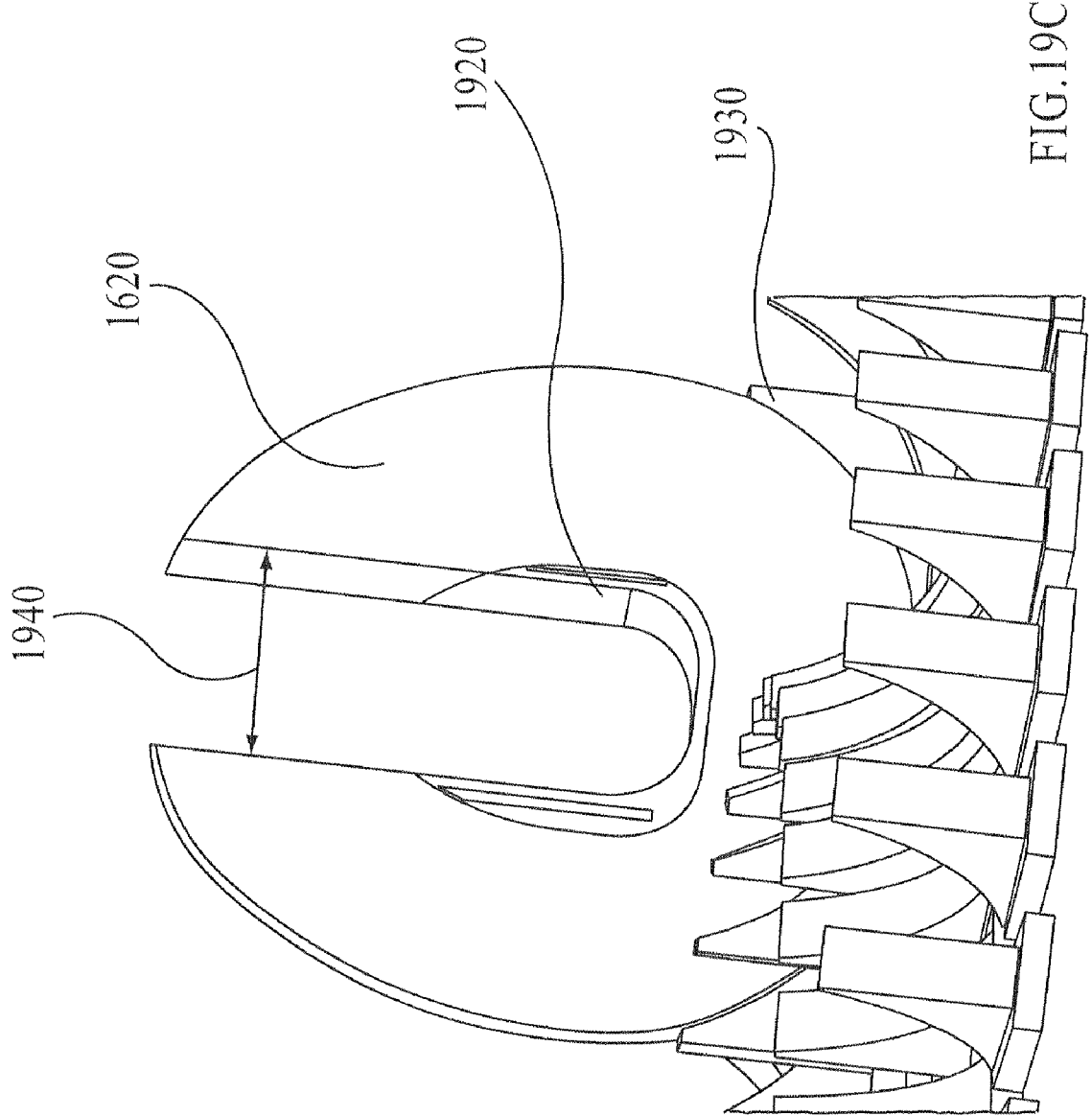

FIGS. 19A-19F present another exemplary cassette-type stator or rotor portion for housing a plurality of tape wound core portions, in accordance with aspects of the present invention. In some implementations, as discussed with regard to FIGS. 19D-19F, the exemplary cassette-type stator or rotor portion shown and described with respect to FIGS. 19A-19C is usable in conjunction with the cassette-type rotor or stator portion 1800 of FIGS. 18A-18B.

As shown in FIG. 19A, a first section 1900 of a two part cassette-type stator or rotor portion is shown, with an exemplary tape wound core portion 1910 emplaced therein. The tape wound core portion 1620 has within its central opening 1620a a shaping insert 1920 for shaping the core portion central opening 1620a as shown. In some implementations, the use of insert 1920 can have important advantages beyond shaping the tape wound core portion 1620. For example, during operation, an electrical output generating device or driven device may produce vibrational force on the tape wound core portion 1620. In the absence of the shaping insert 1920, the integrity of the tape wound core portion may depend solely on an adhesive coating at the edges of the tape wound core portion 1620. During extended or severe condition operation, the integrity of the tape wound core portion 1620 may fail. Insert 1920 can therefore serve as a significant enhancement to the integrity of the tape wound core 1920.

As further shown in FIG. 19A, a portion of the exterior shape of the tape wound core portion 1910 is further governed by fit into the rib portions 1930 of the first section 1900. FIG. 19B shows a close up view of a portion of the first section shown in FIG. 19A. FIG. 19C shows a close up view of a tape wound core portion 1620 in accordance with FIGS. 19A and 19B, with a section 1940 removed (e.g., cut away).

Figure 19D:
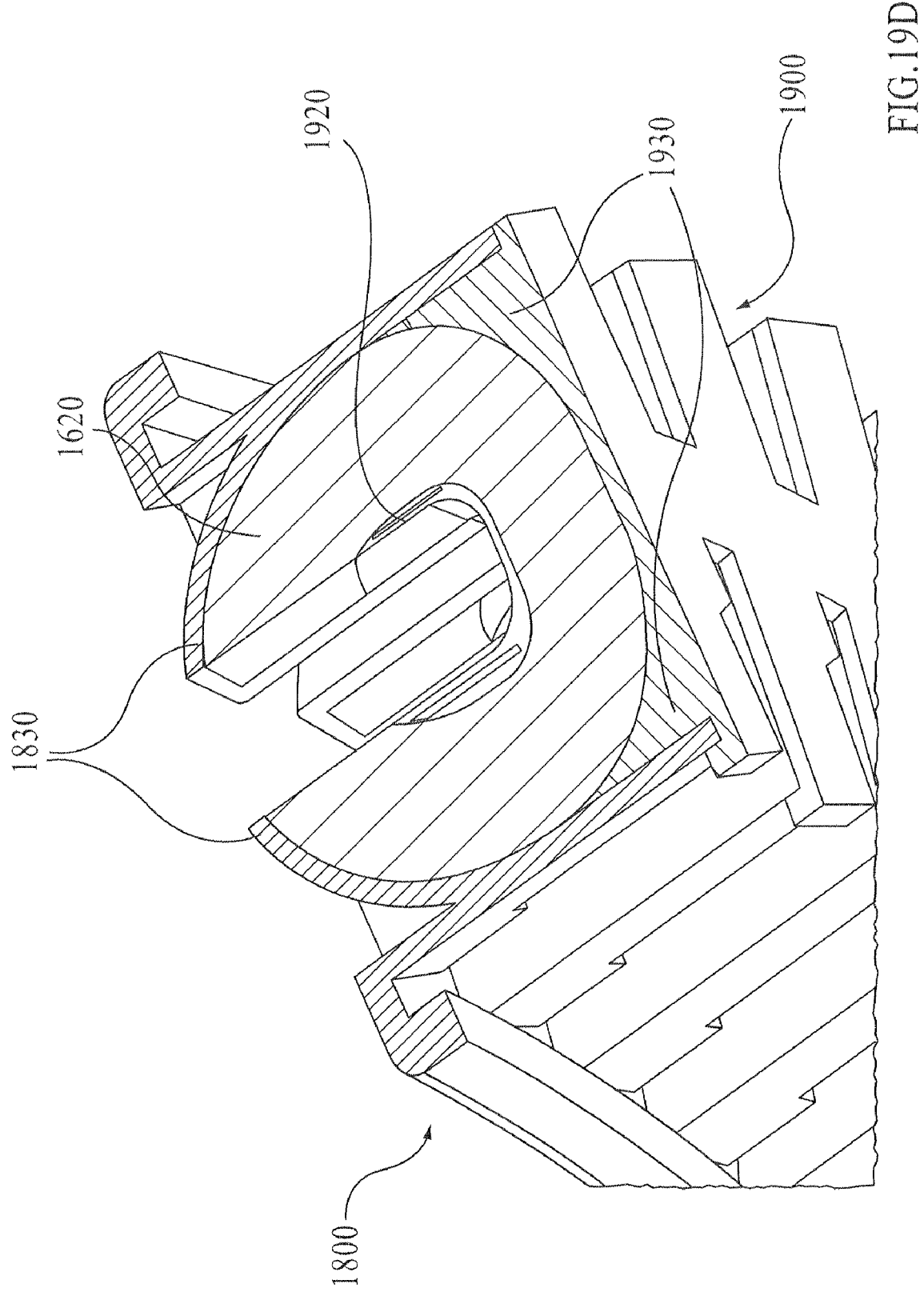
Figure 19E:
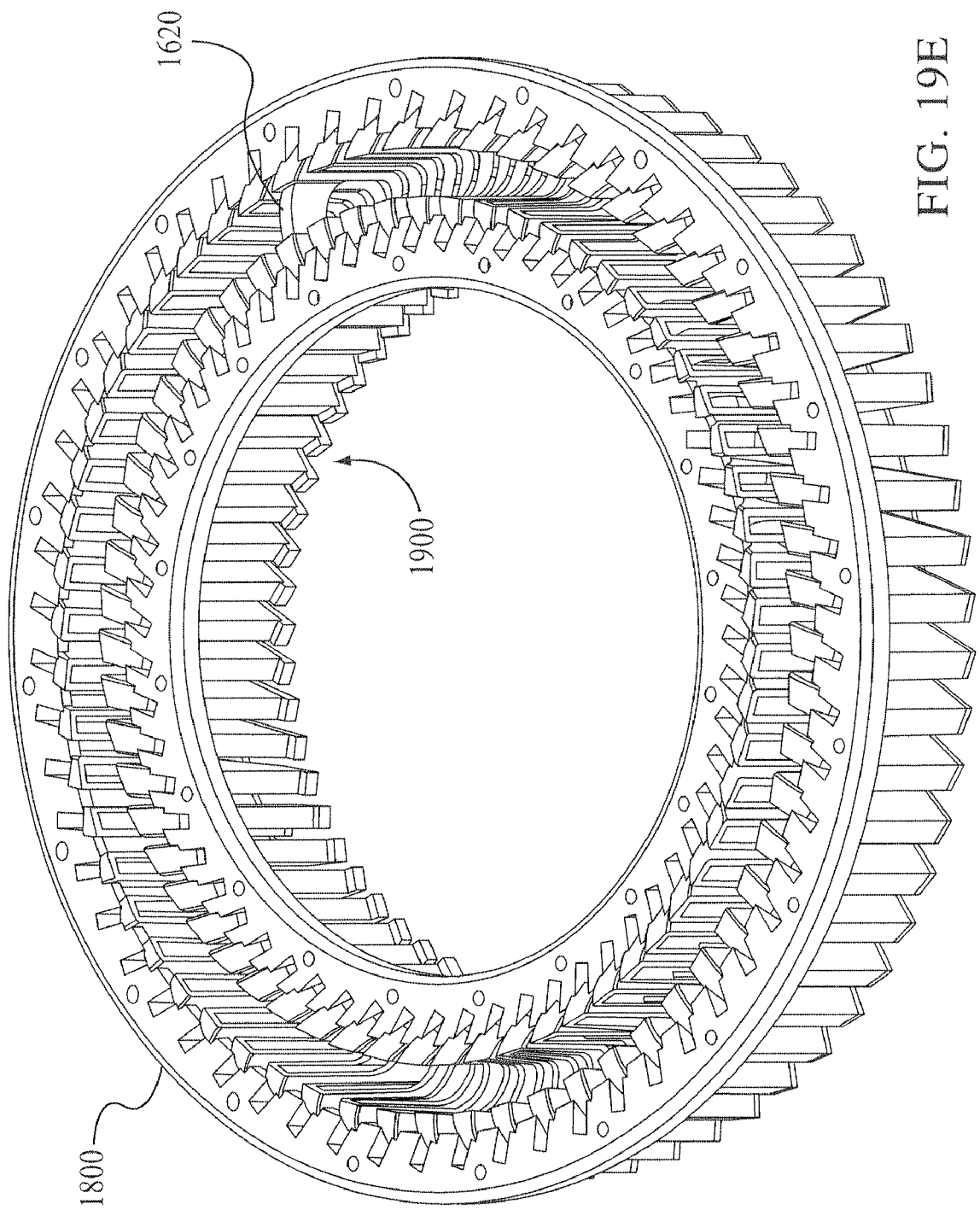
Figure 19F:
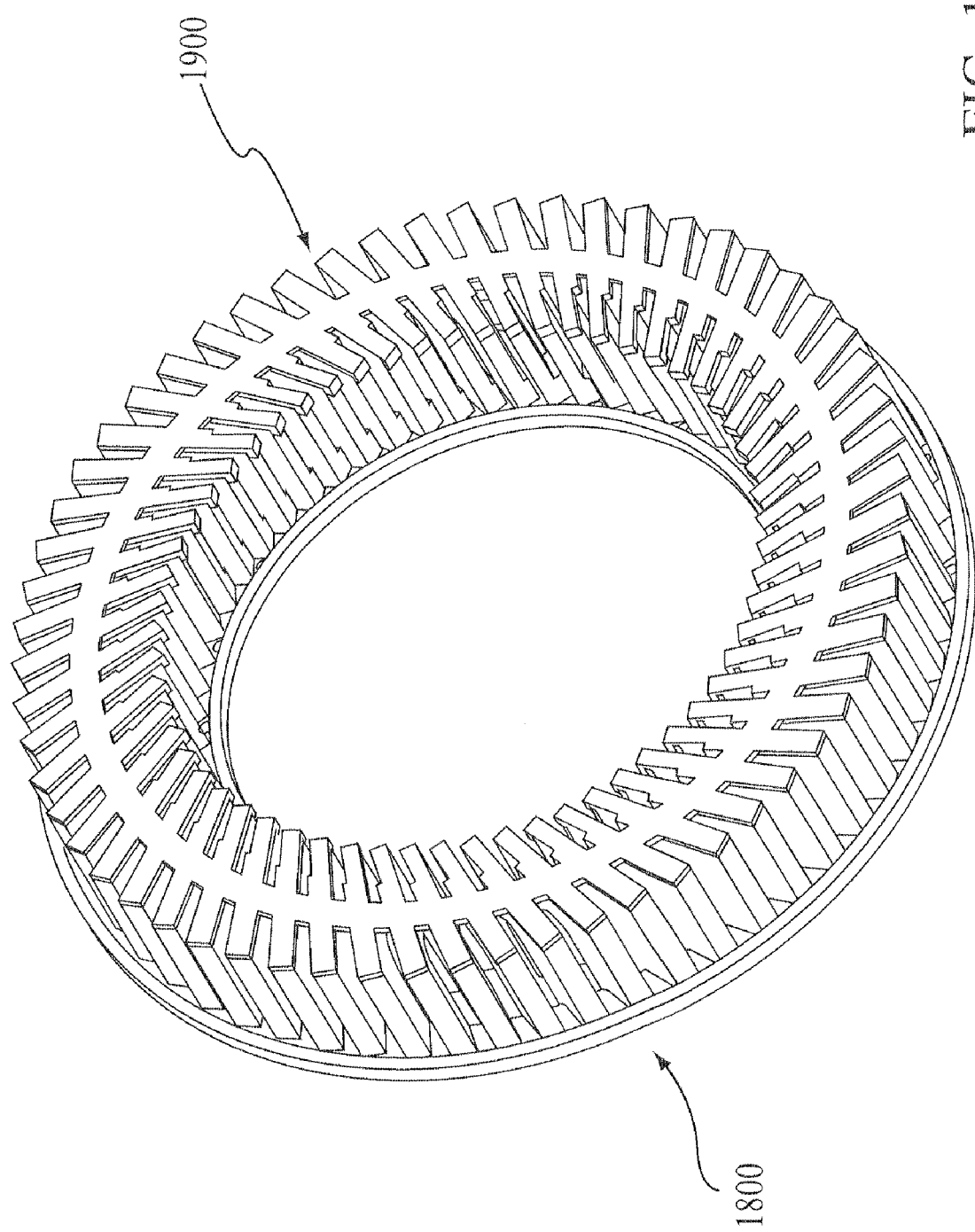

FIG. 19D shows a view of the first section 1900 and the sectioned tape wound core portion 1620 of FIG. 19C engaged with a second section 1800 of the two part cassette-type stator or rotor portion. As shown in FIG. 19D, the exterior of the tape wound core portion 1620 is further shaped by fit to wall sections 1830 of the second section 1800. The first and second sections 1900, 1800 may fit together via snap attachment, frictional attachment, adhesive bond, sonic weld, or other appropriate attachment mechanism or method. FIGS. 19E and 19F show two perspective views of the assembled two part cassette-type stator or rotor portion of FIG. 19D.

Figure 20:
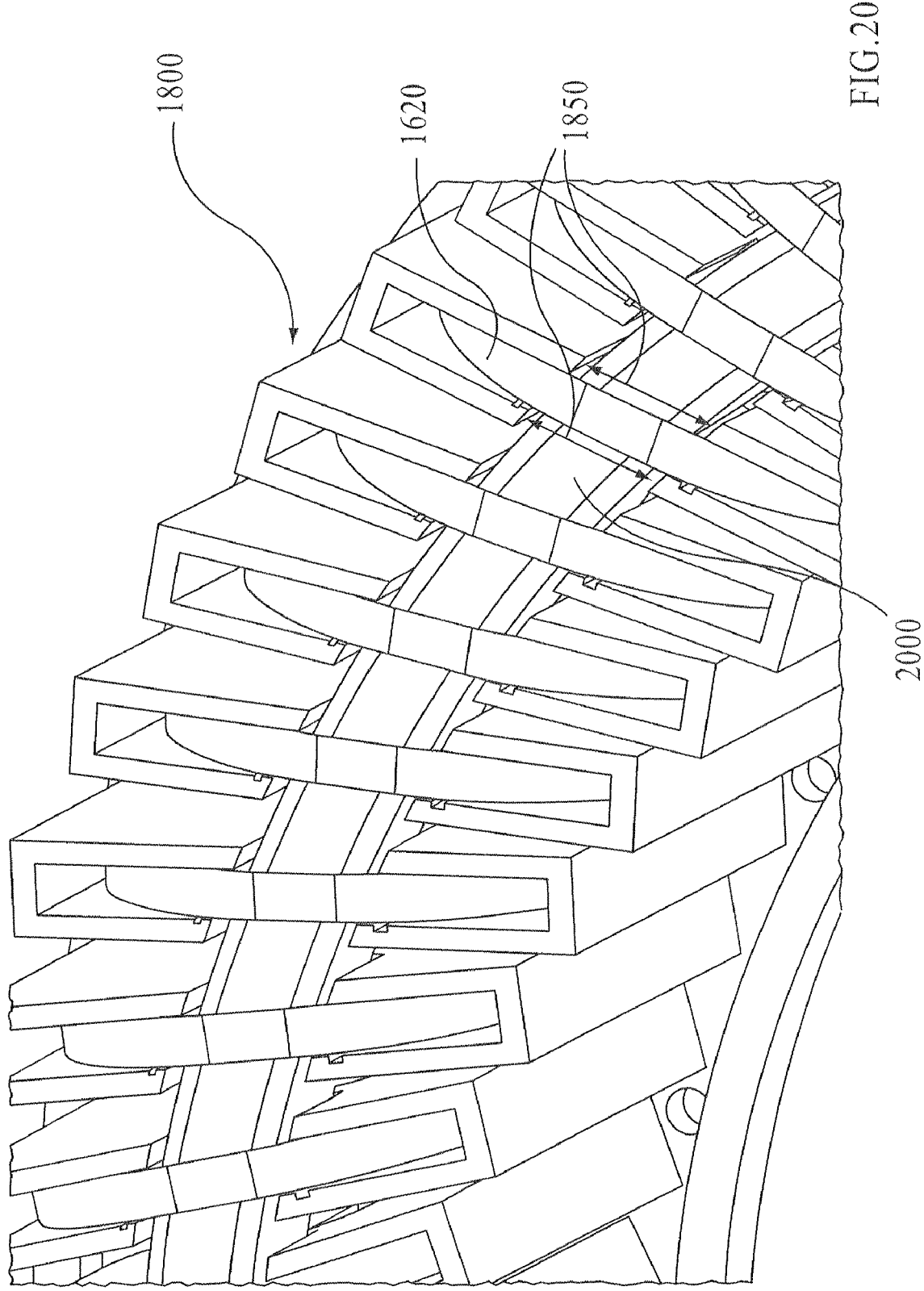
FIGS. 20-22 show views of a variation of a device having a plurality of wedges comprising flux conducting material provides flux connection among the tape wound core portions, in accordance with aspects of the present invention.
Figure 21:
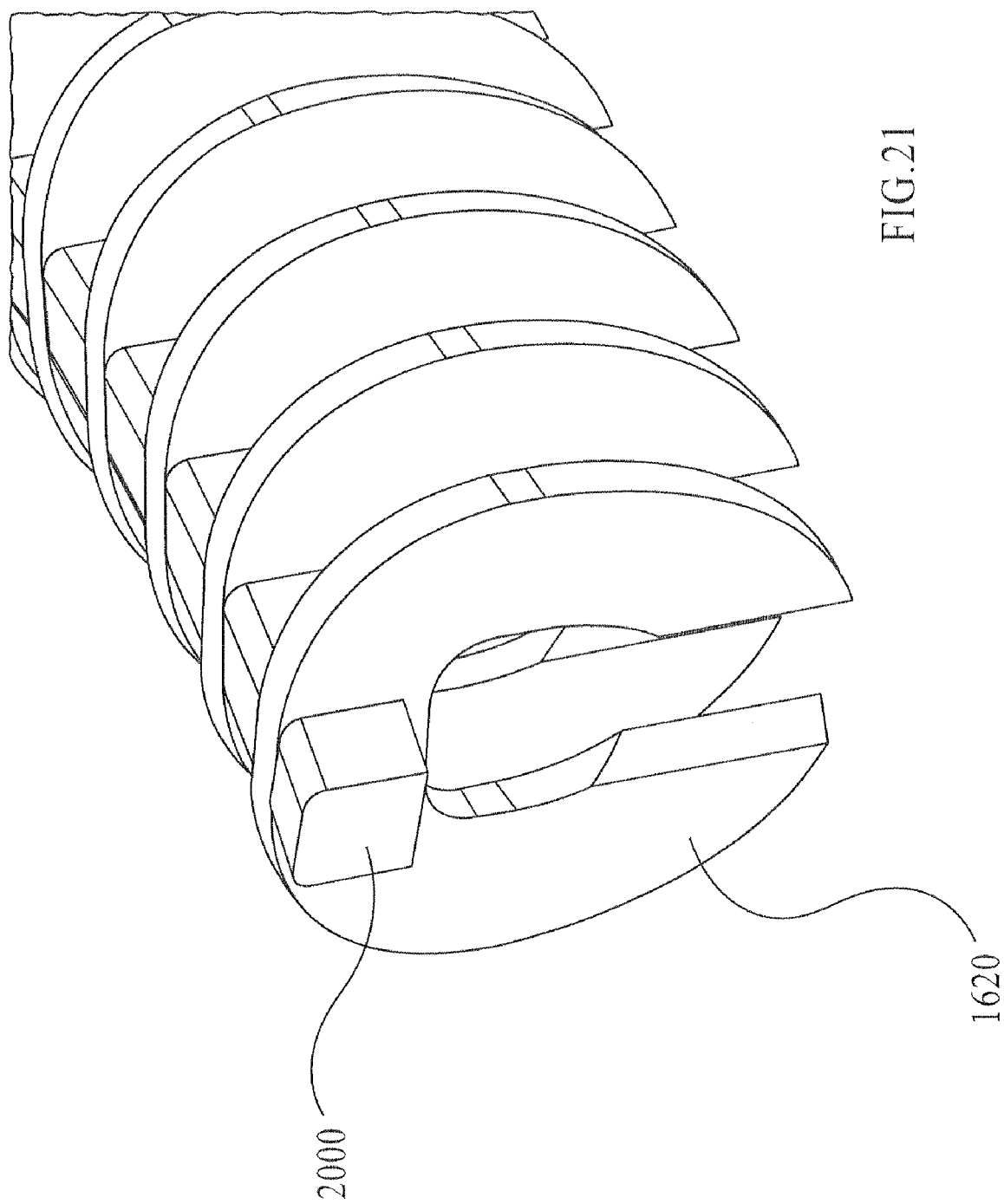
Figure 22:
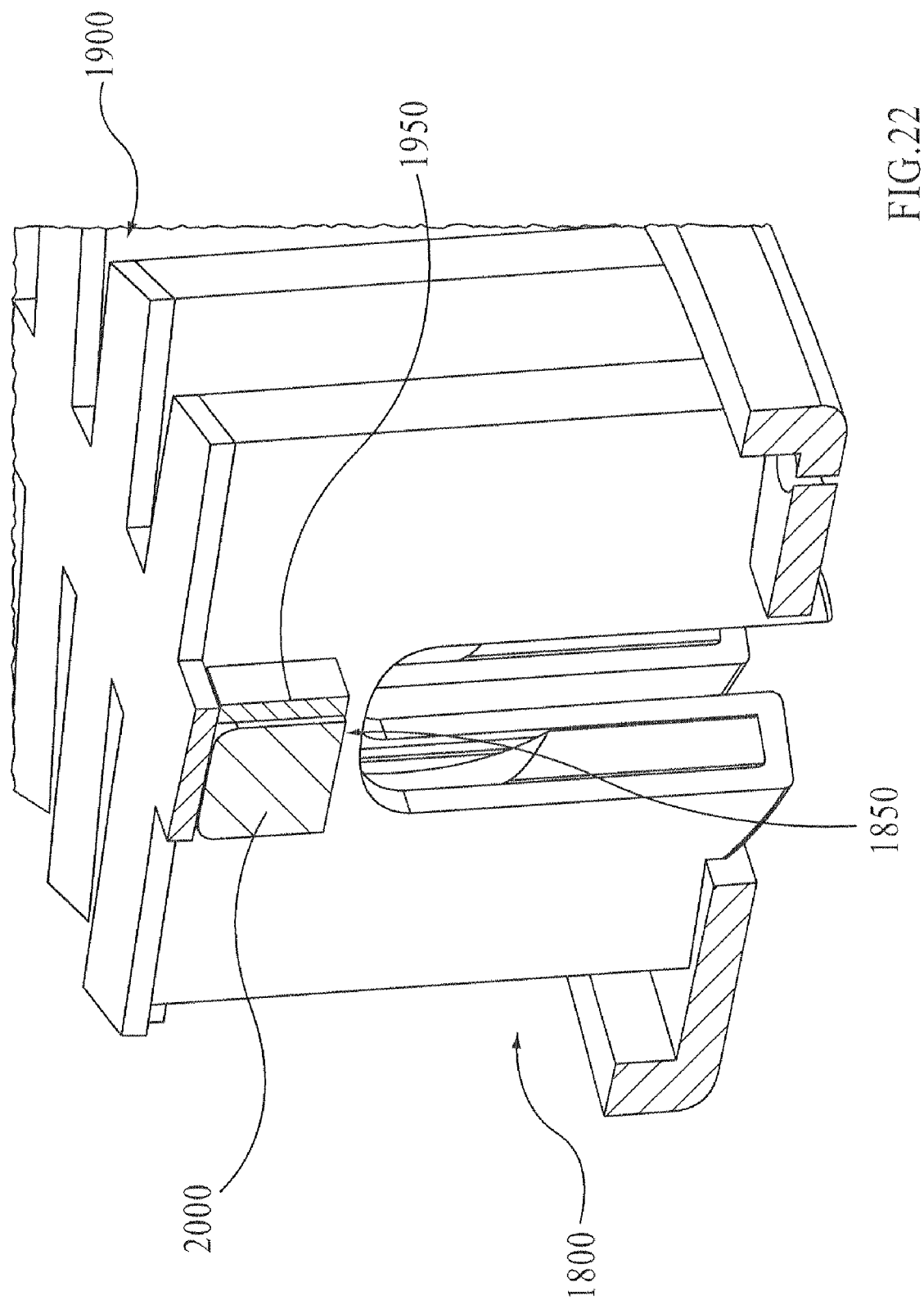

FIGS. 20-22 show views of a variation of a device having a plurality of wedges comprising flux conducting material provides flux connection among the tape wound core portions, in accordance with aspects of the present invention. In FIG. 20, an exemplary cassette-type rotor or stator portion 1800 is shown with tape wound core portions 1620 emplaced within enclosing walled sections. Openings 1850 are shown in the walled sections of the cassette-type rotor or stator portion 1800. Received within the openings 1850 are a plurality of flux conducting connection portions 2000.

Among other things, the flux conducting portions 2000 enable flux paths to be formed between tape wound core portions 1620. The value of such additional flux paths includes increased flux conduction for magnet portions located between tape wound core portions 1620 during device operation. For example, in FIG. 11A, while magnet portion 1040b is aligned with tape wound core 750 such that flux path $P_1$, $P_2$ can easily form, a flux path for magnet portion 1040a may not so easily form, due to the position of magnet portion 1040a between two tape wound core portions. By enabling a flux path between the two tape wound core portions in close proximity to magnet portion 1040a, additional flux conduction may occur.

FIG. 21 shows a representative view of the added flux conducting portions 2000 connecting tape wound core portions 1620.

FIG. 22 shows another view of the cassette-type rotor or stator portion 1800 with emplaced tape wound core portions 1620 and added connection portions 2000. Also shown is an emplaced first section 1900 engaged with the cassette-type rotor or stator portion 1800. The variation of the first section 1900 shown in FIG. 22 includes tab portions 1950 for interference fit between the connection portions 2000 and the edge of openings 1850. The tab portions 1950 are situated such that added connection portions 2000 are forced toward the inner radius of cassette-type rotor or stator portion 1800, thereby enhancing contact between adjacent tape wound core portions 1620 connected by the added connection portions 2000 (i.e., added connection portions 2000 are forced in the direction of narrowing distance between tape wound core portions 1620).

Example variations and implementations of devices in accordance with aspects of the present invention have now been described in accordance with the above advantages. It will be appreciated that these examples are merely illustrative. Many variations and modifications will be apparent to those skilled in the art.

In places where the description above refers to particular implementations of electrical output generating devices and/or electrically driven devices, it should be readily apparent that a number of modifications may be made without departing from the spirit thereof and that these aspects and implementations may be applied to other electrical output generating devices and/or electrically driven devices. The presently disclosed aspects and implementations are therefore to be considered in all respects as illustrative and not restrictive.

The invention claimed is:

1. An electrical device, comprising:
a coil;
a rotor assembly rotatable in a rotational direction about an axis, the rotor assembly being generally disc-shaped and comprising a plurality of magnet portions and a plurality of rotor flux conducting portions, each of the plurality of rotor flux conducting portions being located between a pair of the plurality of magnet portions; and
a stator assembly comprising a plurality of tape wound flux conducting core portions, wherein each of the plurality of tape wound flux conducting core portions has a pair of extensions, wherein each of the pair of extensions is oriented at an angle relative to the rotational direction of the rotor assembly, wherein at least a portion of each of the plurality of tape wound flux conducting core portions partially encompasses the coil;
wherein the stator assembly further comprises a cassette-type portion for housing the plurality of tape wound flux conducting core portions, and wherein the cassette-type portion includes a plurality of walled sections for retaining the plurality of tape wound flux conducting core portions; and
wherein the rotor assembly is moveable relative to the stator assembly such that each of the pair of extensions for each of the tape wound flux conducting core portions sequentially aligns with each one of the plurality of rotor flux conducting portions in a first position of the rotor assembly relative to the stator assembly during a 360° rotation of the rotor assembly, each tape wound flux conducting core portion forming a flux path with at least two of the plurality of rotor flux conducting portions when one of the pair of extensions of the tape wound flux conducting core portions is aligned with one of the plurality of rotor flux conducting portions.

2. The device of claim 1, wherein the coil is attached to at least one of the plurality of tape wound flux conducting core portions.

3. The device of claim 1, wherein the coil is attached to at least one of: at least one of the plurality of magnet portions or at least one of the plurality of rotor flux conducting portions.

4. The device of claim 1, further comprising at least one opening in the stator assembly for communicating fluid flow therethrough.

5. The device of claim 4, further comprising at least one fluid blade attached to the rotor portion, wherein the at least one fluid blade causes fluid motion through the rotor assembly and stator assembly responsive to rotation of the rotor assembly.

6. The device of claim 4, wherein the fluid flow is air flow.

7. The device of claim 1, wherein the coil is superconducting.

8. The device of claim 1, wherein each of the plurality of walled sections includes an opening for enhancing fluid flow therethrough.

9. The device of claim 1, wherein each of the plurality of walled sections includes an engagement slot for engaging one of the plurality of tape wound flux conducting core portions.

10. The device of claim 1, wherein each of the plurality of tape wound flux conducting core portions has an outer edge, and wherein each of the plurality of walled sections includes a shaping wall portion for shaping at least a portion of the outer edge of one of the plurality of tape wound flux conducting core portions.

11. An electrical device, comprising:
a coil;
a rotor assembly rotatable in a rotational direction about an axis, the rotor assembly being generally disc-shaped and comprising a plurality of magnet portions and a plurality of rotor flux conducting portions, each of the plurality of rotor flux conducting portions being located between a pair of the plurality of magnet portions;

a stator assembly comprising a plurality of tape wound flux conducting core portions, wherein each of the plurality of tape wound flux conducting core portions has a pair of extensions, wherein each of the pair of extensions is oriented at an angle relative to the rotational direction of the rotor assembly, wherein at least a portion of each of the plurality of tape wound flux conducting core portions partially encompasses the coil, and wherein the stator assembly further comprises a cassette-type portion for housing the plurality of tape wound flux conducting core portions; and a ribbed support for the plurality of tape wound flux conducting core portions;

wherein the rotor assembly is moveable relative to the stator assembly such that each of the pair of extensions for each of the tape wound flux conducting core portions sequentially aligns with each one of the plurality of rotor flux conducting portions in a first position of the rotor assembly relative to the stator assembly during a 360° rotation of the rotor assembly, each tape wound flux conducting core portion forming a flux path with at least two of the plurality of rotor flux conducting portions when one of the pair of extensions of the tape wound flux conducting core portions is aligned with one of the plurality of rotor flux conducting portions.

12. The device of claim 11, wherein the ribbed support comprises a plurality of ribs, each of the plurality of ribs for shaping the outer edge of one of the plurality of tape wound flux conducting core portions.

13. The device of claim 12, further comprising a plurality of shaping inserts, wherein each of the plurality of tape wound flux conducting core portions has a central opening, and wherein one of the plurality of shaping inserts is receivable in the central opening of each of the plurality of tape wound flux conducting core portions.

14. The device of claim 13, wherein the stator assembly further comprises a cassette-type portion for housing the plurality of tape wound flux conducting core portions, wherein the cassette-type portion includes a plurality of walled sections for retaining the plurality of tape wound flux conducting core portions, wherein the cassette-type portion is attachable to the ribbed support, and wherein the cassette-type portion, the ribbed support, and the shaping insert shape the plurality of tape wound flux conducting core portions.

15. The device of claim 14, further comprising a plurality of added connection portions, one of the plurality of connection portions flexibly connecting each sequential pair of tape wound flux conducting core portions.

16. The device of claim 15, wherein the cassette-type portion includes a plurality of openings for receiving the plurality of added connection portions.

17. The device of claim 16, wherein the ribbed support includes a plurality of tabbed portions, and wherein each of the plurality of tabbed portions is situated so as to interference fit with one of the plurality of added connection portions within one of the plurality of openings in the cassette-type portion.

18. The device of claim 14, wherein each of the plurality of walled sections includes an opening for enhancing fluid flow therethrough.

19. The device of claim 14, wherein each of the plurality of walled sections includes an engagement slot for engaging one of the plurality of tape wound flux conducting core portions.

20. The device of claim 14, wherein each of the plurality of tape wound flux conducting core portions has an outer edge, and wherein each of the plurality of walled sections includes a shaping wall portion for shaping at least a portion of the outer edge of one of the plurality of tape wound flux conducting core portions.

21. The device of claim 11, wherein the coil is attached at least one of the plurality of tape wound flux conducting core portions.

22. The device of claim 11, wherein the coil is attached to at least one of: at least one of the plurality of magnet portions or at least one of the plurality of rotor flux conducting portions.

23. The device of claim 11, further comprising at least one opening in the stator assembly for communicating fluid flow therethrough.

24. The device of claim 23, further comprising at least one fluid blade attached to the rotor portion, wherein the at least one fluid blade causes fluid motion through the rotor assembly and stator assembly responsive to rotation of the rotor assembly.

25. The device of claim 23, wherein the fluid flow is air flow.

26. The device of claim 11, wherein the coil is superconducting.

27. An electrical device, comprising:

a coil;

a rotor assembly rotatable in a rotational direction about an axis, the rotor assembly being generally disc-shaped and comprising a plurality of magnet portions and a plurality of rotor flux conducting portions, each of the plurality of rotor flux conducting portions being located between a pair of the plurality of magnet portions and extending generally parallel to the axial direction; and a stator assembly, the stator assembly including a plurality of tape wound flux conducting core portions, wherein each of the plurality of tape wound flux conducting core portions has a horseshoe shaped opening, wherein each of the plurality of tape wound flux conducting core portions is oriented at an angle relative to the rotational direction of the rotor assembly, wherein the stator assembly further comprises a cassette-type portion for housing the plurality of tape wound flux conducting core portions, wherein the cassette-type portion includes a plurality of walled sections for retaining the plurality of tape wound flux conducting core portions, and wherein the coil is received within the horseshoe shaped opening;

wherein the rotor assembly is oriented with regard to the stator assembly such that at least a portion of the plurality of magnet portions and flux conducting portions are received within the horseshoe shaped openings in the plurality of tape wound flux conducting core portions of the stator assembly and moveable relative thereto such that each of the plurality of tape wound flux conducting core portions is alignable with each of the plurality of rotor flux conducting portions during a 360° rotation of the rotor assembly relative to the stator assembly to form a flux path.

28. The device of claim 27, further comprising a ribbed support for the plurality of tape wound flux conducting core portions.

* * * * *